United States Patent [19]

Hosoya et al.

[11] Patent Number: 5,519,992
[45] Date of Patent: May 28, 1996

[54] EXHAUST GAS PURIFICATION SYSTEM FOR INTERNAL COMBUSTION ENGINE, AND APPARATUS AND METHOD FOR CONTROLLING THE SAME

[75] Inventors: Yasuhiko Hosoya; Hirofumi Ohuchi; Tatsuhiko Takahashi, all of Himeji, Japan

[73] Assignee: Mitsubishi Denki Kabushiki Kaisha, Tokyo, Japan

[21] Appl. No.: 212,740

[22] Filed: Mar. 14, 1994

[30] Foreign Application Priority Data

| Mar. 16, 1993 | [JP] | Japan | 5-055505 |
| Mar. 18, 1993 | [JP] | Japan | 5-058611 |
| Mar. 18, 1993 | [JP] | Japan | 5-058644 |
| Jun. 28, 1993 | [JP] | Japan | 5-156580 |
| Jun. 28, 1993 | [JP] | Japan | 5-156581 |
| Nov. 5, 1993 | [JP] | Japan | 5-301331 |

[51] Int. Cl.$^6$ ............................................. F01N 3/20
[52] U.S. Cl. ......................... 60/276; 60/277; 60/284; 60/289
[58] Field of Search ........................... 60/289, 277, 276, 60/284

[56] References Cited

U.S. PATENT DOCUMENTS

| 3,947,544 | 3/1976 | Yamada et al. | 60/289 |
| 3,962,867 | 6/1976 | Ikeura | 60/289 |
| 3,986,352 | 10/1976 | Casey | 60/276 |
| 4,098,078 | 7/1978 | Laurent | 60/289 |
| 5,060,474 | 10/1991 | Aramaki | 60/277 |
| 5,097,700 | 3/1992 | Nakane | 60/277 |
| 5,140,810 | 8/1992 | Kuroda | 60/277 |

FOREIGN PATENT DOCUMENTS 3144706  12/1982  Germany ........................ 60/289

OTHER PUBLICATIONS

U.S. Appln. SN 08/078,465 filed Jun. 18, 1993, GAU 3402.
U.S. Appln. SN 08/086,325 filed Jul. 6, 1993, GAU 3406.
"Electrically–Heated Catalyst System Conversions on Two Current–Technology Vehicles", Martin J. Heimrich et al, SAE Technical Paper Series, #910612, 1991.

*Primary Examiner*—Douglas Hart
*Attorney, Agent, or Firm*—Sughrue, Mion, Zinn, Macpeak & Seas

[57] ABSTRACT

In an exhaust gas purification system for an internal combustion engine including a catalytic converter disposed in an exhaust pipe, an apparatus for controlling an amount and temperature of fresh air fed into the exhaust pipe so that optimal purification efficiency of the catalytic converter can be realized. The apparatus includes an air pump for taking in fresh air, a control valve for controlling air flow, a heater for heating the air and the controller for controlling the pump, the valve and the hater in dependence on engine operation states so that nitrogen oxides, carbon monoxide and hydrocarbon contained in the exhaust gas can be removed to a maximum through reduction and oxidation reactions. An abnormality detecting device detects occurrence of abnormality in the air feeding control apparatus for ensuring fail-safe operation thereof.

7 Claims, 31 Drawing Sheets

(a) FLOW RATE OF AIR FED UPSTREAM OF CATALYST (b) FLOW RATE OF AIR FED DOWNSTREAM OF CATALYST (c) OPERTION OF HEATER

OUTPUT OF AIR PUMP

EXHAUST GAS PURIFICATION SYSTEM FOR INTERNAL COMBUSTION ENGINE, AND APPARATUS AND METHOD FOR CONTROLLING THE SAME

BACKGROUND OF THE INVENTION

1. Field of the Invention

The present invention relates generally to an exhaust gas purification system for an internal combustion engine and particularly to an apparatus for controlling introduction or feeding of fresh air into an exhaust system of an internal combustion engine for promoting purification of engine exhaust gas through catalytic reaction. In particular, the present invention is concerned with an improved method and apparatus for controlling introduction or feeding of fresh air into an exhaust gas purification system of an internal combustion engine for purifying effectively the exhaust gas by eliminating hydrocarbon (HC), carbon monoxide (CO) and oxides of nitrogen ($NO_x$) through catalytic chemical reaction even in the warming-up state of the engine. Further, the invention is concerned with a method and apparatus for controlling optimally the flow of air fed into an exhaust gas purification system in dependence on engine operation states which are effective not only for suppressing discharge of nitrogen oxides ($NO_x$) as well as carbon monoxide (CO) and hydrocarbon (HC) to the atmosphere but also for enhancing fuel cost performance of the engine while protecting the catalytic converter against degradation due to overheating. Additionally, the invention is concerned with an apparatus for detecting occurrence of abnormality in a fresh or secondary air feeding control system adapted for controlling air flow introduced into an exhaust system of an internal combustion engine while heating the air.

2. Description of the Related Art

The regulations imposed on the exhaust gas control for the automobiles becomes more and more severe. Under the circumstances, lot of efforts have heretofore been paid to development of techniques for removing noxious gas components contained in the exhaust gas discharged from the internal combustion engines. In this conjunction, it is known to employ a reduction catalytic converter for removing nitrogen oxides ($NO_x$) and an oxidation catalytic converter for eliminating carbon monoxide (CO) and hydrocarbon (HC) through catalytic chemical reactions. It is further known to introduce or feed fresh air into an exhaust pipe of an internal combustion engine (hereinafter also referred to simply as the engine) for the purpose of promoting purification of the engine exhaust gas through the catalytic chemical reactions even in the state immediately after the start of engine operation where the temperature and purification efficiency of the catalytic converter is still low. For a better understanding of the present invention, the background techniques and the related art will first be described in some detail.

FIG. 27 shows in a schematic diagram a structure of an internal combustion engine system equipped with an apparatus for controlling an amount of air to be introduced or fed into an exhaust pipe of the engine. Referring to the figure, the engine 1 from which noxious gas components are discharged as the result of combustion of a fuel mixture is provided with an intake pipe 2 having an air cleaner 3 installed at an inlet port for filtering out dust and foreign particles from the air as it is taken in. An air flow sensor 4 is disposed at a location downstream of the air cleaner 3 in the intake pipe 2 for detecting flow rate of the air supplied to the engine 1. Further, installed within the intake pipe 2 is a throttle valve 5 for regulating the amount of air to be charged into the engine 1 by varying the cross-sectional area of the intake pipe 2. For supplying fuel to the engine 1, fuel injectors 6 are installed in an intake manifold of the engine 1 for atomizing and ejecting fuel fed through a fuel pump (not shown) toward associated intake valves (not shown) of the engine 1, respectively. An exhaust pipe 7 connected to the engine 1 for discharging the exhaust gas therefrom to the atmosphere is equipped with a catalytic converter 8 for purifying the exhaust gas through chemical reaction. An air feeding system for introducing or feeding fresh air into the exhaust pipe 7 by bypassing the engine 1 is arranged between the intake pipe 2 and the exhaust pipe 7 and includes an air feed pipe 10 having one end connected to the intake pipe 2 at a position downstream of the air cleaner 3 and the other end connected to the exhaust pipe 7 at a location upstream of the catalytic converter 8 for forcively feeding the air into the exhaust pipe 7 through an air pump 11 installed in the air feeding pipe 10. In order to prevent the exhaust gas from flowing reversely into the intake pipe 2 by way of the air feeding pipe 10, a check valve 12 is mounted in the pipe 10. Further, the air feeding pipe 10 is equipped with an electric heater 13 for heating the air to be fed into the exhaust pipe 7. An air-fuel ratio sensor 14 which may be constituted by a zirconia oxygen sensor including a zirconia element or a titania oxygen sensor composed of a titania element is disposed at a position corresponding to a junction between the exhaust pipe 7 and the exhaust manifold for detecting concentration of oxygen contained in the exhaust gas. A fuel controller 15 is connected to the air-fuel ratio sensor 14 and the fuel injectors 6 for controlling the latter in dependence on the output of the air-fuel ratio sensor 14. Additionally, connected to the heater 13 and the fuel controller 15 is a heater controller 16 for controlling the heater 13.

Next, description will turn to operation of the system described above. A fraction of the air taken in and purified through the air cleaner 3 is forcible diverted into the air feeding pipe 10 through the air pump 11 of the air feeding system 9 to be heated by the heater 13 and then introduced through the check valve 12 into the exhaust pipe 7 at a location upstream of the catalytic converter 8. The air fed to the exhaust pipe 7 in this way is mixed with the exhaust gas of the engine 1. The resultant gas mixture is then subjected to chemical reactions within the catalytic converter 8, whereby the noxious exhaust gas components HC (hydrocarbon), CO (carbon monoxide) and $NO_x$ (nitrogen oxides) are converted into $H_2O$ and $CO_2$. The engine exhaust gas thus purified is then discharged to the atmosphere.

The fuel controller 15 determines an amount of the fuel to be injected in the engine 1 on the basis of the engine speed (rpm) and other operation parameter. Besides, the fuel controller 15 corrects the fuel injection amount thus determined in accordance with data derived from the output signal S1 of the air-fuel ratio sensor 14 to thereby generate a signal S2 for driving the fuel injector 6 such that the air-fuel ratio assumes a predetermined value such as a stoichiometric ratio. More specifically, the fuel controller 15 serves to control the fuel injection in accordance with the oxygen ($O_2$) content of the exhaust gas through a feedback loop.

Introduction of the fresh air into the exhaust pipe 7 through the air pump 11 is started substantially at the same time as the start of the engine operation and continued until the engine is stopped. In other words, the air pump 11 operates continuously during operation of the engine 1 to feed incessantly the fresh air into the exhaust pipe 7.

As is apparent from the above, with the arrangement of the exhaust gas purification air feeding control system for the internal combustion engine known heretofore, concentration or content of oxygen in the exhaust gas is detected by the air-fuel ratio sensor 14, wherein the air-fuel ratio of the air-fuel mixture which is to undergo combustion within the engine is so controlled by the fuel controller 15 as to assume a predetermined value, e.g. a value close to a stoichiometric or theoretical air-fuel ratio which can ensure a maximum purification efficiency for the catalytic converter 8. However, the exhaust-gas purification air feeding control system suffers a problem. Namely, operation of the air pump 11 is continued even after the air-fuel ratio control by the fuel controller 15 has been started, whereby the air is continuously fed into the exhaust pipe 7 with the flow rate being maintained substantially constant. As a consequence, when the air-fuel ratio is controlled through the feedback loop to the stoichiometrical value at which the catalytic converter 8 can exhibit the optimal purification characteristic, as mentioned previously, there takes place an oxygen-in-excess state in the area upstream of the catalytic converter 8, as a result of which oxygen molecules in excess oxidize those fractions of carbon monoxide (CO) and hydrocarbon (HC) molecules which are to partake in the reaction for reducing $NO_x$ (oxides of thus nitrogen), incurring shortage of reactants for the reduction of $NO_x$. Ultimately, the $NO_x$-purification efficiency of the catalytic converter 8 becomes lowered, whereby the amount of $NO_x$ discharged to the atmosphere increases undesirably.

To cope with the problem mentioned above, it is certainly conceivable to control the amount of air introduced into the exhaust pipe 7 as a function of the air-fuel ratio determined by the fuel controller 15. In that case, however, since the amount of air as fed into the exhaust pipe 7 can be controlled only after the air-fuel ratio control has put into effect, it is impossible to detect the ratio between the engine exhaust gas and the fresh air in the gas mixture introduced into the catalytic converter before the air-fuel ratio control is started. In other words, it can not be determined whether or not the optimal reactions take place in the catalytic converter 8 nonetheless admixture of the fresh air with the engine exhaust gas.

Another problem of the exhaust gas purification air feed system known heretofore can be seen in that because the system is provided for the purpose of activating the catalytic converter 8 as early as possible for enhancing the exhaust gas purification efficiency, occurrence of failure or malfunction in the exhaust gas purification air feed system will naturally result in discharge of undesirable gas components in the atmosphere. In order to solve this problem, it is necessary to detect occurrence of abnormality as early as possible and generate an alarm to the driver. However, the exhaust gas purification air feed system for the internal combustion engine known heretofore is not in the position to solve this problem.

Heretofore, it is further known to dispose a first catalytic converter for reduction of $NO_x$ and a second catalytic converter for oxidation of HC and CO in the exhaust pipe of the engine in combination with the provision of the fresh air feeding system (also known as the secondary air flow system), as is disclosed in Japanese Unexamined Utility Model Publications No. 21018/1972 (JP-UA-47-21018) and Japanese Unexamined Patent Application Publication No. 60019/1984 (JP-UA-59-60019).

More specifically, a catalytic converter for reduction and a catalytic converter for oxidation are serially installed in the exhaust gas pipe of the engine in this order as viewed in the direction of the exhaust gas flow, wherein in the engine operation state which follows immediately the start of the engine and in which hydrocarbon and carbon monoxide occupy a large proportion of the exhaust gas, the fresh air (also referred to as the secondary air) is introduced to the reduction-oriented catalytic converter which is thus placed in an oxidizing atmosphere to thereby remove hydrocarbon (HC) and carbon monoxide (CO).

For more particulars of the fresh air feeding apparatus known heretofore will be described below by reference to FIG. 28.

As can be seen in FIG. 28, the engine system is comprised of an internal combustion engine 201, a transmission 202 operatively connected to an output shaft (not shown) of the engine 201, an intake pipe 203 for charging air into the engine 201, an exhaust pipe 204 for discharging engine exhaust gas, a three-way (reduction) catalytic converter 205 and an oxidation catalytic converter 206 disposed in the exhaust pipe 204, respectively, for purifying the exhaust gas, a mechanical air pump 209 for taking in and supplying fresh air to the exhaust gas purification system, an a fresh air feeding pipe 210 for introducing the air taken in through the air pump 209 to the catalytic converters 205 and 206, respectively. A throttle valve 207 is disposed in the intake pipe 203 with an air cleaner 208 being mounted at an inlet port thereof.

In operation of the engine 201, the exhaust gas flows through the exhaust pipe 204 to be purified through the three-way (reduction) catalytic converter 205 and the oxidation catalytic converter 206. At that time, the fresh air is introduced to both the reduction catalytic converter 205 and the oxidation catalytic converter 206 by way of the air feeding pipe 210, as a result of the which excess oxygen state prevails within the exhaust pipe 204 as well as the converters 205 and 206, whereby hydrocarbon (HC) and carbon monoxide (CO) contained in the exhaust gas become more susceptible to oxidation and thus concentrations of these noxious components are decreased.

The conventional apparatus described above also suffers a problem that although removal of HC and CO components is promoted because the catalytic converter 205 is exposed to the oxidizing atmosphere, nitrogen oxides ($NO_x$) are difficult to be reduced through the converter 205, resulting in that the quantity or concentration of $NO_x$ discharged to the atmosphere can not be decreased. Further, since the fresh air (also referred to as the secondary air) is at a lower temperature than the exhaust gas in the starting operation state of the engine, activation of the catalysts is accompanied with a time lag, leading to degradation in the purification efficiency of the catalysts.

In general, when the air-fuel ratio of the gas mixture charged in the engine is so controlled as to be substantially constant in the vicinity of the theoretical or stoichiometric air-fuel ratio (typically 14.7), the efficiency of the exhaust gas purification system including one or more catalytic converters is maintained optimal for oxidation and reduction of noxious components such as hydrocarbon (HC), carbon monoxide (CO) and nitrogen oxides ($NO_x$), whereby these noxious gas components can be removed substantially completely before being discharged to the atmosphere. A problem of such exhaust gas purification system is also seen in that when the air-fuel ratio of the mixture charged into the engine is so controlled that the fuel content is high as experienced in the engine starting phase and in the high load state of the engine, content of oxygen In the air-fuel mixture charged in the engine becomes insufficient for oxidation of HC and CO, resulting in that the engine exhaust gas discharged from the engine contains significant amounts of HC and CO components. To cope with this problem, there has heretofore been proposed an exhaust gas purification system for allowing the noxious gas components such as CO and HC to be eliminated by feeding fresh air into the exhaust pipe, as is disclosed, for example, in Japanese Unexamined Patent Application Publication No. 65541/1984 (JP-A-59-65541).

This known exhaust gas purification system will be reviewed below by reference to FIG. 29 which shows in a block diagram a structure of an internal combustion engine system equipped with an apparatus for controlling an amount of air to be introduced or fed into an exhaust pipe. Referring to the figure, an internal combustion engine 301 is comprised of, for example, four cylinders and provided with an intake pipe 305 having an air cleaner 302 installed at an inlet port for filtering out dust and foreign particles from the intake air. As a result of combustion within the engine, noxious gases such as HC and CO are produced when oxygen is insufficient, while $NO_x$ (nitrogen oxides) is produced when oxygen are in excess and engine is operating at a high temperature.

An air flow sensor 303 is disposed at a location downstream of the air cleaner 302 in the intake pipe 305 for measuring flow rate of the air supplied to the engine 301. Further, installed within the intake pipe 305 is a throttle valve 304 for regulating the amount of air to be charged into the engine 301 by varying the cross-sectional area of the intake pipe 305. For supplying fuel to the engine 301, fuel injectors 310 are installed in an intake manifold of the engine 301 for atomizing and ejecting fuel fed through a fuel pump (not shown) toward associated intake valves (not shown) of the engine 301. An exhaust pipe 306 connected to the engine 301 for discharging the exhaust gas therefrom is equipped with a catalytic converter 307 for promoting purification of the exhaust gas by removing the noxious gases through chemical reaction.

An air feeding system (also referred to as the secondary air feeding system) for introducing fresh or secondary air into the exhaust pipe 306 is arranged between the intake pipe 305 and the exhaust pipe 306 and includes an air feed pipe 305A having one end connected to the intake pipe 305 at a position downstream of the air cleaner 302 and the other end connected to the exhaust pipe 306 at a location upstream of the catalytic converter 307 for forcible feeding the fresh air into the exhaust pipe 306 through an air pump 308 installed in the air feeding pipe 305A. In order to prevent the exhaust gas from flowing reversely into the intake pipe 305, a check valve 309 is mounted in the air feeding pipe 305A.

The rotation speed of the air pump 308 is controlled by a control signal C2, whereby the flow rate of the fresh or secondary air as introduced is controlled correspondingly.

An air-fuel ratio sensor 311 is mounted in the exhaust pipe 306 for detecting concentration of oxygen contained in the exhaust gas, to thereby output a detection signal AF, the voltage level of which changes with reference to a level indicating an oxygen concentration substantially corresponding to the stoichiometric air-fuel ratio (14.7).

A fuel controller 312 is connected to the fuel injector 310 for controlling the fuel injector 310 and the air pump 308 in dependence on the output of the air-fuel ratio sensor 311 and engine operation state signals including signals indicative of the intake air flow rate, temperature of the engine cooling water, engine speed, throttle opening indicative of engine load and others which are detected by associated sensors, respectively.

The fuel controller 312 for generating the control signal C1 for the injectors 310 and the control signal C2 for the air pump 308 is implemented in the form of a microcomputer imparted with arithmetic function and serves for arithmetically determining a target fuel amount in dependence on the output signal AF of the air-fuel ratio sensor 311 and the engine operation state signals generally designated by D to thereby generate the control pulse signal C1 having a duty cycle corresponding to the target fuel amount, whereby the air-fuel ratio of air-fuel mixture charged into the engine is so controlled as to be substantially equal to the theoretical or stoichiometric air-fuel ratio.

FIG. 30 is a waveform diagram for illustrating a relation between the fuel amount charged into the engine and the output signal AF of the air-fuel ratio sensor 311.

As can be been from the figure, the air-fuel ratio detection output signal AF of the air-fuel ratio sensor 311 rises up steeply when the air-fuel mixture fed to the engine is rich (i.e., when the air-fuel ratio is smaller than the stoichiometric ratio of 14.7) while the former falls steeply when the latter is lean (i.e., when the air-fuel ratio is greater than the stoichiometric value of 14.7). Thus, the fuel amount injected through the injector 310 is so controlled as to be decreased when the signal AF indicates that the air-fuel mixture as charged is rich and vice versa.

Next, description will turn to operation of the engine system described above by reference to FIGS. 29 and 30. A part of the air taken in through the air cleaner 302 is forcible diverted into the air feeding pipe 305A through the air pump 308 to be introduced through the check valve 309 into the exhaust pipe 306 at a location upstream of the catalytic converter 307.

The air fed to the exhaust pipe 306 in this way is mixed with the exhaust gas of the engine 301. The resultant gas mixture is then subjected to oxidizing reactions in the catalytic converter 307, whereby the noxious exhaust gas components HC (hydrocarbon) and CO (carbon monoxide) are oxidized to $H_2O$ and $CO_2$, respectively. The engine exhaust gas thus purified is then discharged to the atmosphere.

At this juncture, it is to be noted that the air-fuel ratio sensor 311 is usually constituted by an $O_2$-sensor and thus detects the concentration or content of $O_2$ in the mixture gas resulting from the mixing of the engine exhaust gas and the fresh or secondary air supplied through the air feeding pipe 305A. The air-fuel ratio detection signal outputted from the air-fuel sensor 311 is supplied to the fuel controller 312 together with the engine operation stake signal D.

The fuel controller 312 fetches the air-fuel ratio detection signal AF and the engine operation state signal D to thereby determine the basic amount of fuel to be injected through the injector 310 in dependence on the engine operation state indicated by, for example, the intake air flow rate and/or the engine speed and corrects the basic fuel amount as determined by taking into consideration the air-fuel ratio detection signal AF, whereby the corresponding control signal C1 is generated for controlling the fuel injector 310. Further, when the engine is in the state of low or intermediate load, the control signal C2 is generated for operating the air pump 308. In this case, the control signal C1 indicates the air-fuel ratio of the air-fuel mixture to be charged into the engine which is slightly smaller than the stoichiometric ratio (i.e., the air-fuel mixture is rich more or less). However, the output AF of the air-fuel ratio sensor 311 indicates that the air-fuel mixture as charged into the engine is lean because the oxygen concentration of the exhaust gas is high due to addition of the fresh air supplied from the air pump 308.

When it is decided by the fuel controller 312 on the basis of the eigne operation state signal D that the engine 301 is in a high load state, the controller 312 interrupts the control signal C2 to thereby stop the operation of the air pump 308. The feeding of the fresh or secondary air into the exhaust pipe 306 is thus interrupted, whereby the concentration of oxygen contained in the exhaust gas diminishes because of no introduction of the fresh air into the exhaust system. As a consequence, the fuel controller 312 controls the fuel injection such that the air-fuel ratio of the mixture to be charged into the engine becomes slightly greater than the stoichiometric ratio (i.e., the mixture becomes lean).

As is apparent from the above, when the fresh air is fed to the exhaust system in the engine state of low and/or middle load in order to promote purification efficiency of the catalytic converter for removing HC and CO, the air-fuel mixture supplied to the engine is set to be richer than that corresponding to the stoichiometric ratio. This means that fuel-cost performance is degraded, giving rise to a problem. On the other hand, when the fresh air feeding is stopped in the high load state of the engine such as experienced in up-hill driving of a motor vehicle, the air-fuel ratio of the mixture is controlled to be greater than that the stoichiometric value (i.e., the mixture becomes lean), involving problems that not only generation of $NO_x$ (nitrogen oxides) increases but also knocking or the like unwanted phenomena are likely to take place. Furthermore, the engine may be overheated to injure or destroy the catalytic converter or other components.

As another example of the exhaust gas purification system in which the fresh air is introduced into the exhaust pipe, there is known an apparatus disclosed in, for example, Japanese Unexamined Patent Application Publication No. 132816/1992 (JP-A-H4-132816).

FIG. 31 shows schematically a structure of the apparatus for controlling the fresh air introduced into the exhaust gas purification system for an internal combustion engine disclosed in the above-mentioned publication. As can be seen in the figure, the engine system is comprised of an internal combustion engine 401, a transmission 402 operatively connected to an output shaft (not shown) of the engine 401, an intake pipe 403 for charging air into the engine 401, an exhaust pipe 404 for discharging engine exhaust gas, and an exhaust gas purification system including a catalytic converter unit 405 disposed in the exhaust pipe 404 for purifying the exhaust gas. A throttle valve 406 is disposed in the intake pipe 403. FIG. 32 shows a structure of the catalytic converter unit 405. Referring to the figure, the catalytic converter unit 405 is comprised of a container 450 in which an upstream catalytic converter 451 including a three-way catalyst and a downstream catalytic converter 452 including an oxidating catalyst, wherein the upstream converter 451 and the downstream catalyst 452 are separated by a split portion 453.

An air feeding system (also referred to as the secondary air feeding system) for introducing fresh air (also referred to as the secondary air) into the exhaust pipe 404 is arranged between the intake pipe 403 and the exhaust pipe 404 and includes an air supply conduit 409 having one end connected to the intake pipe 403 at a position downstream of the throttle valve 406, and the other end connected to a change-over valve 410. In order to prevent the exhaust gas from flowing reversely into the air supply conduit 409, a check valve 412 is mounted in the air supply conduit 409. For controlling the flow rate of the air introduced into the exhaust pipe 404, a control valve 411 is disposed in the air supply conduit 409 at a position upstream of the check valve 412. A first air feeding pipe 413 is connected between the change-over valve (i.e., three-way valve) 410 and the exhaust pipe 404, while a second air feeding pipe 414 is connected between the change-over valve 410 and the split portion 453 of the catalytic converter 405. Furthermore, a negative pressure conduit 415 extends from the intake pipe 403 to the change-over valve 410 via solenoid valves 416 and 417, respectively. The control valve 411, the solenoid valves 416 and 417 are adapted to be controlled by a controller 418 for operation of which electric energy is supplied from a battery 419.

For the operation of the engine 401, a mixture gas of air supplied through the air cleaner 407 and the intake pipe 403 and fuel charged through a fuel injector system (not shown) is charged into the engine 401. At that time, the air-fuel ratio of the mixture gas is regulated by the throttle valve 406, whereby the output torque of the engine 401 is regulated correspondingly. The output of the engine 401 is transmitted to driving wheels (not shown) of a motor vehicle by way of the transmission 402. At a time point immediately after the start of the engine 401, the air-fuel ratio is controlled to be small, as a result of which amounts of carbon monoxide (CO) and hydrocarbon contained in the exhaust gas of the engine 401 is relatively large, while the temperature of the catalytic converter 405 has not attained a level which is sufficiently high for the chemical purification reaction.

Thus, in the state mentioned above, the mechanical air pump 408 is driven by a power derived from the output of the engine 401 via a belt transmission mechanism or the like (not shown), whereby fresh air is supplied to the air supply conduit 409. At this time point, the solenoid valve 416 is opened by the controller 418, as a result of which a negative pressure prevailing within the intake pipe 403 is applied to the change-over valve 410 by way of the negative pressure suction pipe 415 and the solenoid valve 416, whereby the air supply conduit 409 and the first air feeding pipe 413 are placed in fluidal communication with each other. Thus, the fresh air is introduced into the exhaust pipe 404. As a consequence, the exhaust gas becomes rich in oxygen to promote oxidation reaction through the medium of the upstream catalyst 451 and the downstream catalyst 452, which results in that CO and HC are converted into $CO_2$ (carbon dioxide) and $H_2O$ (water) to be thereby removed from the exhaust gas before it is discharged into the atmosphere.

Thereafter, when the temperature of the upstream catalyst 451 and the downstream catalyst 452 has reached a level sufficiently high for the exhaust gas purifying reaction, the controller 418 closes the solenoid valve 416 while opening the solenoid valve 417. Then, the negative pressure within the intake pipe 403 is applied to the change-over valve 410 via the negative pressure pipe 415 and the solenoid valve 417. Since the air supply conduit 409 and the second air feeding pipe 414 are placed in fluidal communication with each other at this time point, the fresh air is introduced to the split portion 453 of the catalytic converter 405, as a result of which only the downstream catalyst 452 is exposed to the excess oxygen atmosphere. In this state, nitrogen oxides ($NO_x$), CO and HC contained in the exhaust gas are first removed through the medium of the three-way catalyst 451 located upstream, which is then followed by removal of remaining CO and HC through oxidizing reaction in the downstream catalyst 452.

In the operation described above, it has been assumed that the fresh air is supplied to only one of the first air feeding pipe 413 and the second air feeding pipe 414 by turning on/off the solenoid valve 416 and the solenoid valve 417.

However, in most practical applications, the change-over valve 410 is controlled to an intermediate position so that the fresh air is supplied to both the first air feeding pipe 413 and the second air feeding pipe 414. Thus, the flow rate of the fresh air introduced to the exhaust pipe 404 and the split portion 453 are maintained substantially constant, as is illustrated in FIG. 33.

Owing to the introduction of the fresh air (secondary air) to the exhaust gas purification system, noxious gases such as CO and HC contained in the exhaust gas of the engine 1 is suppressed from being discharged to the atmosphere even in the operation state of the engine 401 which immediately follows the start thereof.

The apparatus for controlling the fresh air feeding to the exhaust gas purification system of the engine described above is however disadvantageous in that since the fresh air of lower temperature than that of the exhaust gas of the engine 401 is introduced into the exhaust pipe 404, the temperature of the exhaust gas as well as that of the upstream catalyst 451 and the downstream catalyst 452 is lowered, involving degradation in the exhaust gas purifying reaction of the catalytic converter unit 405.

It is further noted that the amount of fresh air introduced into the split portion 453 of the catalytic converter 405 may be smaller than that of the fresh air introduced into the exhaust pipe 404. This is because the fresh air introduced into the split portion 453 is demanded only for placing the downstream catalyst 452 in the oxidizing atmosphere. On the other hand, the fresh air charged through the mechanical air pump 408 is at a substantially constant flow rate, as can be seen in FIG. 33. However, the amount of the air charged through the mechanical air pump 408 becomes considerably large when the air is to be introduced into both the exhaust pipe 404 and the split portion 453 simultaneously, which requires a large capacity for the mechanical air pump 408, to expensiveness. Besides, in order to realize an optimal control of the fresh air introduced to the split portion 453 at a demanded small flow rate, a controller of complicated and expensive structure will be required, thus giving rise to another problem that a complicate and expensive fresh air feed control apparatus of a large scale is required.

In conjunction with a three-way catalyst, it is known that the purification efficiency thereof at a low temperature can considerably be enhanced by varying periodically the $O_2$-content of the gas mixture within the catalytic converter. FIG. 34 is a graphical representation of purification efficiency characteristics of a three-way catalyst. In the figure, temperature of the catalyst is taken along the abscissa with CO-purification efficiency along the ordinate. In the figure, a curve A represents a purification characteristic in the case where the fresh air is continuously fed to the three-way catalytic converter. On the other hand, curves B, C, D and E represent corresponding characteristics in the cases where the air is introduced periodically at intervals of 1 sec, 5 sec, 10 sec, 20 sec, respectively. As can be seen, when the air is continuously added to the exhaust gas, purification of CO increases progressively, starting from the catalyst temperature of about 150° C. On the other hand, when the air is added intermittently or in a pulse-like manner, the temperature at which CO can be oxidized becomes low.

It is known from, for example, Japanese Unexamined Patent Application Publication No. 81814/1978 (JP-A-53-81814) that a pressure-responsive valve which is controlled on the basis of an engine intake air pressure and an air-pump discharge pressure is installed in a fresh air feeding pipe to thereby effect intermittently the air introduction to a three-way catalytic converter so that the gases rich and lean in oxygen content are alternately supplied to the three-way catalytic converter at least five times per second, to thereby promote removal of CO and HC.

However, the known exhaust gas purification apparatus described just above also suffers problems that the change-over mechanism required for switching the air feeding to the exhaust system is much complicated and demands constituent parts of high precision. Further, difficulty is encountered in generation of control signals as required. Furthermore, because the fresh air of a lower temperature than that of the exhaust gas is added, temperature of the exhaust gas as well as that of the catalyst tends to be lowered, leading unwantedly to degradation in the exhaust gas purifying reaction of the catalytic converter.

As other exhaust gas purification systems in which fresh air is introduced into the exhaust pipe for promoting the purification efficiency of the catalytic converter at an earlier stage of engine operation and in which apparatus is provided for detecting abnormality in the control operations of various components of the system, there may be mentioned those disclosed in Japanese Unexamined Patent Publications Nos. 143362/1988, (JP-A-63-143362), 248908/1988 (JP-A-63- 248908) and 1443/1992 (JP-A-H4-1443).

FIG. 35 shows schematically a general arrangement of an apparatus for introducing heated air into an exhaust system of an internal combustion engine. Referring to the figure, air is drawn at a predetermined flow rate through a motor-driven air pump 608 simultaneously with or after lapse of a predetermined time from the start of the engine 601. The air is then fed into an exhaust pipe 604 of the engine upstream of a catalytic converter 605 from the air pump 608 through an air supply conduit 610, an air flow control valve 613, a check valve 611, a heater 612 and an air feeding pipe 609. The heater 612 is electrically energized under the control of a control unit 614 simultaneously with or after lapse of a predetermined time from the engine start, whereby the air is heated before being introduced into the exhaust pipe 604. Thus, the heated air is fed into the engine exhaust system at a predetermined flow rate at an earlier stage of engine operation.

The heated air fed into the exhaust pipe contributes to activation of catalyst contained in the catalytic converter 605 for thereby promoting the activity of the catalyst to remove noxious gas components HC (hydrocarbon) and CO (oxygen monoxide).

However, in the exhaust gas purification systems equipped with the fresh air (or secondary air) introduction control apparatus, inclusive of those described hereinbefore, there remain problems to be solved that the temperature of the heater may rise steeply to injure or damage not only the heater itself but also peripheral devices disposed in the vicinity thereof when the air flow rate flowing through the heater decreases due to troubles, for example, in the check valve brought about by deposition of sludge contained in the exhaust gas, clogging of the air pump or air cleaner disposed upstream thereof, leakage from the air feeding conduit or pipe, failure of the flow control valve and so forth.

SUMMARY OF THE INVENTION

In the light of the state of the art described above, it is a first object of the present invention to provide an apparatus for controlling air feeding to an exhaust gas purification system of an internal combustion engine, which apparatus can ensure an enhanced purification efficiency of a catalytic converter by operating it under optimal conditions.

Further, in conjunction with the first object, it is another object of the present invention to provide an apparatus for feeding fresh air into an exhaust gas purification system of an internal combustion engine which is imparted with capability of detecting as early as possible occurrence of abnormality in operation of the fresh air feeding apparatus.

It is a second object of the present invention to solve the problems described hereinbefore and provide a method and apparatus for controlling feeding of fresh air to the exhaust system of an engine such that nitrogen oxides can more positively be eliminated by a reduction-oriented catalytic converter while enhancing the purification efficiency of an oxidation-oriented catalytic converter by rising temperature thereof in a possibly earliest stage of engine operation.

It is a third object of the present invention to provide an exhaust gas purification system for an internal combustion engine which can ensure improvement of fuel-cost performance while suppressing generation of noxious gases such as $NO_x$ and protecting the system from being overheated.

In conjunction with the third object, it is another object of the present invention is to provide an exhaust gas purification system with fresh air introduction control facility which can enjoy a low power consumption while ensuring a high efficiency of exhaust gas purification.

A fourth object of the present invention is provide an apparatus for controlling a fresh air feeding to an exhaust gas purification system of an internal combustion engine which can enhance the exhaust gas purification efficiency of an upstream catalytic converter and which can control optimally the amount of fresh air to be introduced to a downstream catalytic converter.

It is a fifth object of the present invention to provide an apparatus for controlling fresh air feeding or introduction into an exhaust system of an internal combustion engine, which apparatus can periodically feed fresh air into an exhaust pipe at a location upstream of a catalytic converter with a simplified and inexpensive structure to thereby improve the exhaust gas purification performance of the catalytic converter.

A sixth object of the present invention is to provide for an fresh air introduction/control apparatus of an engine exhaust gas purification system an apparatus for preventing overheating of the air introduced into the exhaust gas purification system to thereby ensure safety and security for the air feeding/control apparatus as well as the exhaust gas purification system.

In view of the first and other objects mentioned previously, the present invention is generally directed to an exhaust gas purification system for an internal combustion engine, which system comprises a catalytic converter means disposed in an exhaust pipe of the engine for purifying an exhaust gas, and an air feeding system for introducing fresh air into the exhaust gas purification system.

In the internal combustion engine system mentioned above, there is provided according to a first aspect of the invention an apparatus for controlling an amount of the air fed into the exhaust gas purification system so that purification efficiency of the catalytic converter can be enhanced, which apparatus comprises an air-fuel ratio sensor disposed in the exhaust pipe at a position downstream of the catalytic converter for detecting concentration of a given component contained in the exhaust gas, and a fresh air feeding control means for controlling an amount of air introduced into the exhaust gas purification system of the engine by controlling the amount of air fed to the exhaust gas purification system on the basis of output of the air-fuel sensor.

With the arrangement described above in which the concentration of a given or particular component (e.g. $O_2$) contained in the exhaust gas is detected by the air-fuel ratio sensor disposed downstream of the catalytic converter within the exhaust pipe, wherein the fresh air feeding control means adapted for controlling the amount of fresh air to be fed into the exhaust pipe can control the fresh air flow by taking into consideration the result of the exhaust gas purification effected by the catalytic converter, it is possible to increase the purification efficiency of the catalytic converter even in an earlier stage of the engine operation.

Further, in view of the first object, the present invention is directed to an exhaust gas purification system for an internal combustion engine, which system comprises a catalytic converter disposed in an exhaust pipe of the engine for purifying an exhaust gas of the engine, an air feeding system for introducing fresh air into the exhaust gas purification system after heating the air, and a fuel control means for controlling an amount of fuel charged into the internal combustion engine so that purification efficiency of the catalytic converter can be enhanced.

In the system mentioned above, there is provided according to another aspect of the invention, an apparatus for controlling an amount of the air fed to the exhaust gas purification system, which apparatus comprises an air-fuel ratio sensor disposed in the exhaust pipe at a position downstream of the catalytic converter for detecting concentration of a given component contained in the exhaust gas, a decision means for determining whether catalyst of the catalytic converter is activated, a fresh air feeding control means for controlling an amount of the air fed to the exhaust gas purification system on the basis of the detection output of the air-fuel ratio sensor when it is determined that the catalyst is not yet activated on the basis of the output signal of the decision means, and an air-fuel ratio control means for controlling the air-fuel ratio of a fuel mixture charged into the engine on the basis of output (content of the given component) of the air-fuel ratio sensor when decision is made that the catalyst is not yet activated.

By virtue of the arrangement described above in which the decision means for detecting activation of the catalytic converter is provided, the fresh air feeding control means can control the fresh air flow on the basis of the detection output of the air-fuel ratio sensor while the air-fuel ratio control means can control the fuel supply control means for controlling the air-fuel ratio on the basis of the detection output of the air-fuel ratio sensor, when it is decided that the catalyst is not yet activated, whereby not only the fail-safe feature and hence reliability of the control system for both the fresh air feeding to the exhaust system and the air-fuel ratio can significantly be enhanced but also the catalytic converter can be activated in an earlier stage of the engine operation. Thus, the catalytic converter can constantly be operated with optimal activity which can assure an enhanced exhaust gas purification efficiency.

According to a further aspect of the invention which concerns the first and other objects mentioned above, there is provided an apparatus for controlling an amount of the air fed to the exhaust gas purification/discharge system, which apparatus comprises an air-fuel ratio sensor disposed in the exhaust pipe at a position downstream of the catalytic converter for detecting concentration of a given component contained in the exhaust gas, and an abnormality detecting means for detecting occurrence of abnormality in operation of the air feeding system on the basis of an output signal of the air-fuel ratio sensor.

Owing to the above arrangement which includes the abnormality detecting means for detecting occurrence of abnormality on the basis of the detection output signal of the air-fuel ratio signal, it is possible to detect abnormality or fault for the whole system on the basis of the information concerning the catalytic reaction as obtained in the form of an output signal of the air-fuel ratio sensor disposed downstream.

For achieving the second object mentioned hereinbefore, there is provided according to a second aspect of the invention an exhaust gas purification system for an internal combustion engine, which system comprises an exhaust pipe for transporting an exhaust gas of the engine to the atmosphere, a reduction-oriented catalytic converter disposed in the exhaust pipe, an oxidation-oriented catalytic converter disposed in the exhaust pipe at a location downstream of the reduction-oriented catalytic converter, and a fresh air feeding means for supplying fresh air to the exhaust pipe from a location upstream of the oxidation-oriented catalytic converter and downstream of the reduction-oriented catalytic converter.

In a preferred mode for realizing the second aspect of the present invention, a heater may be disposed in association with the fresh air feeding means for heating the fresh air before being introduced into the exhaust pipe, and a controller for controlling the heater in dependence on temperature of the engine.

In another preferred mode for realizing the second aspect of the invention, the controller may be so implemented as to control the heater such that the heater is actuated until the exhaust gas has reached a predetermined temperature sufficiently high for activation of the oxidation catalytic converter. The temperature may lie within a range of about 300° C. to 400° C.

In yet another preferred mode for realizing the second aspect of the invention, there are provided an intake air flow sensor for detecting a flow rate of intake air supplied to the engine, and a fresh air flow regulating means for regulating an amount of fresh air to be introduced into the exhaust pipe, wherein the controller controls the amount of fresh air introduced into the exhaust pipe through the fresh air flow regulating means in dependence on the flow rate of the intake air flow detected by the intake air flow sensor.

In still another preferred mode for realizing the second aspect of the invention, there are provided an intake air flow sensor for detecting a flow rate of intake air supplied to the engine and a fresh air flow regulating means for regulating an amount of fresh air to be introduced into the exhaust pipe, wherein the controller estimates contents of the exhaust gas on the basis of the amount of intake air flow detected by the intake air flow sensor and an amount of fuel supplied to the engine for thereby controlling the amount of fresh air to be introduced to the exhaust pipe on the basis of the estimated contents of the exhaust gas.

With the arrangements described above, nitrogen oxides ($NO_x$) is removed by the reduction catalytic converter, while removal of hydrocarbon (HC) and carbon monoxide (CO) by the oxidation-oriented catalytic converter is promoted by heating the secondary air in dependence on the engine temperature.

The second aspect of the present invention is also directed to a method of controlling the heater means in dependence on the temperature of the engine, which comprises a step of controlling temperature of the fresh air in dependence on operation state of the engine.

For achieving the third object mentioned hereinbefore, there is provided according to a third aspect of the present invention an exhaust gas purification system for an internal combustion engine, which system comprises a fuel injection means for charging a fuel into the engine, an air feeding means for introducing fresh air into an exhaust pipe of the engine, an air-fuel ratio detecting means disposed in the exhaust pipe, sensor means for acquiring engine operation state information including temperature of the engine and rotational speed thereof, a fuel injection control means for controlling the fuel injection means through a feedback control loop in dependence on a detection output signal derived from the output of the air-fuel ratio detecting means and the operation state information derived from outputs of the sensor means so that air-fuel ratio of an air-fuel mixture undergoing combustion within the engine represents substantially a stoichiometric air-fuel ratio, and a fresh air control means for controlling the air feeding means in response to a mode signal supplied from the fuel control means, wherein the fuel control means includes means for generating the mode signal indicating that feedback control of the air-fuel ratio is being executed and controls the air-fuel ratio to be slightly higher than the stoichiometric air-fuel ratio in the feedback control mode while controlling the air-fuel ratio to be lower than the stoichiometric air-fuel ratio unless the feedback control is effected, and wherein the fresh air control means drives the fresh air feeding means when the air-fuel ratio feedback control is not effected, whereas when the air-fuel ratio feedback control is being effected, operations of the fresh air feeding means are inhibited.

With the arrangement of the exhaust gas purification system described above, the air-fuel ratio of the air-fuel mixture supplied to the engine is so controlled as to be higher than the stoichiometric ratio (i.e., the mixture is lean) through the feedback control (i.e., on the basis of the output of the air-fuel ratio sensor) with the fresh air feeding to the exhaust system being stopped for prompting reduction of $NO_x$ in low and intermediate load states. On the other hand, in a high load operation state of the engine, the feedback control of the air-fuel ratio effected on the basis of the output of the air-fuel ratio sensor is changed over to an open-loop control for setting the air-fuel ratio to be smaller than the stoichiometric ratio (i.e., the air-fuel mixture charged into the engine is rich) while the feeding of the fresh air to the exhaust gas system being interrupted. Thus, a sufficiently high output torque can be generated in a high load state of the engine while suppressing the knocking and overheating of the engine due to combustion of rich air-fuel mixture. Additionally, oxygen is supplemented sufficiently for sustaining the oxidation reaction for removing CO and Hc.

According to another aspect of the invention directed to the third object of the invention, there is provided an exhaust gas purification system for an internal combustion engine, which system comprises a fuel injection means for charging a fuel into the engine, an air feeding means for introducing fresh air into an exhaust pipe of the engine, a heater means for heating the air before being fed into the exhaust pipe, an air-fuel ratio detecting means disposed in the exhaust pipe, a sensor means for detecting engine operation state information including temperature of the engine and rotational speed of the engine, a fuel injection control means for controlling the fuel injection means through a feedback control loop in dependence on a detection signal derived from the output of the air-fuel ratio detecting means and operation state information derived from outputs of the sensor means so that air-fuel ratio of an air-fuel mixture undergoing combustion within the engine represents substantially a stoichiometric air-fuel ratio, and a fresh air control means for controlling the air feeding means and the heater means in response to a mode signal supplied from the fuel control means, wherein the fuel control means includes means for generating a mode signal indicating that feedback control of the air-fuel ratio is being executed and controls the air-fuel ratio to be slightly higher than the stoichiometric air-fuel ratio in the feedback control mode while controlling the air-fuel ratio to be slightly lower than the stoichiometric air-fuel ratio unless the feedback control is effected, and wherein the fresh air control means drives both of the fresh air feeding means and the heater means when the air-fuel ratio feedback control is not effected, whereas when the air-fuel ratio feedback control is being effected, operations of both of the fresh air feeding means and the heater means are inhibited.

By virtue of the arrangement described above, operation Of the heater marts which is unnecessary in the air-fuel ratio feedback control in the low and/or intermediate load state is stopped with the air-fuel ratio of the air-fuel mixture charged into the engine being so controlled as to be greater than the stoichiometric ratio (i.e., fuel is lean). When the fresh air is fed into the exhaust system without resorting to the feedback control, the fresh air is heated for enhancing the purification efficiency of the catalyst.

According to a further aspect of the invention directed to the third object mentioned previously, there is provided an exhaust gas purification system for an internal combustion engine, which system comprises a fuel injection means for charging a fuel into the engine, an air feeding means for introducing fresh air into an exhaust pipe of the engine, a heater means for heating the air before being fed into the exhaust pipe, an air-fuel ratio detecting means disposed in the exhaust pipe, a sensor means for detecting engine operation state information including temperature of the engine and rotational speed of the engine, a fuel injection control means for controlling the fuel injection means through a feedback control loop in dependence on an air-fuel ratio detection signal derived from the output of the air-fuel ratio detecting means and operation state information derived from outputs of the sensor means so that air-fuel ratio of an air-fuel mixture undergoing combustion within the engine represents substantially a stoichiometric air-fuel ratio, and a fresh air control means for controlling the air feeding means and the heater means in response to a mode signal supplied from the fuel control means, wherein the fuel control means includes means for generating a mode signal indicating that feedback control of the air-fuel ratio is being executed and a mode signal indicating that the internal combustion engine is in a warming-up state and controls the air-fuel ratio to be slightly higher than the stoichiometric air-fuel ratio in the feedback control mode while controlling the air-fuel ratio to be lower than the stoichlometric air-fuel ratio unless the feedback control is effected, and wherein the fresh air control means drives both of the fresh air feeding means and the heater means when the engine is in the warming-up state and when the air-fuel ratio feedback control is not effected, and drives the fresh air feeding means while inhibiting operation of the heater means when the air-fuel ratio feedback control is not effected and when the engine is not in the warming-up state, whereas when the air-fuel ratio feedback control is being effected, operations of both of the fresh air feeding means and the heater means are inhibited.

With the arrangement described above, the air-fuel mixture charged into the engine is controlled to be lean during the air-fuel ratio feedback control in the low and/or intermediate load state of the engine with the introduction of the fresh or secondary air to the exhaust system being interrupted for the purpose of suppressing discharge of $NO_x$ while when the fresh air is fed to the exhaust system without effecting the air-fuel ratio feedback control, the fresh air is heated only when the engine is in the warming-up state and the catalytic converter is at a low temperature for thereby sparing electric power consumption.

For achieving the fourth object mentioned previously, there is provided according to a fourth aspect of the invention an apparatus for controlling feeding of fresh air to an exhaust gas purification system of an internal combustion engine, which apparatus comprises an upstream catalytic converter disposed in an exhaust pipe of the engine, a downstream catalytic converter disposed in the exhaust pipe at a position downstream of the upstream catalytic converter means in series thereto with interposition of a split portion therebetween, an air pump for taking in fresh air, an air feed pipe for communicating the air pump and the upstream catalytic converter means for introducing the fresh air to the upstream catalytic converter at an upstream side thereof, an air feeding means for introducing air into the exhaust pipe via the split portion, and a heater disposed in the air feed pipe for heating the air supplied from the air pump to thereby introduce heated fresh air into the upstream catalytic converter means.

With the arrangement described above, the fresh air introduced through the air feed pipe from the air pump is heated before being introduced to the upstream catalytic converter. Thus, the engine exhaust gas which is to undergo the catalytic reaction becomes high in oxygen concentration, whereby removal of carbon monoxide (CO) and hydrocarbon (HC) is promoted through the catalytic reaction. Further, the temperature of the exhaust gas is prevented from lowering due to transfer of heat from the heated fresh air, whereby the temperature rise and thus activation of the catalytic converters is promoted.

In a preferred mode for realizing the fourth aspect of the present invention, the second fresh air feed pipe may include a pipe connected at one end thereof to the split portion and provided at the other end with a differential pressure type valve for introducing the fresh air to the split portion in dependence on pressure prevailing within the catalytic converters.

The pressure within the catalytic converter usually varies between positive and negative pressures relative to the atmospheric pressure due to pulsation in the flow rate of the exhaust gas. The differential pressure valve is adapted to open when the pressure within the catalytic converter unit becomes negative (i.e., lower than the atmospheric pressure), whereby the fresh air is introduced into the split portion, which serves for another function for separating the fresh air feed system for the upstream catalytic converter from that for the downstream catalytic converter.

According to the fourth aspect of the invention, there is also provided a method of controlling fresh air feeding to the exhaust gas purification system, which method comprises the step of introducing heated fresh air into the upstream catalytic converter means from a time point succeeding to the start of operation of the engine up to a time point when the upstream catalytic converter is activated.

In the system in which the downstream catalytic converter means includes a three-way catalyst or oxidizing catalyst, the above-mentioned method may comprises the step of introducing fresh air into the downstream by making use of a negative pressure within the upstream catalytic converter means.

By virtue of the control methods described above, CO and HC removal efficiency of the upstream catalytic converter can be enhanced due to introduction of the heated fresh air with the purification efficiency for $NO_x$, CO and HC being promoted after activation thereof. Further, owing to introduction of the fresh air to the downstream catalytic converter by making use of the negative pressure within the exhaust pipe, carbon monoxide (CO) and hydrocarbon (HC) remaining in the exhaust gas exiting the upstream catalytic converter can be removed by the downstream catalytic converter under the excess oxygen state owing to introduction of the fresh air to the downstream catalytic converter which is effected when the pressure within the exhaust pipe is lower than the atmospheric pressure.

In view of the fifth object mentioned hereinbefore, there is provided according to a fifth aspect of the present invention an apparatus for controlling feeding of fresh air into an exhaust pipe of an engine at an upstream side of a catalytic converter disposed in the exhaust pipe, which apparatus comprises an air pump for taking in fresh air, an air supply conduit having one end connected to the air pump, a change-over valve mounted at the other end of the air supply conduit, a first air feeding pipe having one end connected to the change-over valve and the other end connected to the exhaust pipe at a position upstream of the catalytic converter, a second air feeding pipe having one end connected to the change-over valve and the other end connected to the exhaust pipe at a position downstream of the catalytic converter, a heater installed in the first air feeding pipe, and a control means for controlling the change-over valve such that fresh air supplied from the air pump through the air supply conduit is introduced alternately into the first and second air feeding pipe to thereby feed the air alternately to the upstream side and the downstream side of the catalytic converter while controlling air heating operation of the heater when the air is introduced into the exhaust pipe upstream of the catalytic converter.

Furthermore, according to the fifth aspect of the invention, there is provided an apparatus for controlling feeding of fresh air into an exhaust pipe from an upstream side of a catalytic converter disposed in the exhaust pipe, which apparatus comprises an air pump for taking in fresh air, an air supply conduit having one end connected to the air pump, a change-over valve mounted at the other end of the air supply conduit, an air feeding pipe having one end connected to the change-over valve and the other end connected to the exhaust pipe at a position upstream of the catalytic converter, an air discharge pipe having one end connected to the change-over valve and the other end opened to the atmosphere, a heater installed in the air feeding pipe, and a control means for controlling the change-over valve such that fresh air supplied from the air pump through the air supply conduit is introduced into the air feeding pipe and the air discharge pipe in an alternating manner to thereby feed the air periodically to the upstream side of the catalytic converter while controlling air heating operation of the heater when the air is introduced into the exhaust pipe upstream of the catalytic converter.

For achieving the fifth object mentioned hereinbefore, there is further provided according to the invention an apparatus for controlling feeding of fresh air into an exhaust pipe of an engine at an upstream side of a catalytic converter disposed therein, which apparatus comprises an air pump for taking in fresh air, an air supply conduit having one end connected to the air pump, a change-over valve mounted at the other end of the air supply conduit, an air feeding pipe having one end connected to the change-over valve and the other end connected to the exhaust pipe at a position upstream of the catalytic converter, a bypass feeding pipe having one end connected to the air supply conduit at a position upstream of the change-over valve and the other end connected to the air supply conduit at a position upstream of the change-over valve, a heater installed in the air feeding pipe at a location downstream of a junction with the bypass pipe, and a control means for controlling periodically the opening degree of the change-over valve such that fresh air supplied from the air pump is introduced at a flow rate changing periodically into the exhaust pipe from the side upstream of the catalytic converter while controlling air heating operation of the heater for heating the air introduced into the exhaust pipe.

In a preferred mode for realizing the fifth aspect of the invention, the control means may be so designed as to control electric energization of the heater in dependence on the flow rate of the fresh air introduced into the exhaust pipe.

Further, the control means may be so designed that the heater is electrically energized until the temperature of the heater has attained a predetermined level, and thereafter the electric energization of the heater in controlled in dependence on the flow rate of the air introduced to the upstream side of the catalytic converter.

With the arrangements of the air feeding control apparatus according to the fifth aspect of the invention, the purification performance of the catalytic converter can significantly be enhanced by virtue of such feature that the exhaust gas is introduced into the catalytic converter with the oxygen content being periodically changed. Besides, owing to the heating of the air as introduced into the exhaust pipe, the temperature of the exhaust gas is prevented from lowering. Thus, the temperature rise of the catalyst is promoted, whereby the catalyst is activated rapidly. On the other hand, the air introduced into the exhaust pipe downstream of the catalytic converter is effective for cooling the exhaust gas discharged to the atmosphere. Further, owing to control of the electric energization of the heater in dependence on the change in the flow rate of the fresh air introduced into the exhaust pipe upstream of the catalytic converter, the air is protected against excessive temperature rise and maintained substantially constant at a predetermined temperature.

For achieving the sixth object mentioned hereinbefore, there is provided according to an aspect of the invention an apparatus for introducing fresh air into an exhaust gas purification system of an internal combustion engine through a fresh air feeding conduit while heating the air, which apparatus comprises an electric heater disposed in the fresh air feeing conduit for heating the fresh air, a temperature sensor provided in association with the electric heater for detecting temperature of the fresh air at a side downstream of the heater, a comparison means for comparing the detected air temperature with a predetermined temperature value, and a control means for controlling electric power supply to the heater in response to an output of the comparison means indicating that the detected temperature exceeds the predetermined temperature value, to thereby prevent overheating of the electric heater.

Further, for achieving the sixth object, there is provided an apparatus for introducing fresh air into the exhaust system through fresh air feeding conduit while heating the air, which apparatus comprises an electric heater disposed in the fresh air feeing conduit for heating the fresh air, a temperature sensor provided in association with the electric heater for detecting temperature of the fresh air at a side downstream of the heater, a comparison means for comparing the detected air temperature with a first predetermined temperature value and a second predetermined temperature value which is higher than the first predetermined temperature value, and a control means for intermittently interrupting electric power supply to the heater in response to an output of the comparison means indicating that the detected temperature exceeds the first predetermined temperature value, to thereby prevent overheating of the electric heater, while in response to the output of the comparison means indicating that the detected temperature exceeds the second predetermined temperature value, the control means stops power supply to the electric heater.

In a preferred mode for realizing the sixth aspect of the invention, an alarm means such as a lamp, buzzer or the like may be provided for informing driver of occurrence of abnormality.

With the arrangements described above, occurrence of abnormality in the fresh air feeding system can be detected on the basis of the state of the electric heater, whereby appropriate measures to cope with the unfavorable situation of the fresh air feeding system can be taken. Thus, the fail-safe feature of the fresh (secondary) air introducing system and thus that of the exhaust gas purification system can assured with an enhanced reliability.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with the preferred or exemplary embodiments thereof by reference to the drawings.

Embodiment 1

Figure 1:
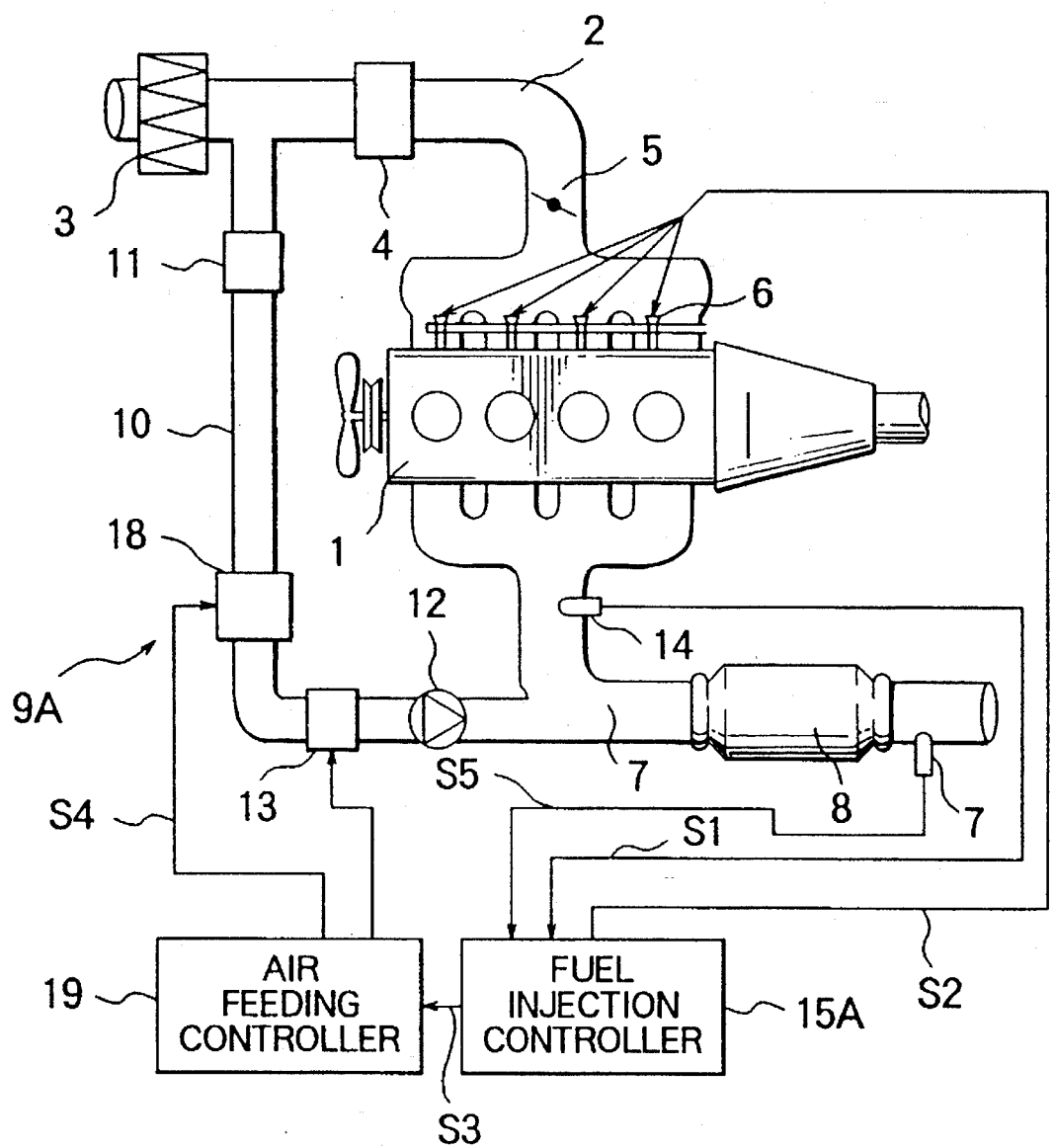
FIG. 1 shows schematically a general arrangement of an internal combustion engine system which is equipped with an apparatus for controlling introduction of fresh air into an exhaust gas purification system according to a first embodiment incarnating the first aspect of the invention.
Figure 27:
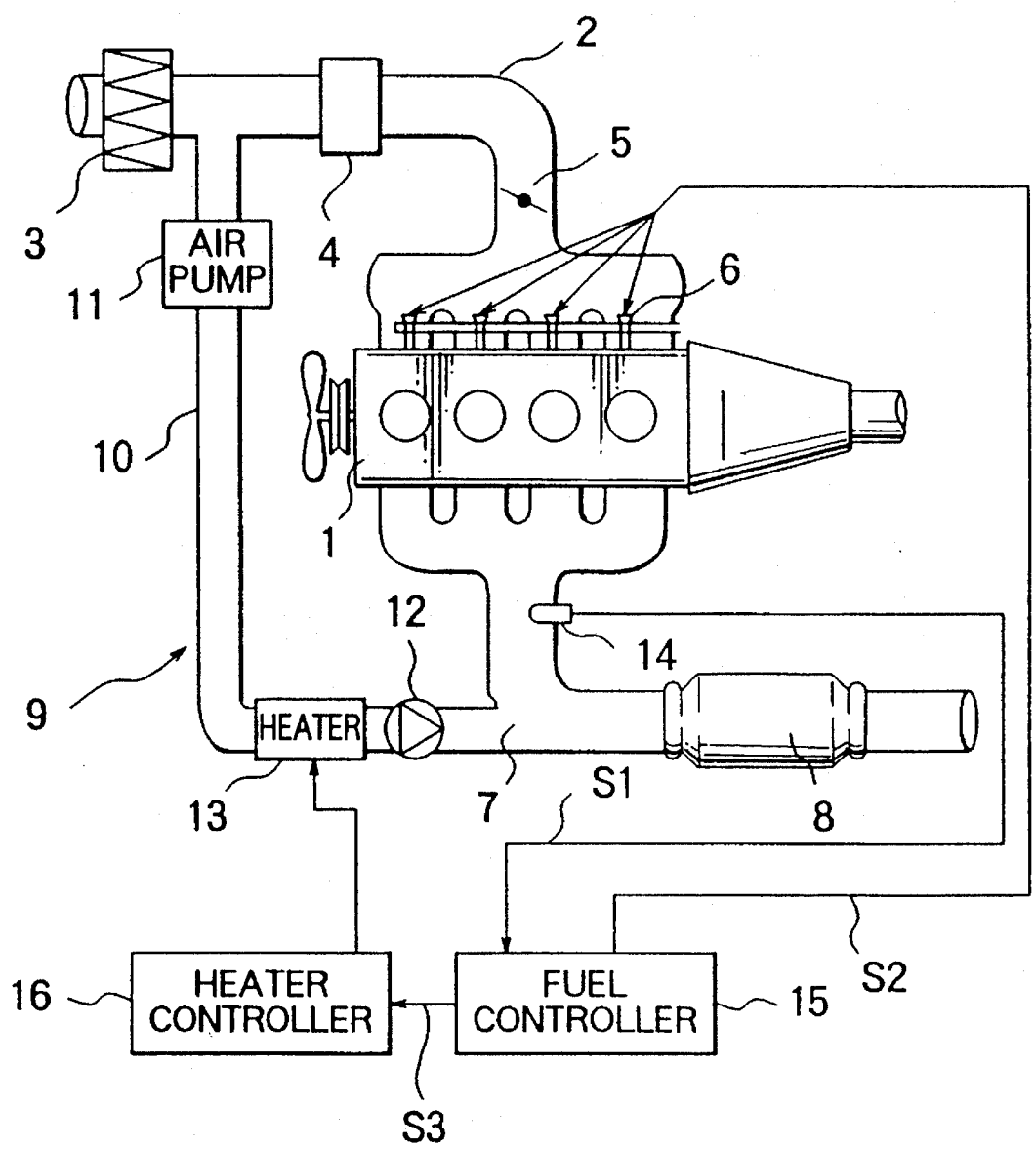
FIG. 27 shows in a block diagram a structure of an internal combustion engine system equipped with an apparatus for controlling an amount of air to be fed into an exhaust pipe known heretofore.

FIG. 1 shows schematically a general arrangement of an internal combustion engine system which is equipped with an apparatus for controlling introduction of fresh air (also referred to as the secondary air) into an exhaust gas purification system embodying the first aspect of the invention. In this figure, reference numerals 1 to 14 denote components same as or equivalent to those denoted by like numerals in FIG. 27 and described hereinbefore. Accordingly, repeated description thereof will be unnecessary. Referring to FIG. 1, there is installed in the exhaust pipe 7 at a position downstream of the catalytic converter 8 is a second air-fuel ratio sensor 17 which serves for detecting concentration of oxygen contained in the exhaust gas discharged through the catalytic converter 8 and which may be constituted by using a same type sensor element as that of the air-fuel ratio sensor 14 mounted in the exhaust pipe 7 upstream of the converter 8. Further, a control valve 18 which constitutes a fresh air feed rate control means in cooperation with a fresh air supply controller 19 described below is disposed in the air feeding pipe 10 at e position downstream of the air pump 11 for the purpose of adjusting or regulating the flow rate of air discharged from the air pump 11 and fed into the exhaust pipe 7. The control valve 18 may be constituted by a duty-cycle control type valve such as an electromagnetic solenoid valve.

The fresh air feeding controller 19 mentioned above serves to determine the flow rate of the air fed into the exhaust pipe 7 in dependence on the operation state parameters of the engine 1 such as load, rotation speed, temperatures and the like, whereby operation of the control valve 18 is controlled in accordance with an air feed rate regulating signal S4 outputted from the controller 19 such that the amount of air flowing through the control valve 18 assumes a predetermined value. Operation of the air feeding controller 19 is triggered by an interrupt signal S3 issued by the fuel controller 15A upon starting of an air-fuel ratio feedback control.

At this juncture, it should be added that the fresh air feeding controller 19 may be implemented integrally with the fuel controller 15A. Parenthetically, the fuel controller 15A serves to determine a basic fuel injection pulse width on the basis of the intake air flow detected by the air flow sensor 4 and the rotation speed of the engine 1, correct the basic pulse width by taking into account the cooling water temperature, and determine finally the injection pulse width by performing an air-fuel ratio feedback correction on the basis of output signals of the air-fuel ratio sensor 14 and 17, respectively, so that the air-fuel ratio of air-fuel mixture charged into the engine assumes a value substantially corresponding to the theoretical or stoichiometrical value (e.g. 14.7). The fuel controller 15A drives the fuel injector 6 by supplying a fuel injection signal S2 representing the air-fuel ratio thus determined.

Figure 2:
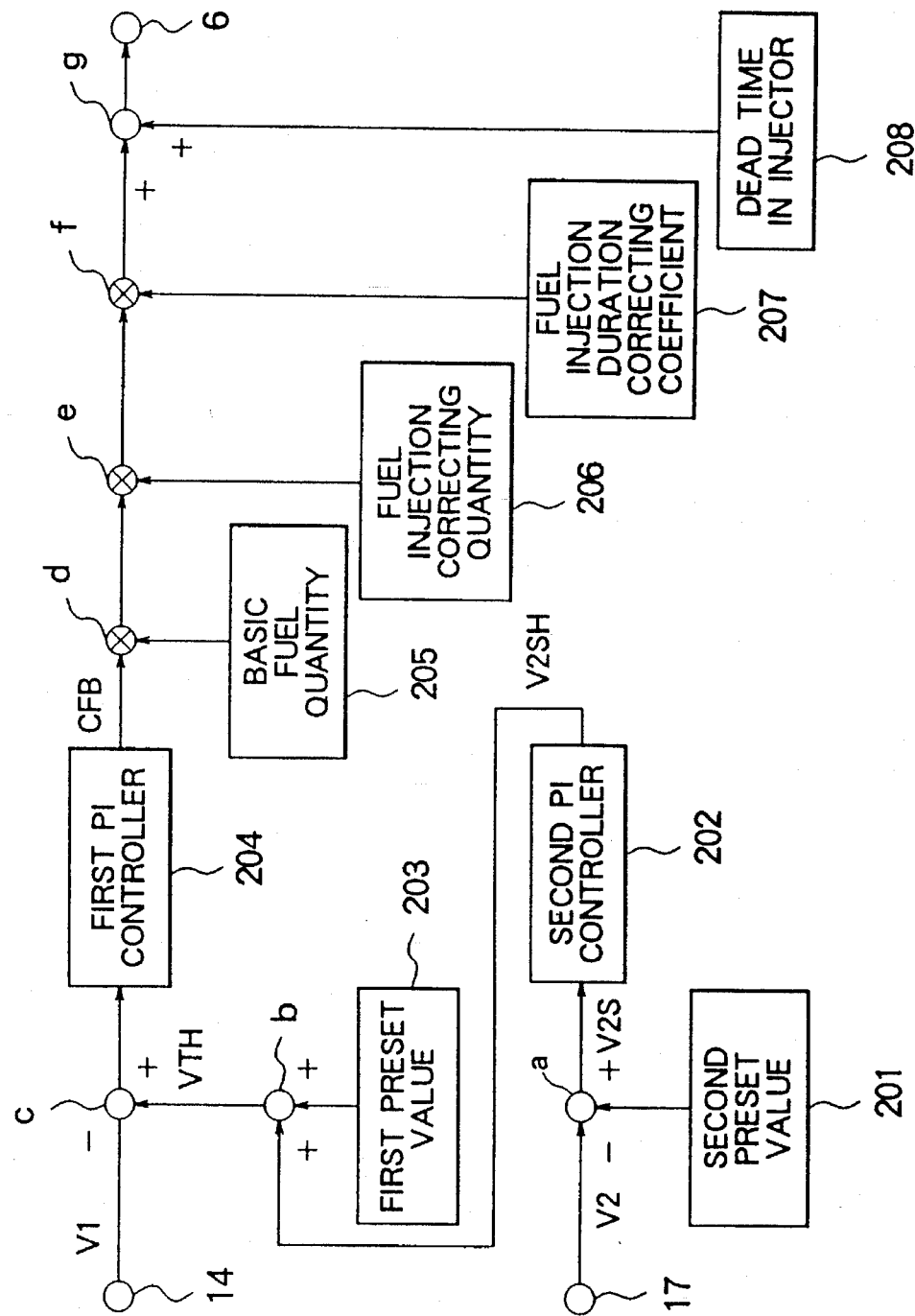
FIG. 2 is a functional diagram for illustrating an air-fuel ratio control carried out in the system shown in FIG. 1.
Figure 3:
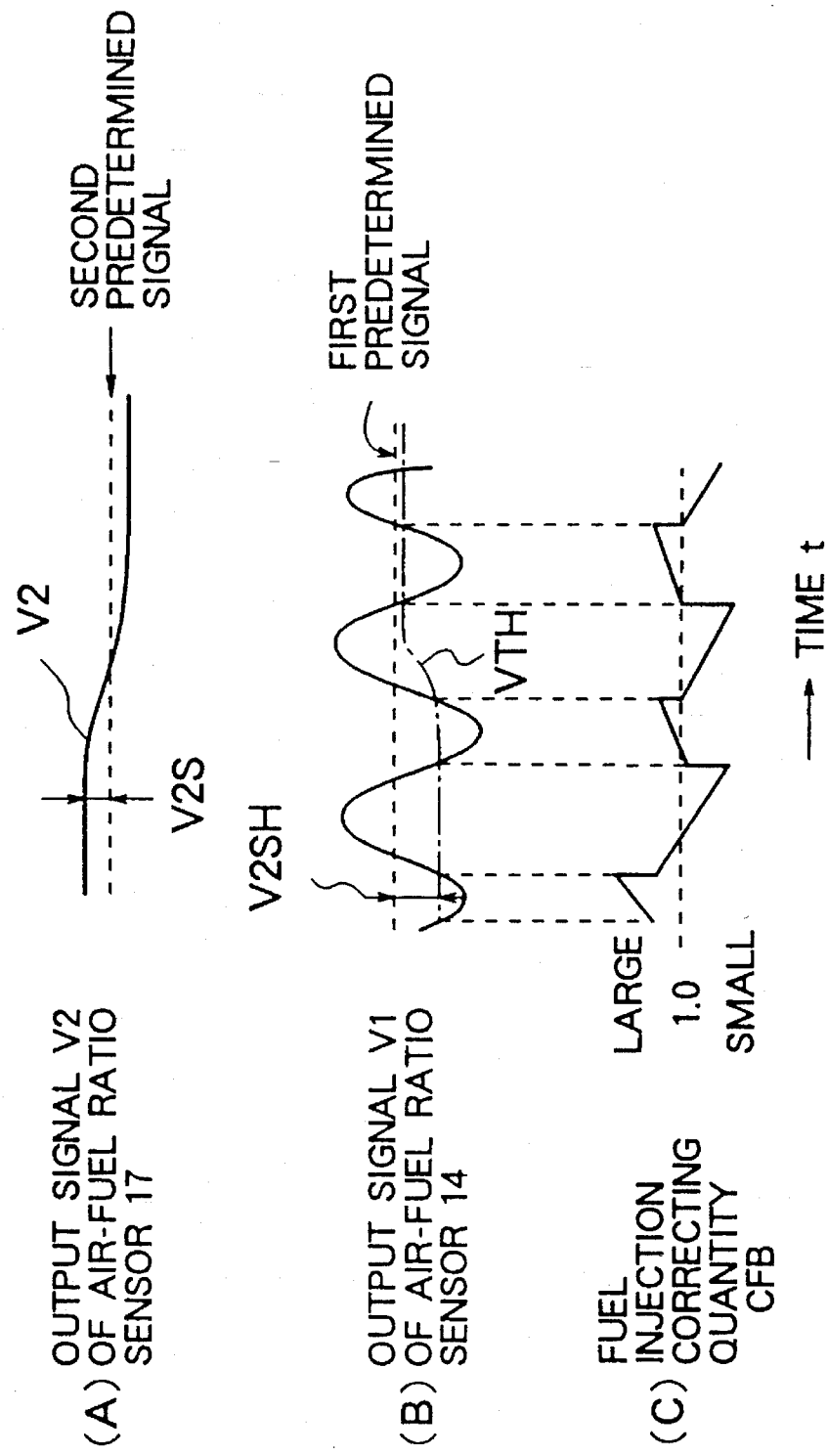
FIG. 3 is a timing chart for illustrating the air-fuel ratio control.

Next, description will turn to the air-fuel ratio control operation of the fresh air feed control apparatus for the exhaust gas purification/discharge system by referring to FIGS. 2 and 3, wherein FIG. 2 is a functional diagram for illustrating the air-fuel ratio control according to the invention and FIG. 3 is a graphical representation illustrating the characteristics of the air-fuel ratio sensors 17 and 14 together with a fuel injection correcting quantity signal (CFB). Referring to FIG. 2, a block 201 represents a hold means such as a memory for holding a preset target value to be attained through the air-fuel ratio control (a second predetermined value). An adder a compares the output signal V2 of the air-fuel ratio sensor 17 with that of the hold means 201 to thereby output a deviation or difference V2S on the basis of which a second PI (proportional-plus-integral) controller 202 outputs a correcting signal V2SH. A block 203 represents a hold means for holding a first preset value which is added to the correcting signal V2SH by a second adder b, wherein the output of the adder b is used as a threshold value VTH (FIG. 3, B) for determining a correcting quantity CFB, as described below.

The output signal V1 of the air-fuel ratio sensor 14 is compared with the threshold value VTH by an adder c. On the basis of the result of this comparison, the aforementioned correcting CFB used for correcting the air-fuel ratio feedback control quantity is determined by a first PI (proportional-plus-integral) controller 204.

The output signal of the first PI controller 204 representing the feedback correcting quantity CFB has such a waveform as illustrated in FIG. 3 at (C). As can be seen, the correcting quantity signal CFB assumes a peak level and a bottom level every time the output signal V1 of the air-fuel ratio sensor 14 intersects the threshold level VTH. In other words, the period of the feedback correcting quantity signal CFB has a period which is substantially identical with that of the output signal V1 of the air-fuel ratio sensor 14.

Subsequently, in a multiplier d, the correcting quantity CFB is multiplied by a basic fuel quantity (block 205) which is calculated on the basis of the intake air flow rate detected by the air flow sensor 4. The product signal outputted from the multiplier d is then corrected with a fuel injection correcting quantity (block 206), whereby the ultimate fuel injection quantity is determined. Parenthetically, the fuel injection correcting quantity 206 is calculated by taking into account the warming-up state of the engine 1 on the basis of the output data of a water temperature sensor (not shown) and/or acceleration/deceleration level of the motor vehicle determined on the basis of the output signal of a throttle position sensor (not shown). The fuel injection quantity signal outputted from the multiplier e is then utilized for determining the driving duration of the injector 7. More specifically, the fuel injection quantity outputted from the multiplier e is multiplied by an fuel injection duration correcting coefficient (block 207) in a multiplier f, whereby the former is converted into a temporal duration for which the fuel injector is to be driven. Finally, the fuel injector driving duration quantity outputted from the multiplier f is corrected with an idle time (block 208) involved in operation of the fuel injector 6 by means of an adder g to be subsequently used for controlling the duration for which the fuel injector 6 is actuated. In this manner, the fuel ratio control is effected on the basis of the output signal of the air-fuel ratio sensor 14 by correcting it with the output signal of the air-fuel ratio sensor 17 as well as other signals derived from the variation engine operation state sensors.

Through the procedure described above, the air-fuel ratio is so controlled that the output signal of the air-fuel ratio sensor 17 installed in the exhaust gas pipe 7 downstream of the catalytic converter is maintained substantially constant at a predetermined level (see FIG. 3, (A)). More specifically, when the output level of the air-fuel ratio sensor 17 assumes a value indicating that the air-fuel mixture charged into the engine is lean, the driving duration of the fuel injector 6 is increased so that the air-fuel mixture becomes rich and vice versa. Thus, it is safe to say that the air-fuel ratio control is essentially effected on the basis of the output signal of the air-fuel ratio sensor 14 disposed upstream of the catalytic converter 8 by correcting the same with the value indicated by the output signal of the air-fuel ratio sensor 17 disposed downstream of the catalytic converter 8.

Figure 4:
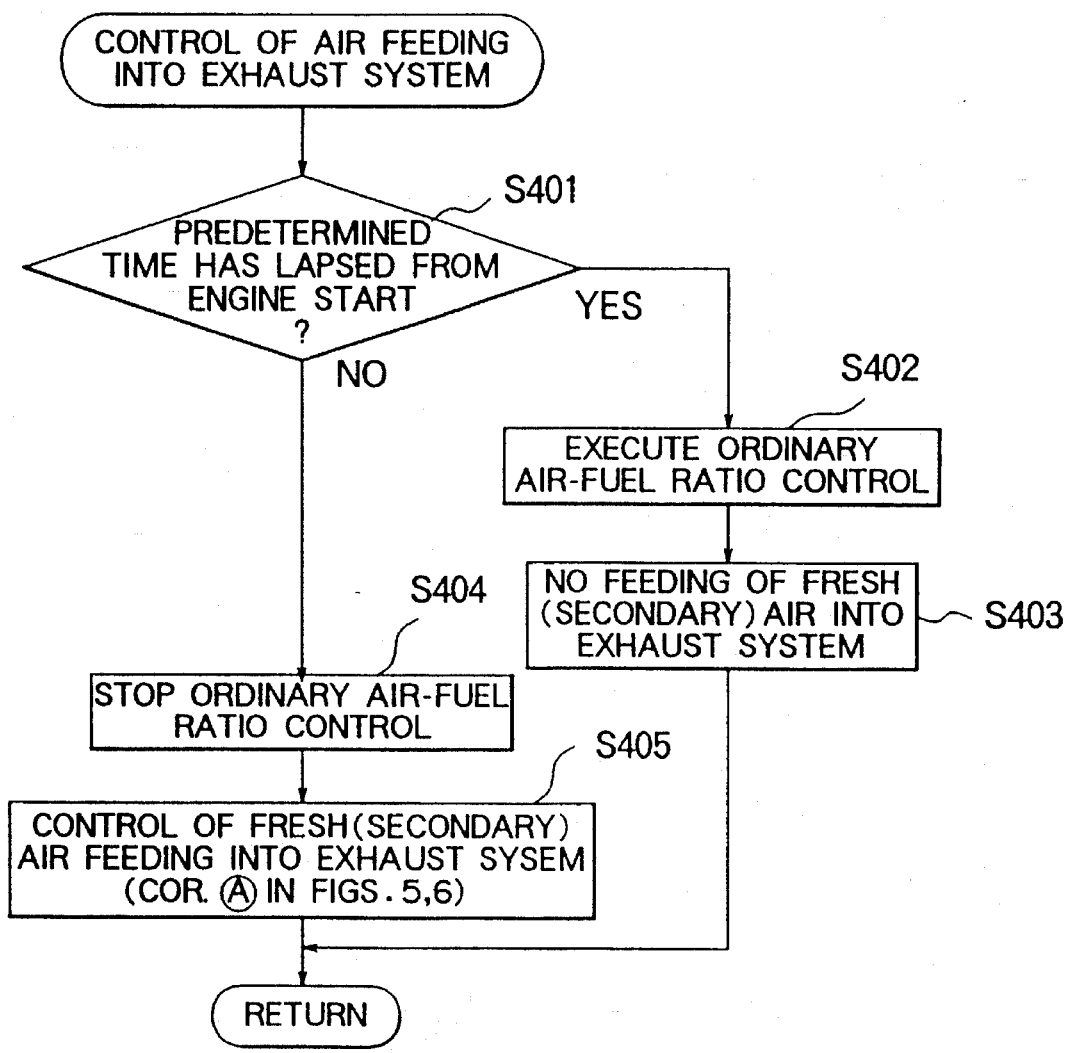
FIG. 4 is a flow chart for illustrating a procedure for controlling feeding of fresh air into an exhaust pipe of an engine.
Figure 5:
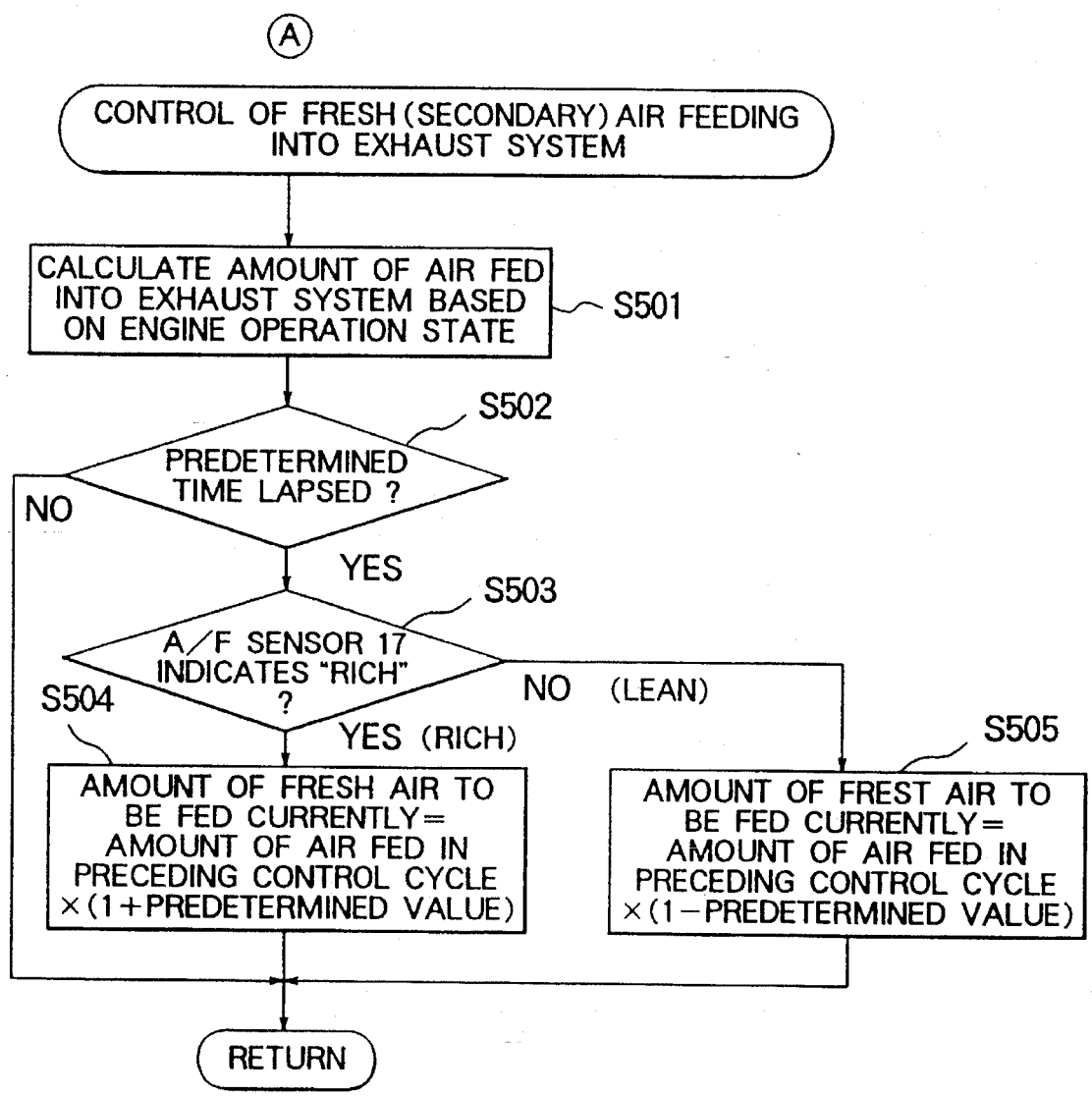
FIG. 5 is a flow chart for illustrating control of flow rate of fresh air fed into the exhaust pipe.

Next, description will be directed to the operation for controlling the amount of air to be introduced into the exhaust gas purification system after heating by the heater 13 by making use of the output of the air-fuel ratio sensor 17 by reference to FIGS. 4 and 5.

First referring to FIG. 4, it is decided in a step S401 whether a predetermined time has lapsed after starting of the engine. This predetermined time is so selected as to be sufficient for the catalyst of the catalytic converter 8 to be capable of performing the exhaust gas purification satisfactorily. Incidentally, the time required for the catalyst to become sufficiently active varies in dependence on the engine operation state. Accordingly, the predetermined time mentioned above may preferably be modified so as to reflect the engine state from which the engine operation is started. When the decision step S401 results in affirmation (YES), this means that the catalyst of the converter 8 is fully active. Accordingly, in a step S402, the ordinary air-fuel ratio control described hereinbefore is carried out. Thus, in a step S403, introduction of the fresh air into the exhaust gas purification system is inhibited (i.e., the amount of the fresh air to be fed into the exhaust pipe is zero).

On the other hand, when it is decided in the step S401 that the predetermined time has not yet lapsed, this means that the catalyst is not in the state to effectuate the gas purification satisfactorily, i.e., the purification efficiency is still low. In this case, it is necessary to raise the catalyst temperature through oxidation reaction of CO and HC. Under the circumstances, in a step S404, the air-fuel ratio control based on the output signals of both the air-fuel ratio sensors 14 and 17 is invalidated and the feedback control of the air-fuel ratio based only on the output of the air-fuel ratio sensor 14 or an air-fuel ratio open-loop control based on the engine operation state is effectuated. In a step S405, the fresh air feeding control is varidated. At this junction, it should also be mentioned that although the decision as to the gas purification capability of the catalytic converter 8 in the step S401 is made on the basis of the time lapse from the start of the engine operation, the decision to the same effect may equally be realized by providing a temperature sensor in combination with or in the vicinity of the catalytic converter 8 and detecting whether or not the catalytic converter 8 has reached a predetermined temperature indicating capability of exhaust gas purification with a sufficient efficiency.

Next, by reference to FIG. 5, description will be made of the fresh air feeding control in more detail. In a step S501, the amount of the fresh or secondary air to be fed or introduced into the exhaust gas purification system including the catalytic converter 8 is arithmetically determined in dependence on the engine operation state so that transfer of heat to the catalyst and the oxidation reaction can be effected optimally. However, with the predetermined amount of the air feeding, it is in determinative whether or not the heat transfer to the catalyst is effected to be optimal for the oxidization reaction. Accordingly, in the steps which follow, it is determined on the basis of the output signal of the air-fuel ratio sensor 17 disposed downstream of the catalytic converter 8 whether the catalytic reaction is carried out properly, whereon the control of the amount of air to be fed into the exhaust pipe 7 is performed on the basis of the result of the above decision.

In a step S502, it is decided whether a predetermined time, e.g. 0.1 sec. has lapsed from the start of engine operation. When the answer of this step S502 is negative (NO), the processing returns to the start step A. If otherwise, a step S503 is executed, wherein the output signal of the air-fuel ratio sensor 17 is monitored and decision is made on the basis of the output of the air-fuel ratio sensor 17 whether the air-fuel ratio indicates the air-fuel mixture injected into the engine is rich or lean. When the air-fuel mixture is decided to be rich, the processing proceeds to a step S504 where it is determined that the above decision is ascribable to the fact that the amount of the air fed into the exhaust gas purification system is insufficient, and the amount of the fresh air as fed is increased in accordance with the following expression:

Amount of fresh air to be fed currently=amount of air fed in preceding control cycle×(1+predetermined value)   (1)

On the other hand, when it is decided that the output of the downstream air-fuel sensor 17 indicates "lean", the processing proceeds to a step S505 where it is decided that the leanness is ascribable to an excessive amount of the air feeding, whereby the amount of the fresh air introduced currently into the exhaust gas purification system is decreased in accordance with the following expression:

Amount of fresh air to be fed currently=amount of air fed in preceding control cycle×(1−predetermined value)   (2)

Through the processing described above, the amount of the fresh air feeding is controlled on the basis of the output signal of the air-fuel ratio sensor 17 so that the optimal catalytic reaction can take place.

Instead of increasing or decreasing the amount of air feeding in accordance with the above-mentioned expression (1) or (2), incrementation or decrementation of the air feed amount by a predetermined value will result in similar effects. However, by using the correcting quantity in the form of coefficient, as mentioned above, error attributable to variance in the engine operation state can more easily be compensated for, to further advantage. Further, although it has been described that the amount of fresh air to be fed into the exhaust system is decreased when the output of the air-fuel sensor indicates "lean", the former may be maintained as it is even when the output of the sensor 17 indicates "lean", in order to promote the oxidation reaction for CO and HC. Further, although the fresh air feeding control has been described on the assumption that the air as introduced is preheated, it goes without saying that similar air feed control can be accomplished even in the case where the feed air is not heated.

Embodiment 2

In the case of the first embodiment described above, the air-fuel ratio sensor 17 disposed downstream of the catalytic converter 8 is realized in the form of a λ-type $O_2$-sensor, which is only capable of detecting whether the air-fuel ratio is lower or higher than the stoichiometric ratio. Consequently, information derived from the output of the air-fuel ratio sensor 17 can indicate simply whether the air-fuel mixture is lean or rich. With the second embodiment of the invention, it is contemplated to promote more effectively and optimally the purifying operation of the catalytic converter 8. To this end, it is proposed according to the instant embodiment to use a linear type $O_2$-sensor such as typified by a marginal current control type $O_2$-sensor for detecting the $O_2$-content of the exhaust gas on the basis of which the amount of the fresh air to be introduced into the exhaust gas purification system is to be controlled.

A fresh air feeding control by using the linear type $O_2$-sensor as the air-fuel ratio sensor 17 will be described by reference to FIG. 6. First, in a step S601, the amount of fresh air to be introduced into the exhaust pipe 7 is calculated in dependence on the engine operation state, as in the case of the step S502 shown in FIG. 5. Subsequently, in a step S602, a target air-fuel ratio is calculated in dependence on at least one of data indicating the engine speed (rpm), engine load and/or the warming-up state.

Next, in a step S603, it is decided whether or not a predetermined time has elapsed. If the answer of this decision step S603 is negative (NO), the processing returns to the start step because it is impossible to detect any change in the air-fuel ratio as brought about through the fresh air feeding control. On the other hand, when the predetermined time has lapsed, the processing proceeds to a step S604 where the air-fuel ratio is detected at the downstream side of the catalytic converter 8. Next, in a step S605, difference between the target air-fuel ratio determined in the step S602 and the air-fuel ratio detected in the step S604 is determined for effecting the fresh air feeding control in dependence on this difference or deviation.

In a succeeding step S606, it is checked whether the sign of the aforementioned difference or deviation is plus or minus. If it is plus (positive), this means that the air-fuel ratio detected downstream of the catalytic converter 8 indicates that the air-fuel mixture is rich when compared with that indicated by the target ratio. Accordingly, the processing proceeds to a step S607 to increase the amount of fresh air introduced into the exhaust gas purification system in accordance with the result of the arithmetic operation described hereinbefore in conjunction with the step S504 shown in FIG. 5. On the other hand, in case the above-mentioned difference is of a negative or minus value, this means that the air-fuel ratio detected downstream of the catalytic converter 8 indicates "lean" when compared with that indicated by the target ratio. Consequently, in a step S608, the amount of fresh air fed into the exhaust pipe 7 is decreased in accordance with the result of the arithmetic operation described hereinbefore in conjunction with the step S505 shown in FIG. 5.

Through the procedure described above, the air-fuel ratio of the exhaust gas as detected downstream of the catalytic converter 8 is controlled so as at least approximately to be equal to the target value by controlling the amount of fresh air introduced into the exhaust pipe 7. In the steps S606 to S608, decision is made only as to whether the deviation is of plus or minus sign. It should however be appreciated that a dead zone may be set established that the amount of fresh air is not varied when the detected air-fuel ratio lies within the dead zone, to thereby improve the control performance.

Embodiment 3

The first and second embodiments are directed to the control of the air feeding which is based on the air-fuel ratio detected by the air-fuel ratio sensor 17 disposed downstream of the catalytic converter 8 within the exhaust pipe 7. The third embodiment incarnating the first aspect of the invention is directed to detection of occurrence of abnormality in the fresh air feeding control system. Thus detection is carried out when the fresh air feeding control described previously by reference to FIGS. 4 to 6 is being carried.

Figure 7:
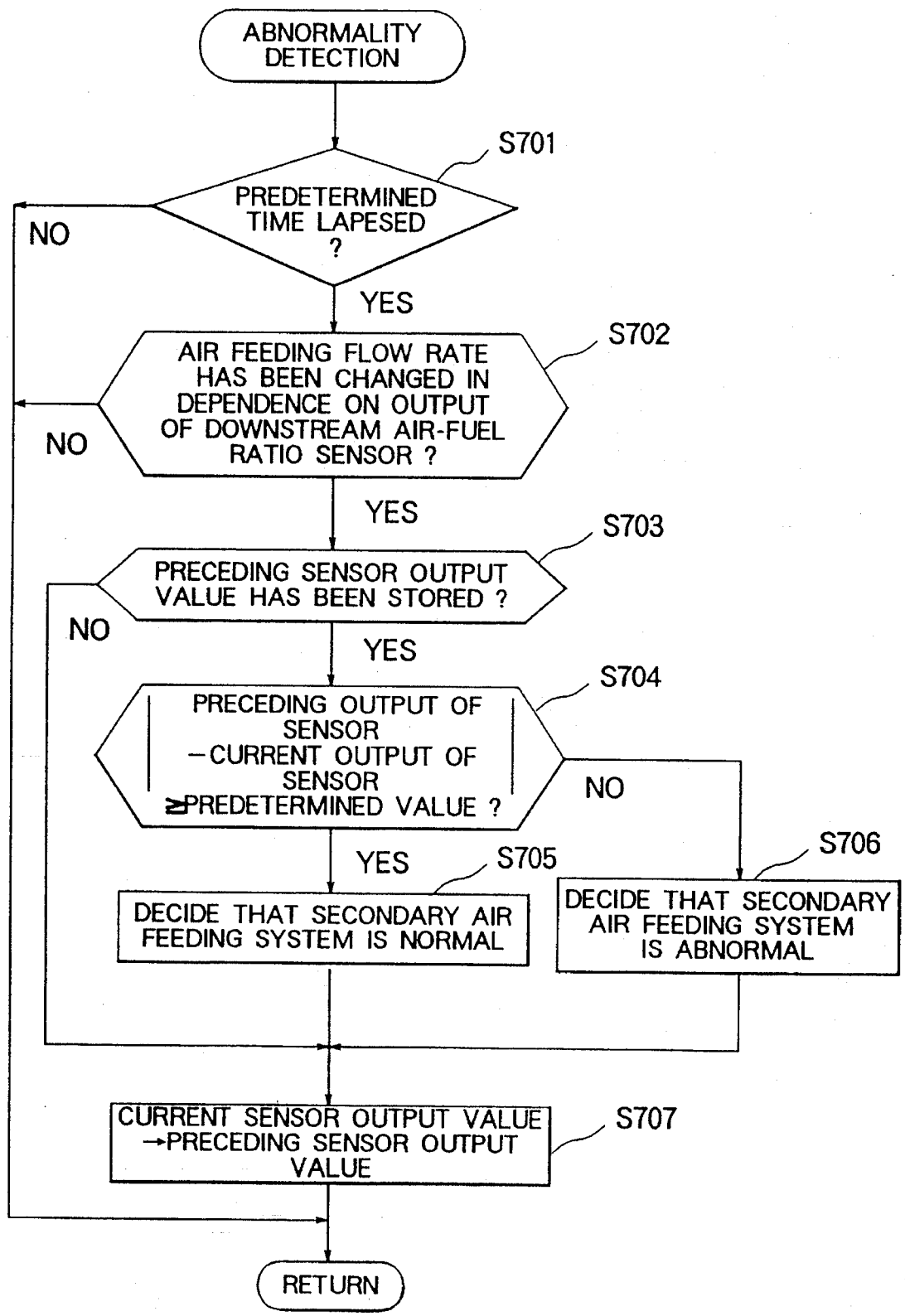
FIG. 7 is a flow chart illustrating a procedure for detecting abnormality in the fresh air feeding control system according to a third embodiment incarnating the first aspect of the invention.

Now, reference is made to FIG. 7. In a step S701, it is determined whether a predetermined time has lapsed after the start of the engine. When this decision step S701 results in negative (NO), it may duly be regarded that the air-fuel ratio of the gas mixture indicated by the output of the sensor 17 disposed downstream of the catalytic converter 8 undergoes no change even when the amount of the fresh air feed into the exhaust pipe 7 is varied. Thus, the processing returns to the start. If otherwise, it is checked in a step S702 whether the fresh air feeding control based on the air-fuel ratio has been performed before lapse of the predetermined time.

If the answer of the step S702 is negative (NO), the processing returns to the start because it is considered that no change took place in the output of the downstream catalytic converter 8 before lapse of the predetermined time. If otherwise (i.e., when the step S702 results in "YES"), processing steps S703 et seq. are executed for detecting the change in the $O_2$-content of the gas mixture downstream of the catalytic converter 8 during the predetermined period.

To this end, it is checked in a step S703 whether a value of the air-fuel ratio sampled in a preceding routine cycle (this value is referred to as the preceding value) is stored in a memory to thereby determine whether the air-fuel ratio has been detected downstream of the catalytic converter 8 before lapse of the aforementioned predetermined time. Unless the preceding value is stored, the processing proceeds to a step S707 where the air-fuel ratio detected currently is stored as a value to serve as a preceding value. On the other hand, when the preceding value has been stored, a step S704 is executed to determine difference between the stored value (i.e., the air-fuel ratio detected in the preceding routine) ad the air-fuel ratio detected currently, which is then followed by decision as to whether the difference (i.e., change of the air-fuel ratio) exceeds a predetermined reference value. If so, it is then determined that the fresh air feeding system operates normal, because the change in the air-fuel ratio can be ascribed to the change in the amount of fresh air fed into the exhaust pipe 7. Thus, the reference value used in the decision step S704 may be so determined previously as to correspond to a change in the air-fuel ratio brought about by a standard change in the amount of fresh air as fed.

On the other hand, when the difference or change in the air-fuel ratio mentioned above is decided smaller than the predetermined value, it is then determined in a step S706 that some trouble is taking place in the fresh air feeding system.

In this conjunction, it should be appreciated that the occurrence of fault in the fresh air feeding system may be determined when the result of the decision step S706 indicates abnormality successively over a predetermined number of times. In that case, reliability of the abnormality decision can correspondingly be enhanced.

In a succeeding step S707, the detected air-fuel ratio value is updated as described preciously, As can be seen from the above, it is possible to detect occurrence of fault or abnormality in the fresh air feeding system on the basis of change in the output of the air-fuel sensor 17 disposed downstream of the catalytic converter 8.

Embodiment 4

Figure 6:
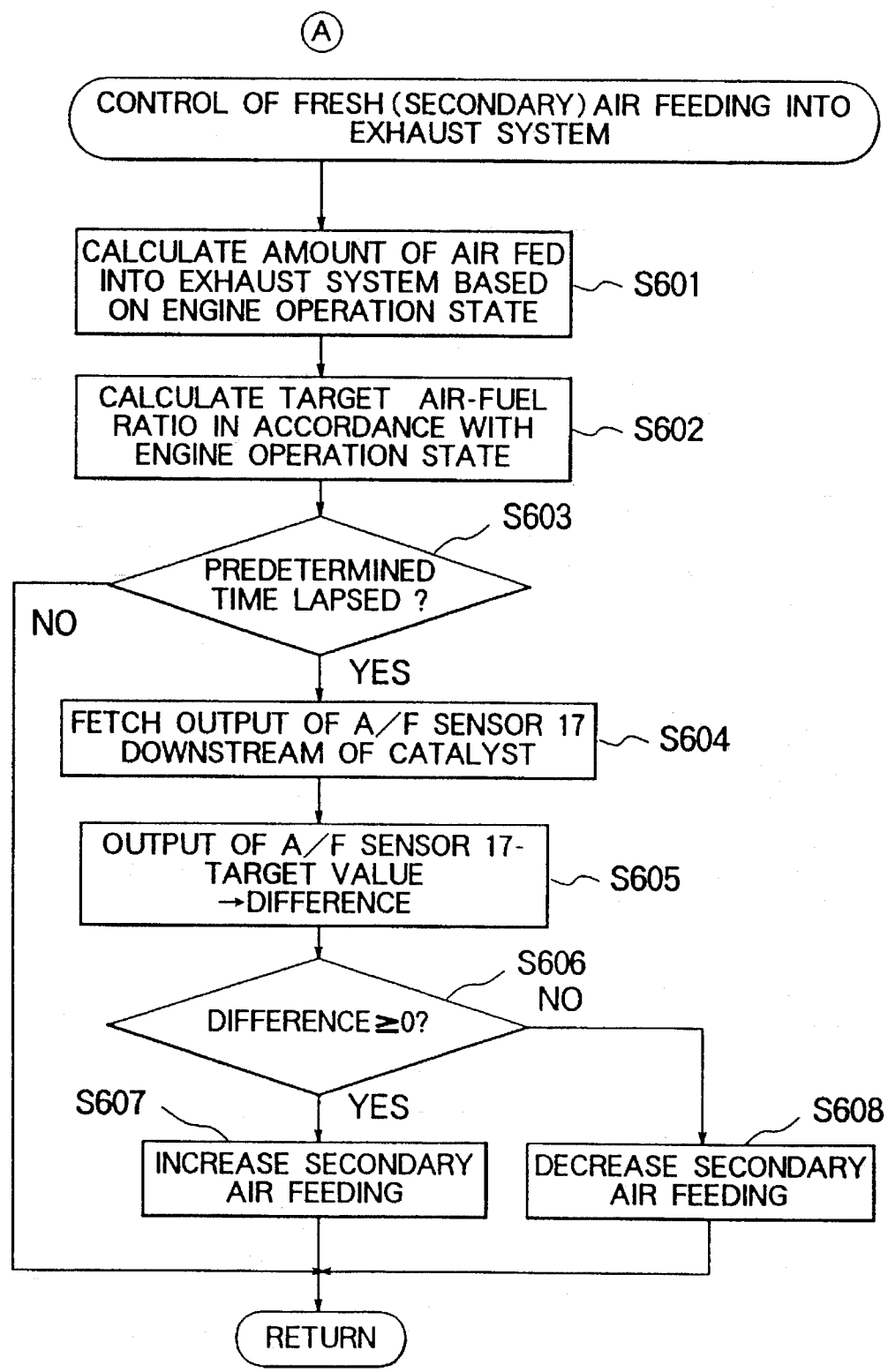
FIG. 6 is a flow chart illustrating a fresh air feeding control according to a second embodiment which incarnates the first aspect of the present invention.
Figure 8:
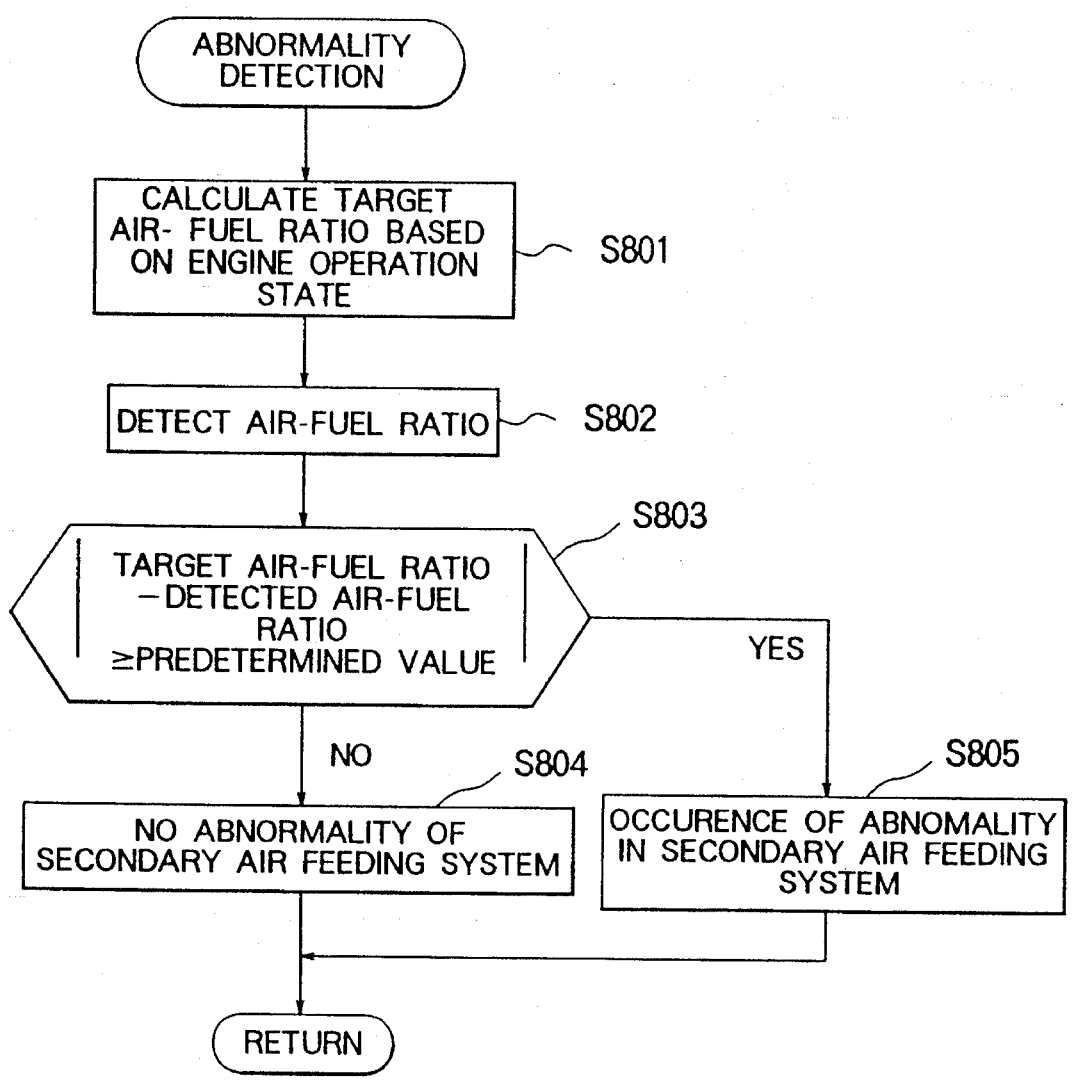
FIG. 8 is a flow chart illustrating a procedure for detecting abnormality in the fresh air feeding control system according to a fourth embodiment incarnating the first aspect of the invention.

A fourth embodiment incarnating the first aspect of the invention is directed to a method for detecting occurrence of abnormality in the fresh air feeding system independent of whether or not the fresh air feeding control described hereinbefore by reference to FIGS. 4 to 6 is carried out. This embodiment will be described by reference to FIG. 8. In a step S801, the target air-fuel ratio is determined on the basis of the engine operation state. So long as the fresh air feeding system operates normally, the output of the air-fuel ratio sensor 17 disposed downstream of the catalytic converter 8 must indicate at least approximately the target value mentioned hereinbefore. Accordingly, in a step S802, the output of the air-fuel ratio sensor 17 is fetched to determine in a step S803 whether or not difference between the air-fuel ratio indicated by the sampled output of the air-fuel ratio sensor 17 and the target air-fuel ratio exceeds a predetermined reference value. If the difference is smaller than the reference value, it is then determined in a step S804 that the fresh air feeding system operates normally. If otherwise, it is decided that the fresh air feeding system suffers from some trouble.

In conjunction with the instant embodiment, it will readily be understood that the predetermined reference value mentioned above may be varied in dependence on the engine operation state. Further, the abnormality decision may be made when the abnormal state is detected repetitively a predetermined number of times.

Through the procedures described above in conjunction with the third and fourth embodiments, abnormality detection can be carried out on the basis of the output signal of the air-fuel ratio sensor 17 disposed downstream of the catalytic converter 8.

Embodiment 5

Figure 9:
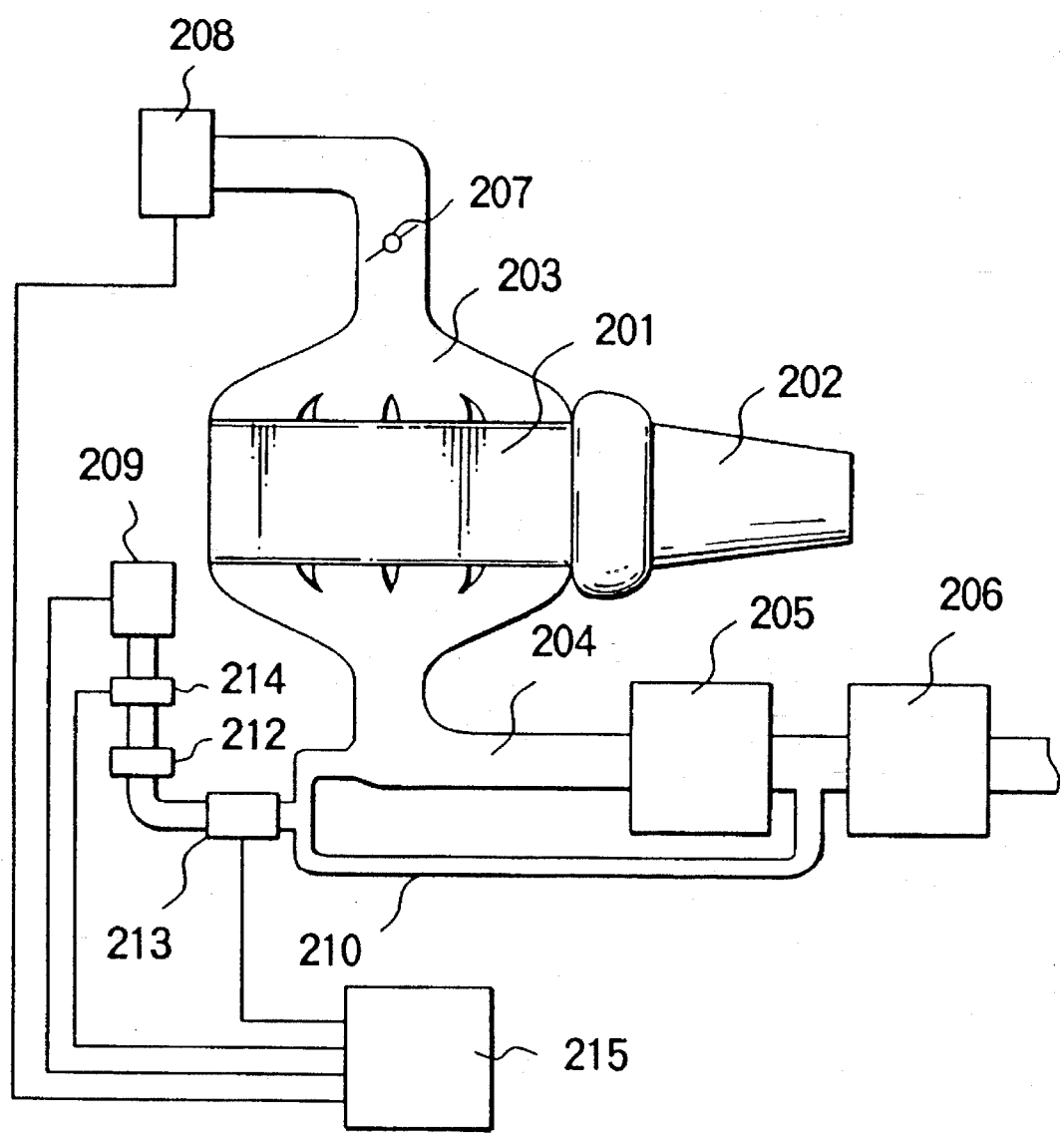
FIG. 9 is a schematic diagram showing a structure of a fresh air feeding apparatus for feeding air into an exhaust pipe of an engine according to a fifth embodiment sixth embodiment, and seventh embodiment incarnating the second aspect of the present invention.
Figure 28:
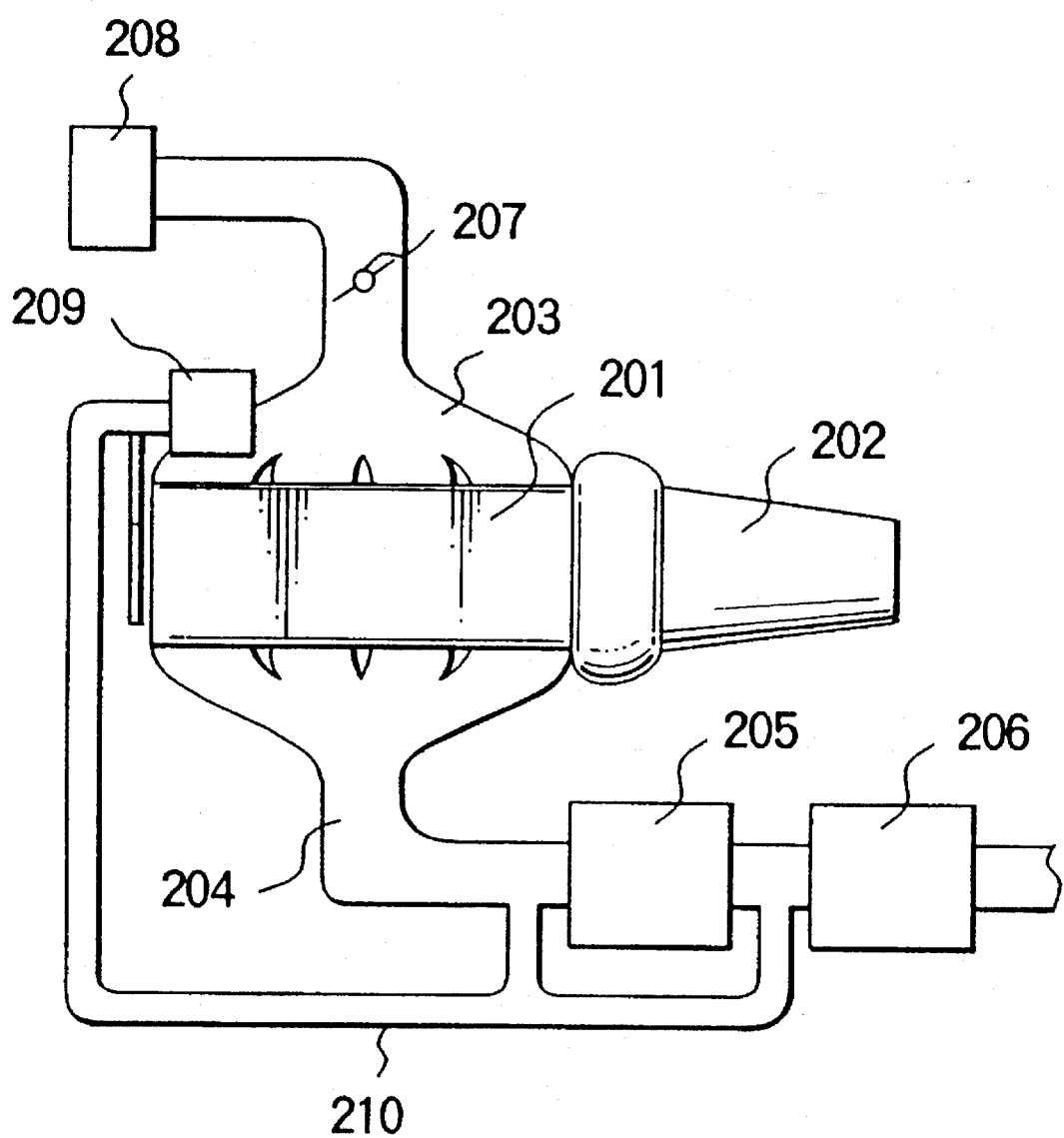
FIG. 28 is a schematic diagram showing a structure of an internal combustion engine equipped with an exhaust gas purification system known heretofore.

FIG. 9 is a schematic diagram showing a structure of a fresh air feeding apparatus for feeding air into an exhaust pipe of an engine according to a fifth embodiment which incarnates the second aspect of the invention. In the figure, parts same as or equivalent to those shown in FIG. 28 are designated by like reference numerals. Thus, repeated description thereof will be unnecessary.

In the case of the instant embodiment, an intake air flow sensor for detecting the amount of air taken in by the engine 201 is incorporated in the air cleaner 208. Further, the fresh (or secondary) air feeding pipe 210 is connected to the exhaust pipe 204 at two positions, i.e., at a fist position upstream of the reduction catalytic converter 205 and at a second position upstream of the oxidation catalytic converter 206. The air pump 209 is mounted at the top or distal end of the fresh air feeding pipe 210. A control valve 214 and a check valve 212 are installed in the air feeding pipe 210 in this order as viewed in the air flow direction.

Further, an electric heater 213 is provided in the air feeding pipe 210 downstream of the check valve 212. A controller 215 is in charge of controlling the air pump 209, the control valve 214 and the heater 213.

Next, description will be made of operation of the engine system shown in FIG. 9.

When the engine 201 is started, the exhaust flows through the exhaust pipe 204, during which noxious gas components such as hydrocarbon (HC), carbon oxide (CO), and nitrogen oxides ($NO_x$) are removed through the reduction catalytic converter 205 and the oxidation catalytic converter 206.

On the other hand, at the same time with the start of the engine 201 or after lapse of a predetermined time from the start of the engine, the air pump 209 is put into operation, and the fresh air discharged from the air pump 209 is introduced into the exhaust pipe 204 by way of the fresh air feeding pipe 210 via the control valve 214, the check valve 212 and the heater 213 in this order.

The fresh air is maintained at a proper flow rate by means of the control valve 214 and heated upon passing through the heater 213. Operation of the heater 213 is so controlled that the temperature of the heated air is hither than that of the exhaust gas discharged from the engine immediately after the start of the engine. More specifically, the fresh air is heated to a temperature which lies within a range of 300° C. to 400° C.

In the engine cold start mode, concentrations of CO and HC contained in the exhaust gas are relatively high. Thus, during the cold start operation, there are available sufficient amounts of reactants CO and HC for removing $NO_x$ through reduction under the catalytic action of the converter 205. In other words, degradation in the activity of the reduction catalyst mentioned hereinbefore in conjunction with the prior art by reference to FIG. 28 is prevented.

Additionally, owing to the feeding of the fresh air to the catalytic converter 206, removal of CO and HC from the exhaust gas through oxidation reaction is promoted. In particular, by virtue of such arrangement that the fresh air is heated by the heater 213 from a time point immediately after the engine start, i.e., during the engine cold state, the oxidation catalytic converter 206 can readily be activated in an earlier stage of the engine operation, whereby the exhaust gas purification can be promoted.

Embodiment 6

The sixth embodiment of the invention incarnating the second aspect of the invention is directed to the control of the heater 213 such that electrical energization of the heater 213 is stopped when the engine temperature exceeds a predetermined level. To this end, a temperature sensor (not shown) for detecting the engine temperature is provided in combination with a comparison means for comparing the output of the temperature sensor with a preset value representing a predetermined temperature of the engine. When the engine is started from the cold state and warmed up to a temperature which exceeds the predetermined level, the heater 213 is electrically deenergized. The control for turning on/off the heater 213 can of course be effected by the controller 215. In this manner, the heater 213 is prevented from operating when the catalysts are sufficiently activated, which is apparently advantageous from the standpoint of low power consumption.

Embodiment 7

According to the concept of the invention incarnated in the seventh embodiment also embodying the second concept of the invention, the air flow signal outputted from the air flow sensor incorporated in the air cleaner 208 is supplied to the controller 215 which is so designed as to calculate an optimal amount of secondary air to be introduced into the exhaust gas purification system on the basis of the output of the air flow sensor (which indicates the amount of intake air supplied to the engine 201), wherein the opening degree of the control valve 214 is controlled in dependence on the result of the calculation. In this case, the amount of the secondary or fresh air to be fed to the exhaust gas purification system can be controlled to be optimal for realizing satisfactory purification of the engine exhaust gas.

As a modification of the instant embodiment, the amount of the exhaust gas may be calculated by the controller 215 on the basis of the amount of fuel supplied to the engine, while the amount of the secondary air to be introduced into the engine exhaust system may be determined on the basis of the amount of the exhaust gas as determined.

At this juncture, it should be mentioned that the controller 215 employed in the various embodiments of the invention may be implemented by a micro-computer programmed for performing the controls described above, which is however within the skill of those having ordinary knowledge in this field and thus description will be unnecessary.

Embodiment 8

Figure 10:
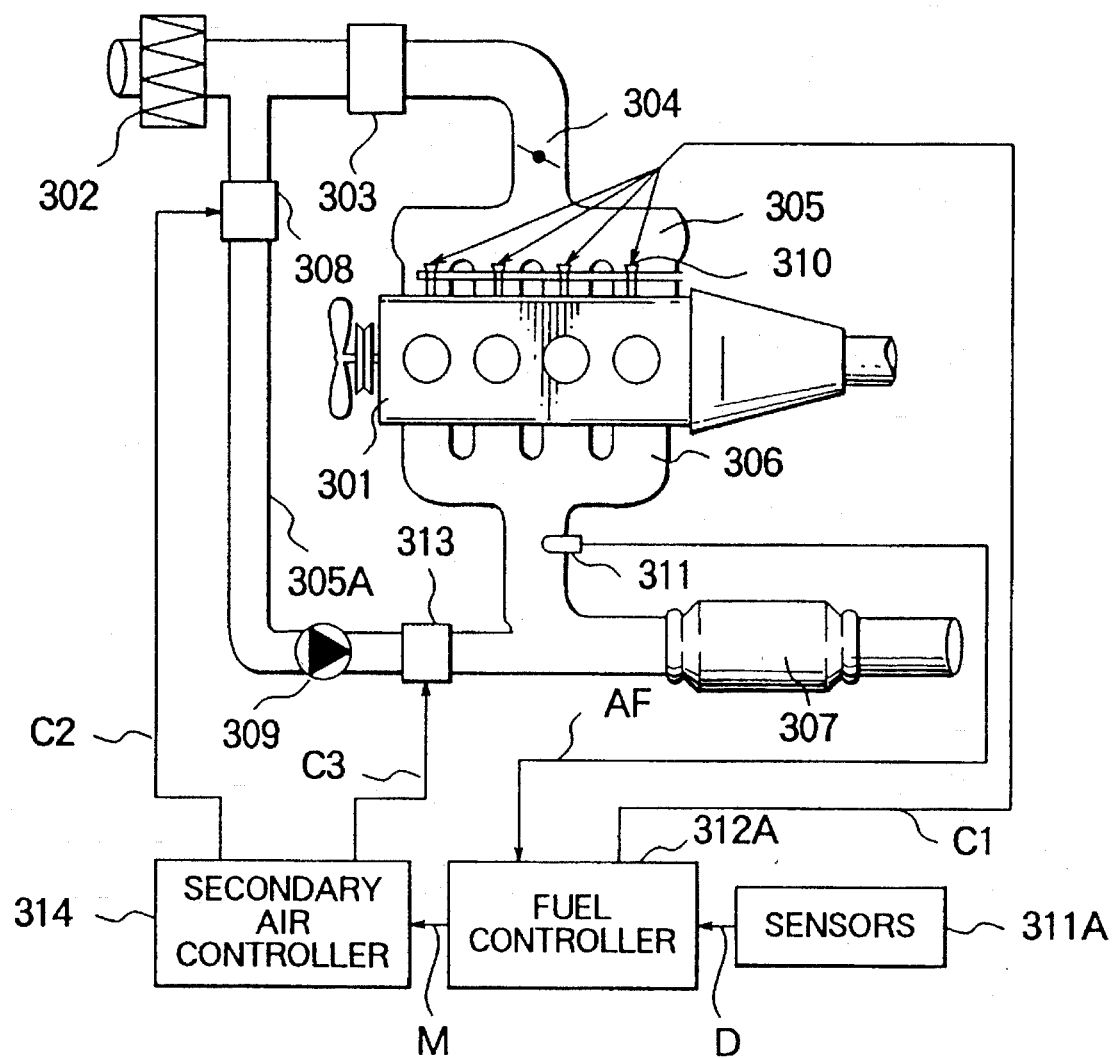
FIG. 10 is a schematic diagram showing a general arrangement of an engine system according to an eighth embodiment incarnating the third aspect of the present invention.
Figure 29:
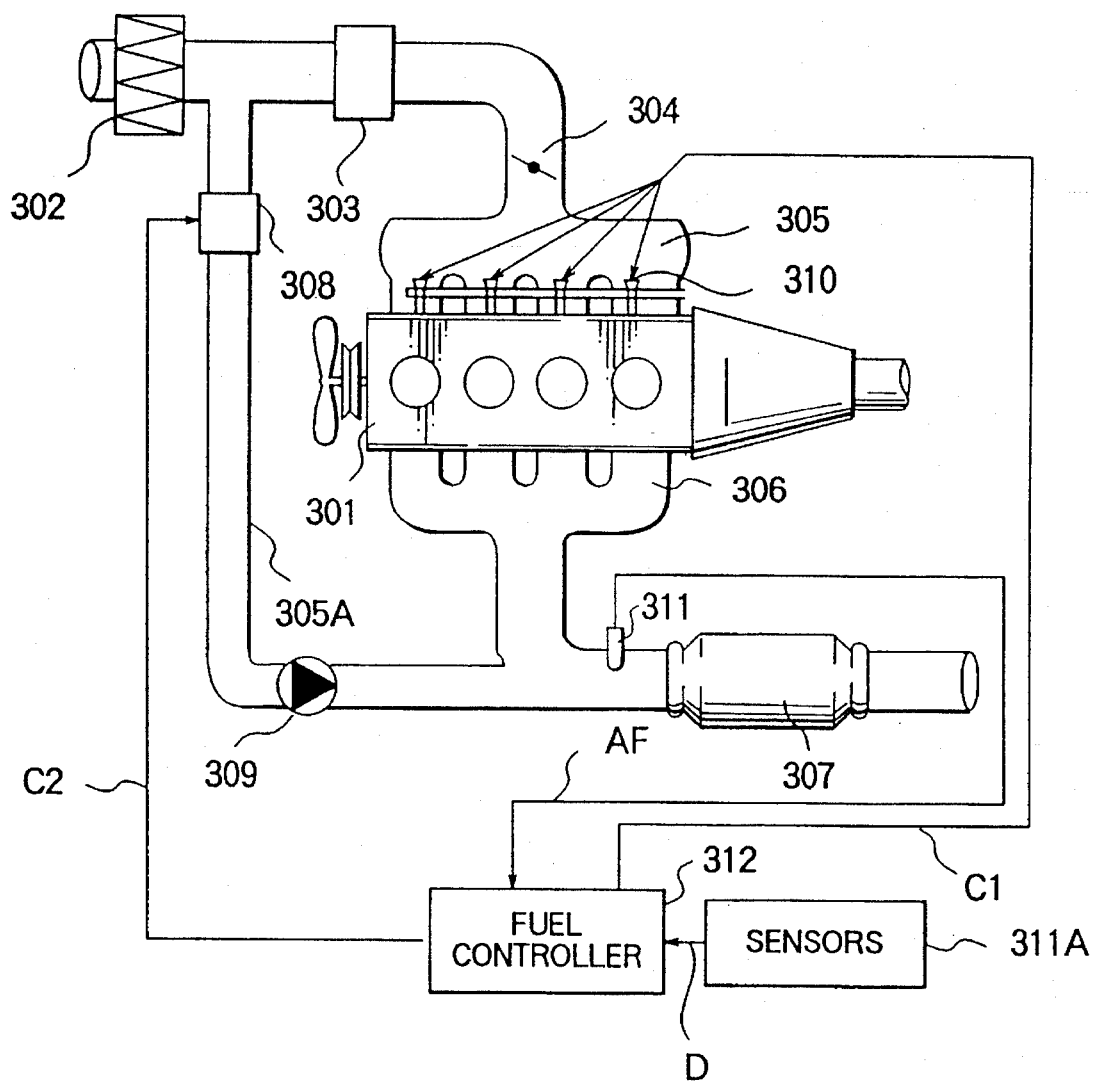
FIG. 29 shows in a block diagram a structure of an internal combustion engine system equipped with an apparatus for controlling an amount of air to be introduced into an exhaust pipe known heretofore.
Figure 30:
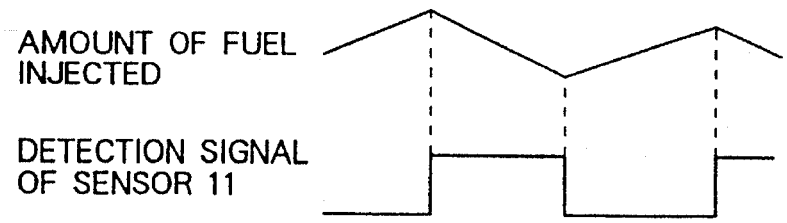
FIG. 30 is a waveform diagram for illustrating a relation between an amount of fuel charged into an engine and an output signal of an air-fuel ratio sensor in a conventional engine system.

FIG. 10 is a schematic diagram showing a general arrangement of an engine system according to an eighth embodiment incarnating the third aspect of the invention. In the figure, reference symbol 312A denotes a fuel control means which corresponds to that designated by 312 in FIG. 29. Further, constituents denoted by 301 to 311, 305A and 311A as well as signals designated by, AF, C1, C2 and D are same as or equivalent to those described hereinbefore by using like reference characters in conjunction with the related art shown in FIG. 29.

The fuel control means 312A is adapted to generate not only a control signal C1 for the fuel injectors 310 on the basis of the air-fuel ratio detection signal AF and the engine operation signal D but also a mode signal M indicating operation modes such as air-fuel ratio feedback control being effected, a warm-up state of the engine and the like.

An electric heater 313 is disposed in the secondary or fresh air feeding pipe 305A for heating the fresh air before it is introduced into the exhaust pipe 306. For controlling the air pump 308 and the heater 313 in response to the mode signal M supplied from the fuel control means 312A, a secondary air control means 314 is provided. More specifically, the secondary air control means 314 is designed to determine the amount of the fresh air to be introduced into the exhaust pipe 306 and the temperature thereof in dependence on the operating state of the engine 301 to thereby generate a control signal C2 for the air pump 308 and a control signal C3 for the heater 313.

Figure 11:
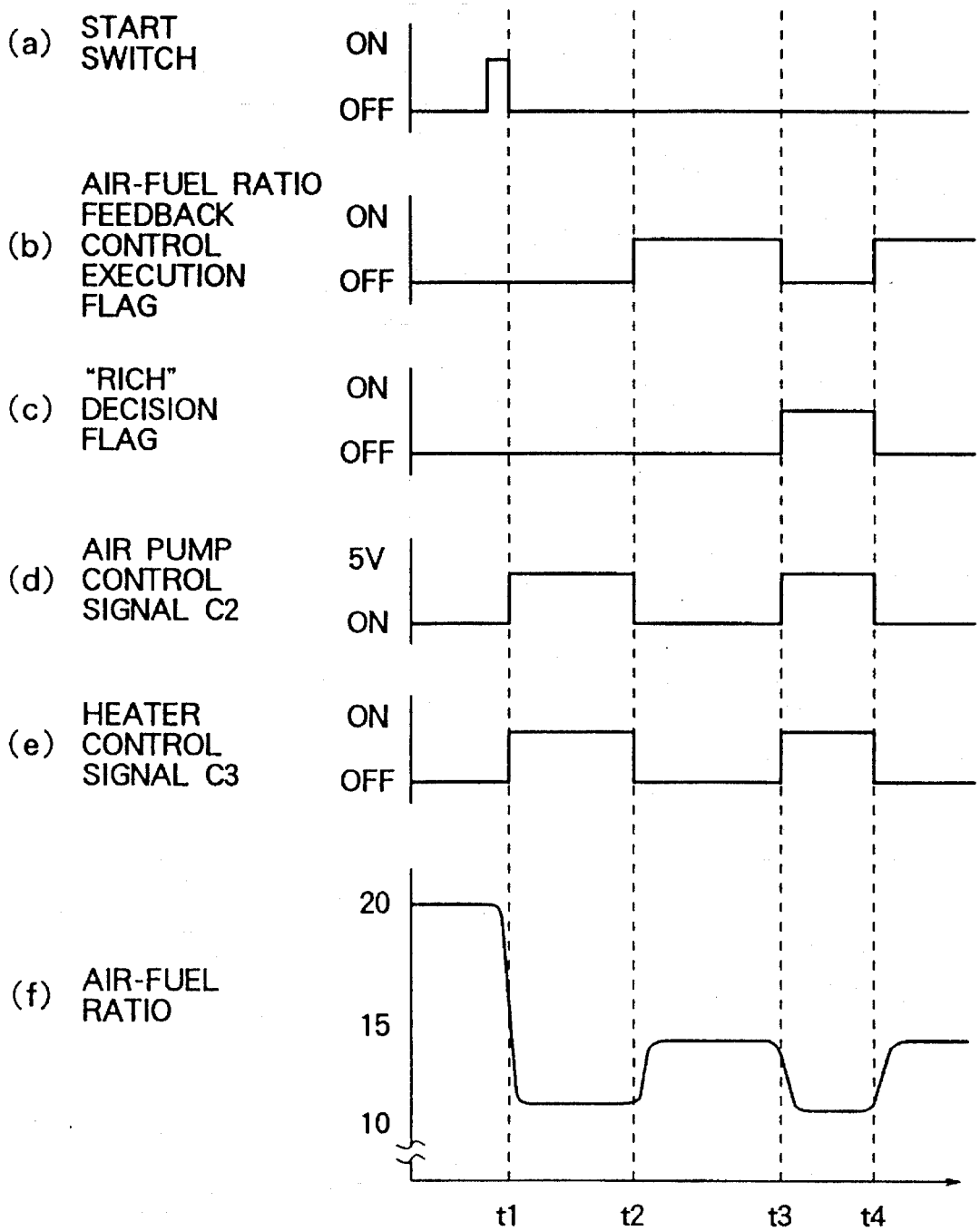
FIG. 11 is a timing chart for illustrating operations of a fresh air control means in the system according to the eighth embodiment.

FIG. 11 is a timing chart for illustrating operations of the secondary air control means 314. In the figure, a start switch signal included in the engine operation signal D is shown at (a), an air-fuel ratio feedback control execution flag signal which is included in the mode signal M is shown at (b), an "rich" decision flag also included in the mode signal M is shown at (c), a control signal C2 for controlling the air pump 308 is shown at (d), a control signal C3 for the heater 313 is shown at (e), and a signal representative of change in the air-fuel ratio within the combustion chamber of the engine 301 is shown at (f).

Figure 12:
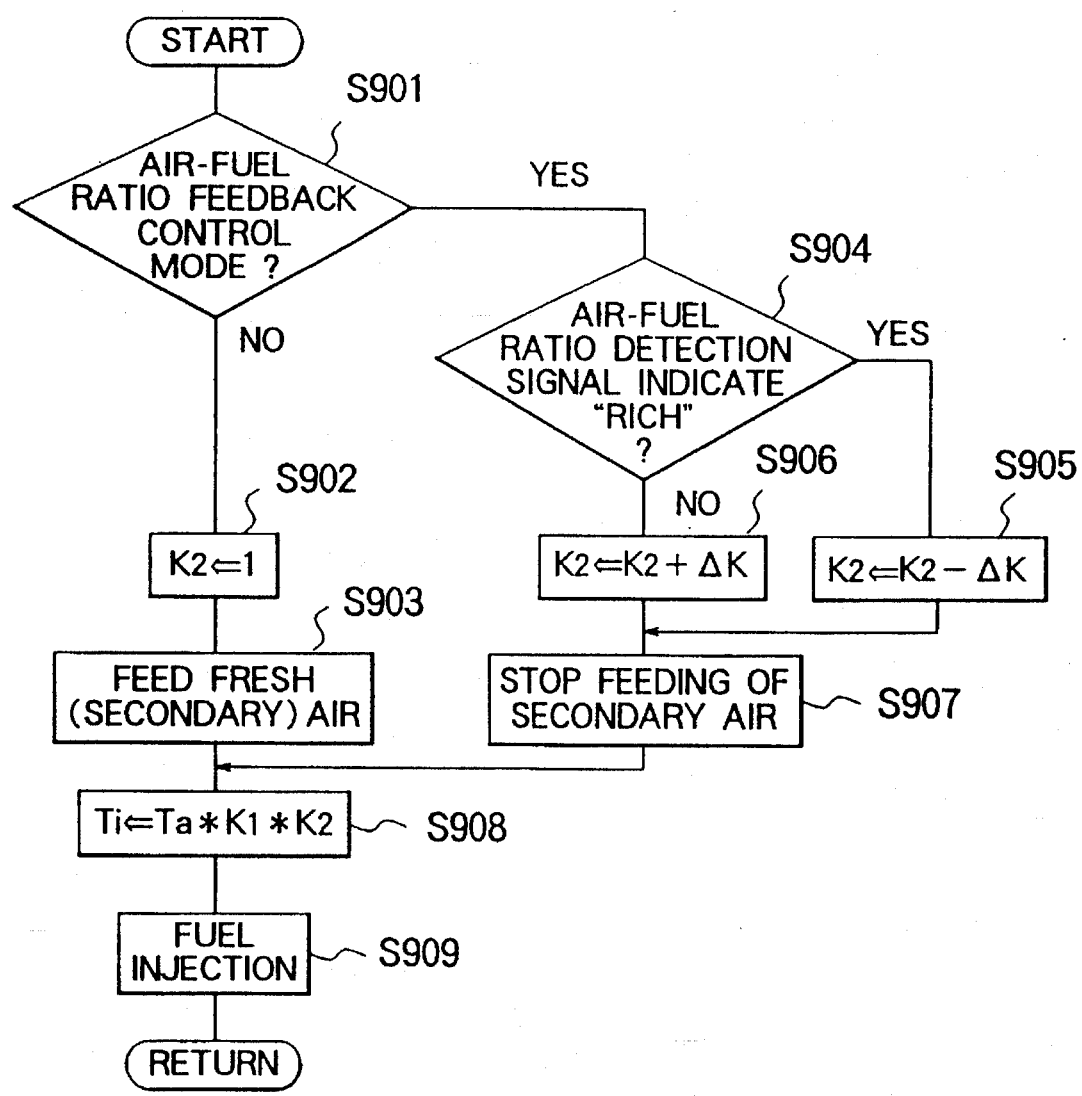
FIG. 12 is a flow chart for illustrating operations or processings executed by a fuel control means in the system according to the eighth embodiment of the invention.

FIG. 12 is a flow chart for illustrating primarily the operations or processings executed by the fuel control means 312A for determining the amount of fuel injection or for generating the control signal C1 for the fuel injector 310, to say in another way.

Now, referring to FIGS. 10 to 12, operation of the system according to the instant embodiment will be described without taking into consideration the control signal C3 on the assumption, by way of example, that the heater 313 is constantly driven.

The air-fuel ratio within the combustion chamber before starting the engine assumes a maximum value, as can be seen in FIG. 11 at (f). For starting the engine operation, a start switch is turned on by a starter signal commanding an electric power supply to a starter (not shown). At a time point t1 at which the engine operation is started after cranking, the fuel injector 310 is driven by the control signal C1, whereby the fuel is injected into the engine combustion chamber. As a result of this, the air-fuel ratio within the combustion chambers falls steeply below the theoretical or stoichiometrical air-fuel ratio, e.g. 14.7 (the time points t1 to t2).

The fuel control means 312A makes decision on the basis of the air-fuel ratio detection signal AF and the engine operation signal (mode signal) D as to whether the air-fuel ratio feedback control mode is to be effected or not (step S901).

The conditions for effectuating the air-fuel ratio feedback control are satisfied when the engine operates stably in a low or middle load state where the water temperature is hither than 40° C., the opening degree of the throttle valve 304 is smaller than 80%, the engine speed is lower than 6000 rpm, and where the air-fuel ratio sensor 311 is in the activated state.

Accordingly, in the engine starting state, the result of the above-mentioned decision step S901 is naturally negative (NO). Thus, the fuel control means 312A outputs the mode signal M indicating that the air-fuel ratio feedback control execution flag is "OFF" (i.e., the air-fuel ratio is not subjected to the feedback control), which is then followed by a step S902 where an air-fuel ratio feedback quantity correcting coefficient $K_2$ is set to "1" (indicative of rich air-fuel mixture).

In an air-fuel ratio open-loop control (where the feedback control is not effected), the fuel control means 312A determines a fuel injection pulse width Ti corrected by taking into account the fuel atomization in a low-temperature state which immediately follows the engine start, whereby the corresponding control signal C1 is generated.

On the other hand, the fresh air control means 314 responds to the "OFF" state of the air-fuel ratio feedback control execution flag to thereby issue the control signal C2 for driving the air pump 308 to allow the fresh or secondary air to be fed into the exhaust pipe 306 (step S903).

Referring to FIG. 11, it is assumed that at a time point t2, the engine operation enters the stable state and thus the conditions mentioned above are satisfied. In that case, the decision step S901 results in affirmation (YES), indicating that the air-fuel ratio feedback control is effected in response to which the fuel control means 312 sets the air-fuel ratio feedback control execution flag to "ON", and generates the mode signal M indicating that the feedback control of the air-fuel ratio is being executed.

Subsequently, the air-fuel ratio detection signal AF is referenced to determine whether or not the air-fuel mixture is rich or lean (step S904). When the decision step S904 results in affirmation (YES), indicating that the air-fuel mixture is rich, the fuel injection quantity correcting coefficient $K_2$ is determined by decrementing an integral gain $\Delta K$ in a step S905. If otherwise (NO), the correcting coefficient $K_2$ is incremented by the integral gain $\Delta K$ in a step S906.

Further, the fresh air control means 314 responds to "ON" state of the air-fuel ratio feedback control execution flag by resetting the control signal C2, as a result of which operation of the air pump 308 is stopped with the secondary air feed being interrupted (step S907).

Subsequently, in the fuel control means 312A, the basic fuel injection quantity Ta determined previously is multiplied by the correcting coefficient $K_2$ for the air-fuel ratio feedback control, which coefficient has been determined in the step S902, S905 or S906. Thus, in a step S908, the fuel injection pulse width Ti is arithmetically determined as follows:

$$Ti = Ta \cdot K_1 \cdot K_2 \quad (1)$$

As can now be understood, the fuel control means 312A first determines the fuel injection pulse width Ti on the basis of the intake air flow information derived from the output of the air flow sensor 303 and the engine speed information included in the engine operation mode signal D and then corrects the fuel injection pulse width Ti by taking into account the engine operation state represented by the water temperature and/or the like. Furthermore, the fuel injection pulse width is so corrected or modified on the basis of the air-fuel ratio detection signal AF derived from the output of the air-fuel ratio sensor 311 that the air-fuel ratio becomes the stoichiometrical air-fuel ratio.

In this manner, in the stable operation state (corresponding to duration from t2 to t3 in FIG. 11) where the amount of fuel corrected as described previously is injected through the injector 310 (step S909), the air-fuel ratio of the air-fuel mixture which is to undergo combustion is so controlled as to the stoichiometrical air-fuel ratio (14.7) by incrementing or decrementing the correcting coefficient $K_2$ in dependence on the air-fuel ratio detection signal AF.

In this case, since the combustion takes place approximately at the stoichiometrical air-fuel ratio, the content of oxygen in the exhaust gas within the exhaust pipe 306 is neither in excess nor in shortage, whereby the noxious components HC, CO and $NO_x$ are removed through oxidation and reduction with a high purification efficiency. In this state, the fresh air feeding to the exhaust pipe 306 is unnecessary. Accordingly, operation of the air pump 308 is stopped.

In the engine starting operation and a high load operation (i.e., during a period between time points t3 and t4 in FIG. 11), the air-fuel ratio feedback control is not effected. Thus, the air-fuel ratio within the combustion chamber is so controlled as to be lower than the stoichiometrical air-fuel ratio. In this case, the fresh air control means 314 sets the control signal C2 to "ON" for driving the air pump 308 in order to evade shortage of oxygen for the oxidation reaction of the catalytic converter 307 to thereby sustain a high purification efficiency for removal of hydrocarbon (HC) and carbon monoxide (CO).

The operation state in which the air-fuel ratio control is effected through open loop (instead of the feedback control) and in which the "rich" decision flag is set to "ON" includes not only the accelerating operation but also the operation state where the demand torque increases, as experienced in the up-hill running of the motor vehicle.

In this way, the air-fuel ratio of the air-fuel mixture charged into the engine is controlled to be slightly higher than the stoichiometrical air-fuel ratio with the fresh air feeding to the exhaust pipe being interrupted in the low and middle load operation states of the engine where the air-fuel ratio feedback control is put into effect, whereby the optimal purification efficiency of the catalytic converter 307 can be achieved with discharge of $NO_x$ being suppressed to a minimum.

On the other hand, in a high-load engine operation state as decided on the basis of the opening degree of the throttle valve 304 and the fuel injection quantity, the air-fuel ratio of the fuel mixture charged into the engine is controlled to be lower than the stoichiometrical air-fuel ratio (i.e., to be rich in fuel) through the open loop control while the fresh air is fed to the exhaust pipe 306. Thus, the engine can generate a sufficiently high output torque while preventing occurrence of unwanted event such as knocking. Besides, the enriched air-fuel mixture is effective for preventing overheat of the engine. Additionally, generation of the $NO_x$ within the combustion chamber is suppressed. Furthermore, owing to the fresh air feeding, hydrocarbon and carbon monoxide which tend to increase in the exhaust gas due to the burning of rich air-fuel mixture can be removed with high efficiency by the catalytic converter 307.

At the end of the high-load operation of the engine, the air-fuel feedback control is regained with the fresh air feeding being interrupted. In this manner, the purification efficiency of the catalytic converter 307 is constantly maintained optimal regardless of whether the air-fuel ratio control is effected through the feedback (closed loop) or through the open loop, whereby discharge of noxious gases can be suppressed to a minimum.

Embodiment 9

In the case of the eighth embodiment described above, the control signal C3 for controlling the heater 313 is put aside from consideration. In other words, it has been assumed that the heater 313 is constantly driven for protecting the catalytic converter 307 against lowering of temperature. However, when the feeding of fresh air into the exhaust pipe 306 is unnecessary, operation of the heater 313 of course be stopped.

According to the teaching of the invention incarnated in the ninth embodiment, the control of the heater 313 is effected in the manner described below by reference to a flow chart of FIG. 13.

Figure 13:
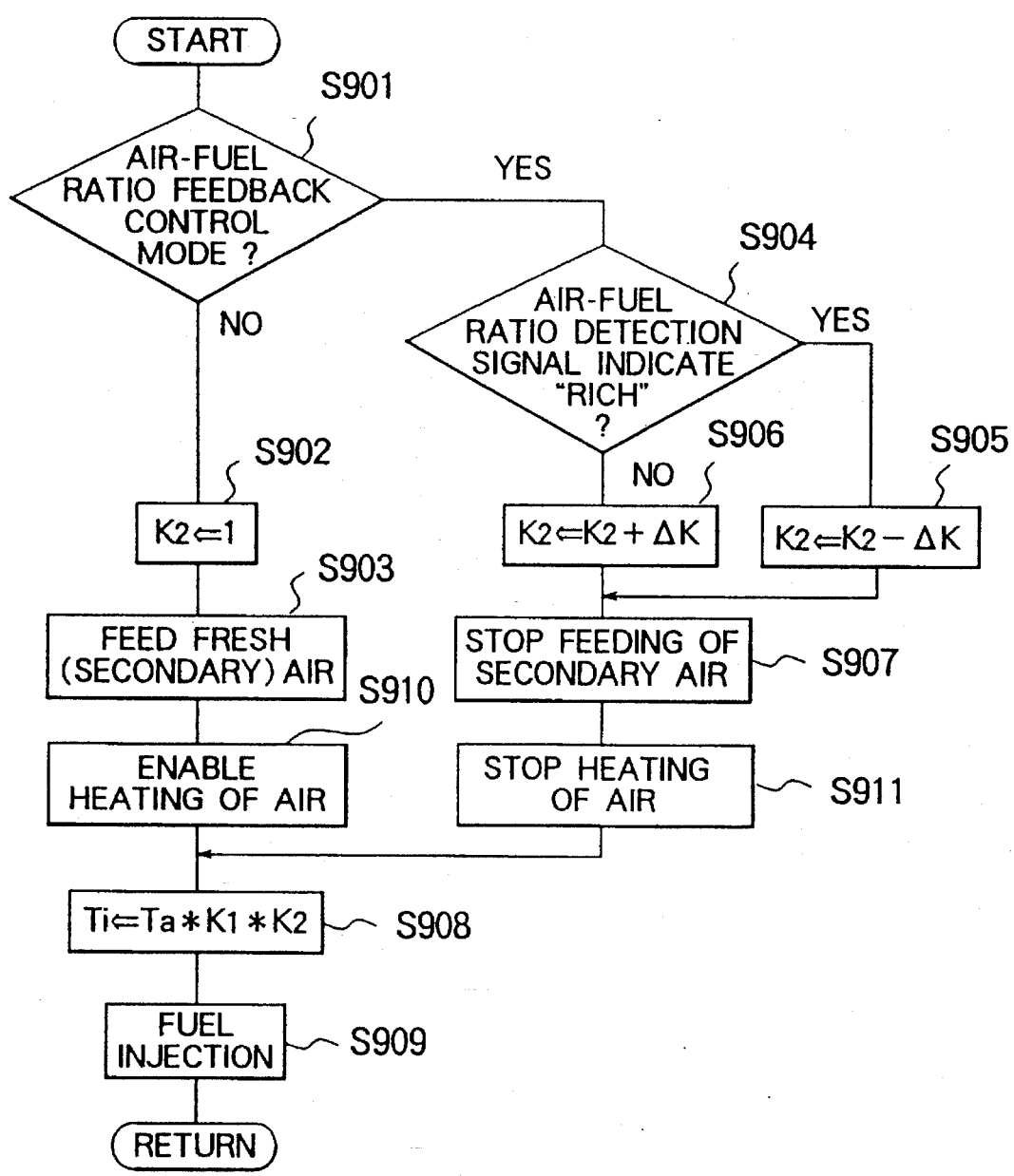
FIG. 13 is flow chart for illustrating operations or processings executed according to a ninth embodiment incarnating the third aspect of the invention.

In FIG. 13, steps S901 to S909 are same as or equivalent to those described hereinbefore in conjunction with the first embodiment. Accordingly, repeated description of these steps will be unnecessary.

Referring to the figure, when it is decided in the step S901 that the air-fuel ratio feedback control is not being effected (i.e., when the answer of this decision step S901 is "NO"), the fresh air control means 314 sets the control signal C3 to ON-level as shown in FIG. 11 at (e) in succession to execution of the fresh air feed enabling step S903 to thereby drive the heater 313 (step S910).

More specifically, unless the air-fuel ratio feedback control is effected during the period from the time point t1 to t2, both the control signal C2 and the control signal C3 are simultaneously validated, whereby the heated fresh air is supplied to the exhaust pipe 306 to be mixed with the exhaust gas resulting from combustion of rich air-fuel mixture, for example, immediately after the start of the engine, the mixture being then supplied to the catalytic converter 307. Thus, the oxidation reaction through the medium of the catalytic converter 307 is enhanced owing to the temperature rise, whereby purification of HC and CO is further promoted.

On the other hand, when it is decided that the air-fuel ratio feedback control is being effected (i.e., when the answer of the step S901 is "YES"), the fresh air control means 314 invalidated the control signal C3 in succession to the fresh air feeding stop step S907 to thereby stop unnecessary energization of the heater 313 (step S911). In this manner, during the period from the time point t2 to t3 (FIG. 11, (e)) in which the air-fuel ratio feedback control execution flag is set "ON", both the control signal C2 and the control signal C3 are invalidated.

Thus, in the case of the instant embodiment, the wasteful energization of the heater 313 is prevented, whereby not only the use life of the heater 313 can be extended but also the catalytic converter 307 can positively be protected from being overheated. Additionally, the instant embodiment is advantageous from the view point of power saving.

Embodiment 10

In the case of the ninth embodiment described above, the fresh air is heated simultaneously with feeding thereof into the exhaust pipe 306. However, the heater 313 may be operated only during the warming-up of the engine 301. The instant embodiment concerns the control to this end.

Figure 14:
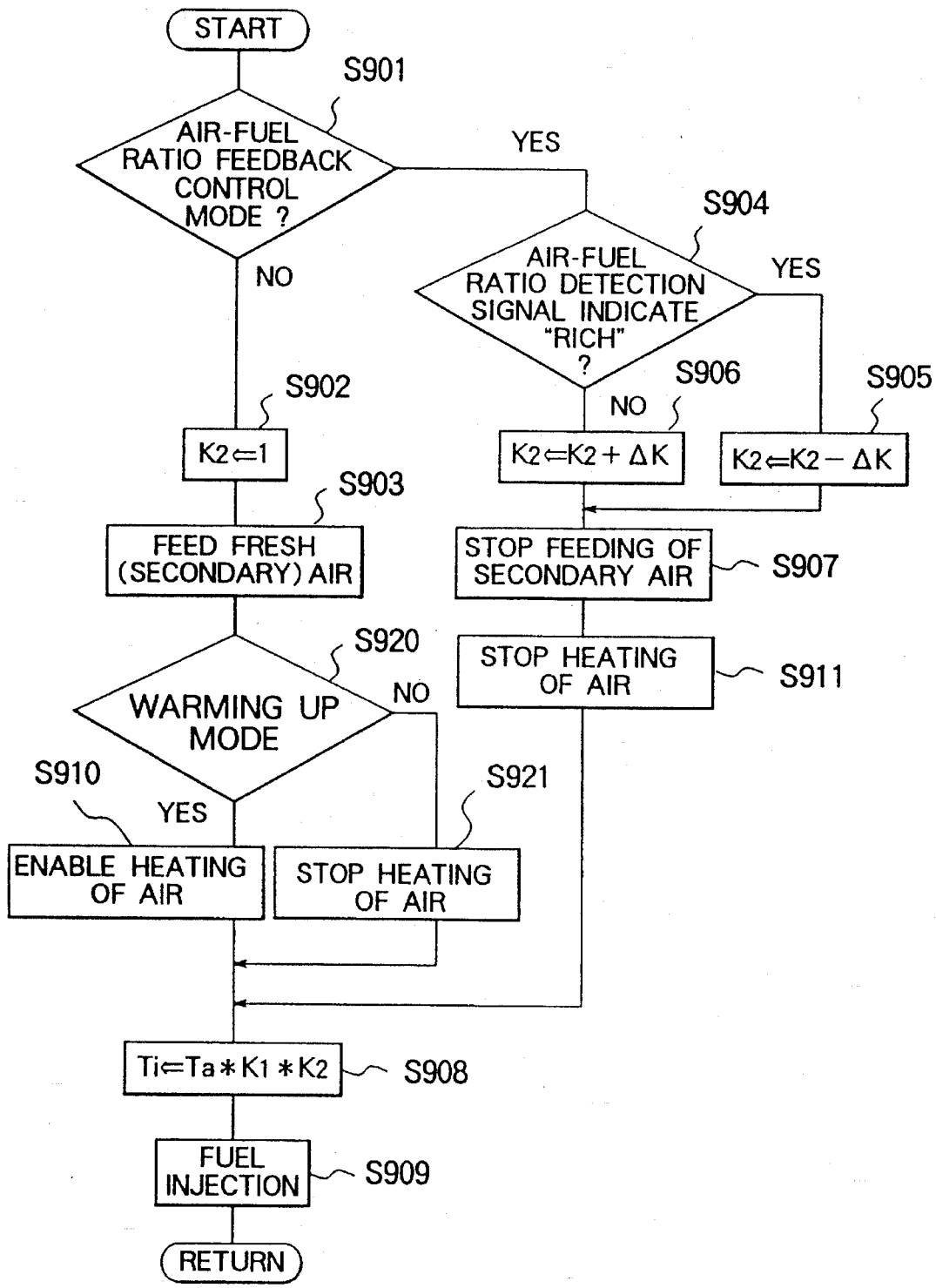
FIG. 14 is flow chart for illustrating operations or processings in the system according to a tenth embodiment incarnating the third aspect of the invention.

In the following description, reference is made to FIG. 14 in which reference characters S901 and S911 denote the steps same as or equivalent to those described above. Unless the air-fuel ratio feedback is being effected, the fresh air control means 314 responds to the mode signal M supplied from the fuel control means 312A to decide whether or not the engine is in the warming-up state in succession to the fresh air feeding step S903 (see step S20 in FIG. 14).

When the engine is in the warm-up mode (i.e., when the step S920 results in "YES"), the heating step S910 is executed. If otherwise, the control signal C3 is invalidated to stop operation of the heater 313 (step S921).

In this manner, the heater 313 is driven only during a period in which the engine 301 is at a low temperature or in the warming-up state or mode, to thereby heat the fresh air to be fed into the exhaust pipe 306 for activating the catalytic converter 307 in an earlier stage of engine operation, whereby contents of noxious gas components in the exhaust gas can be diminished from the earlier time point of the engine operation. On the contrary, unless the engine is in the warming-up mode, extraneous and wasteful heating of the fresh air is prevented, which is advantageous from the standpoints of reducing the power consumption and protecting the catalytic converter 307 from being overheated.

More specifically, in the engine starting mode (warming-up mode), the fresh air control means 314 decides that the air-fuel ratio feedback control is not effected and that the air-fuel mixture charged into the engine is rich (step S901), to thereby issue the control signal C2 for driving the air pump 308 (step S903) and at the same time energize the heater 313 by issuing the control signal C3 (step S910).

When the temperature of the engine has attained a predetermined level, only the fresh air feeding is effected (step S903) with operation of the heater 313 being interrupted (step S921).

Further, when the air-fuel ratio control is being performed, the fresh air feeding is interrupted by stopping operation of the air pump 308, as described hereinbefore in conjunction with the eighth embodiment, whereby suppression of discharge of nitrogen oxides ($NO_x$) to the atmosphere is enhanced.

Embodiment 11

Figure 15:
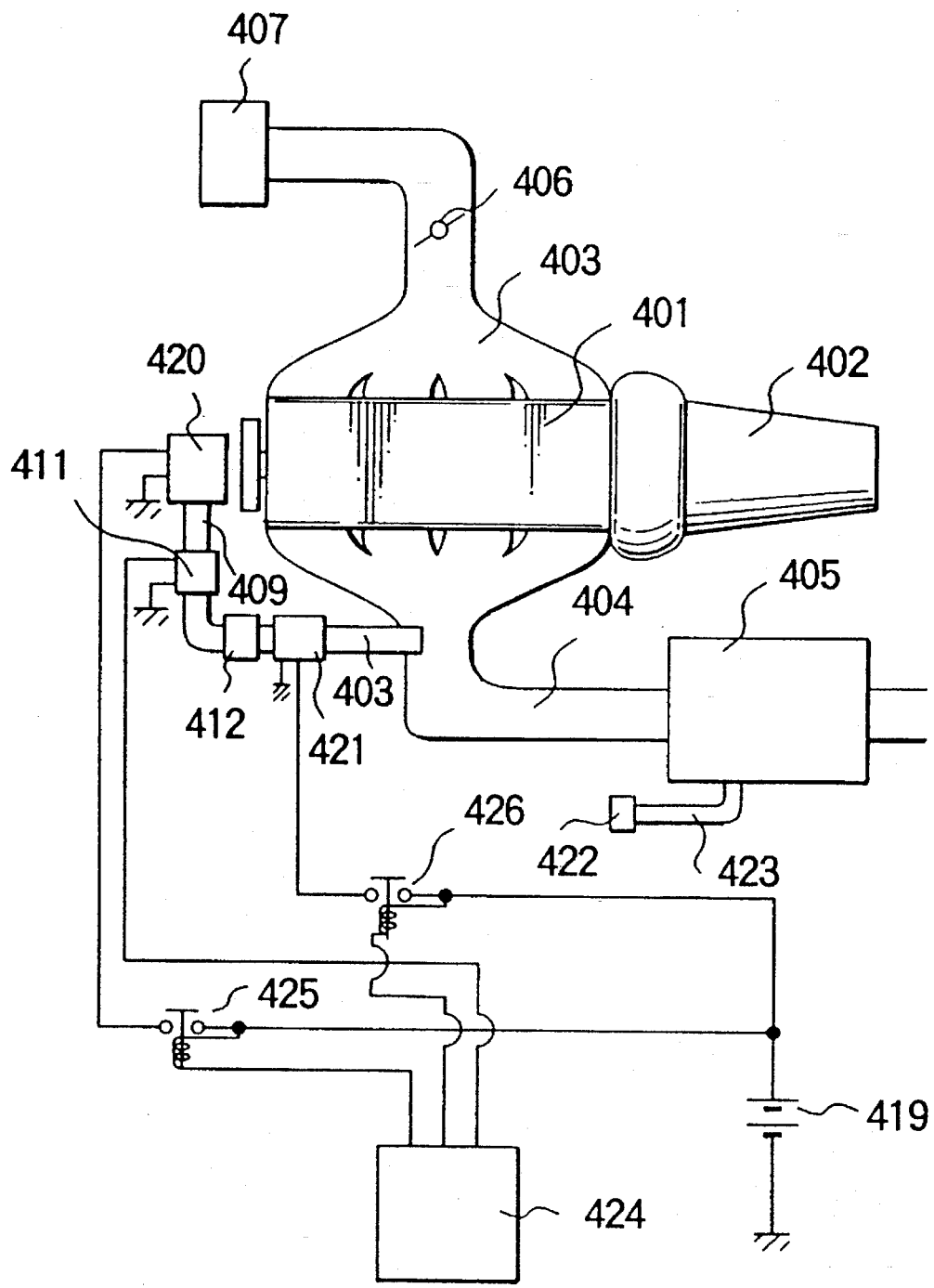
FIG. 15 is a schematic diagram showing an arrangement of an apparatus for controlling air feeding to an exhaust gas purification system of an engine according to an eleventh embodiment and a twelfth embodiment incarnating the fourth aspect of the invention.
Figure 31:
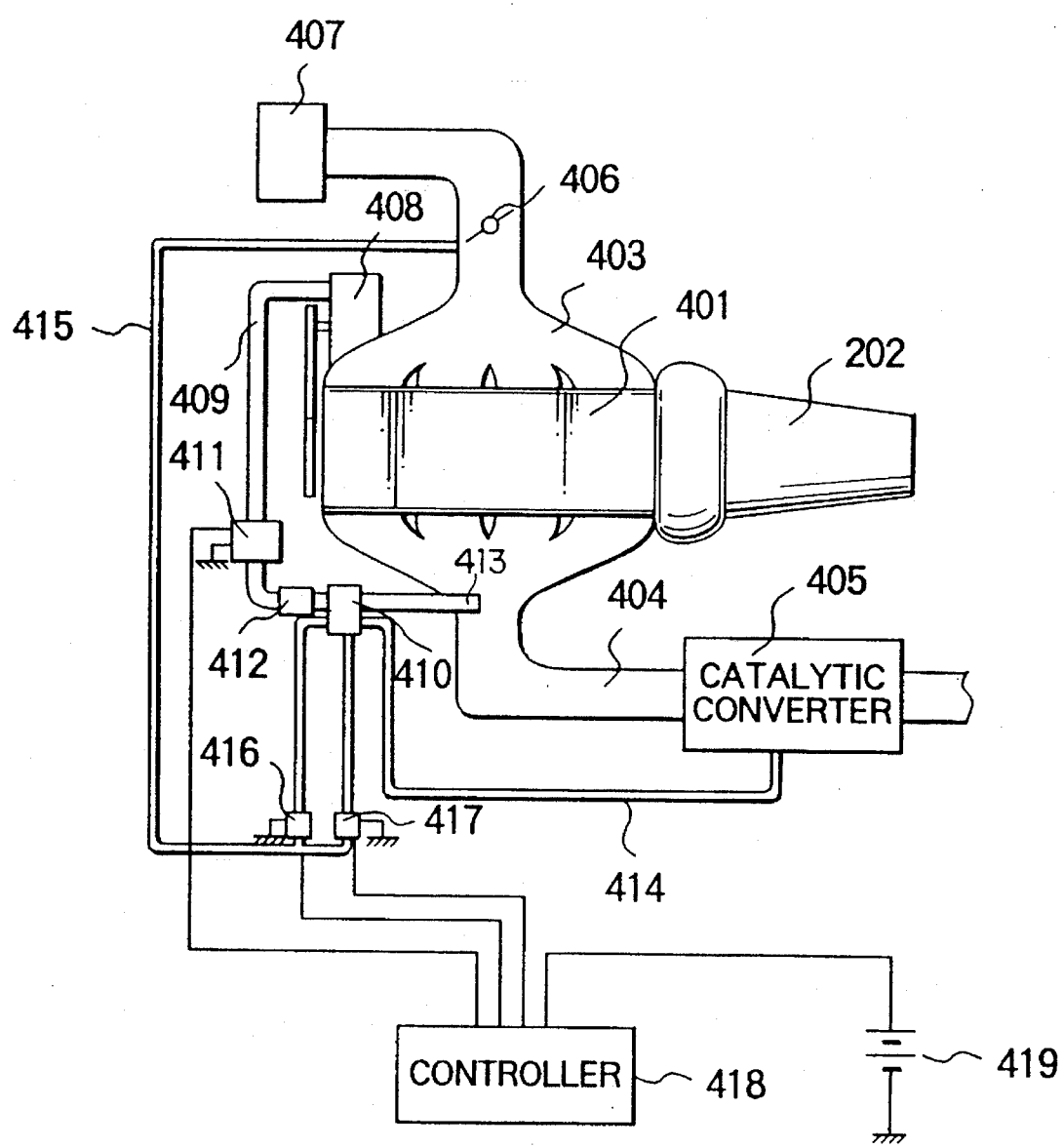
FIG. 31 shows another example of the apparatus for controlling fresh air introduced into an exhaust gas purification system of an engine known heretofore.
Figure 32:
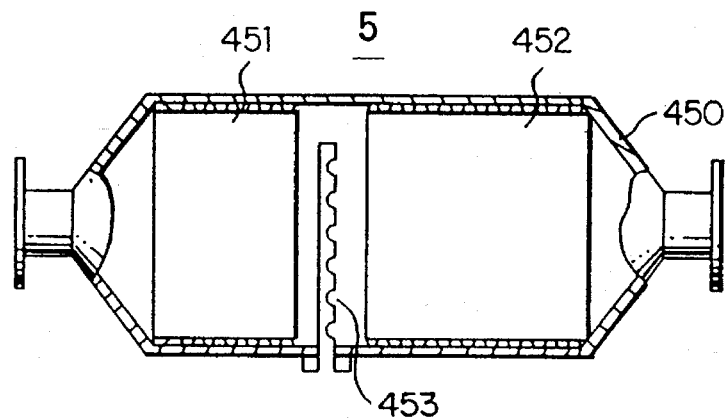
FIG. 32 is a partial sectional view showing a structure of a catalytic converter unit known heretofore.
Figure 33:
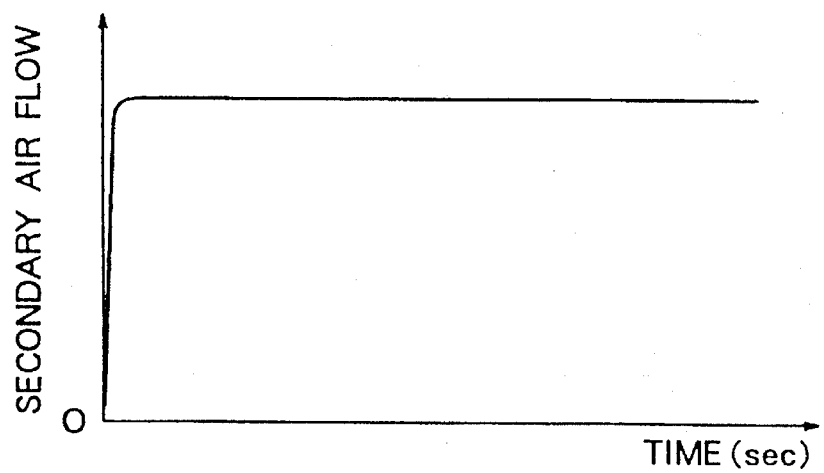
FIG. 33 is a time chart for illustrating operation of an air pump employed in a fresh air feeding system known heretofore.
Figure 34:
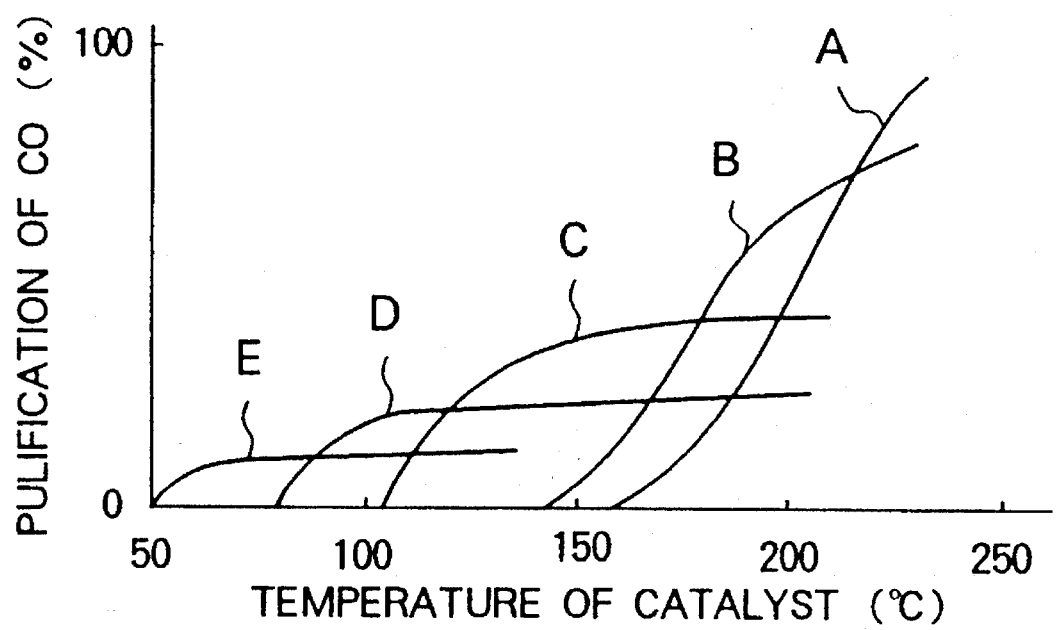
FIG. 34 is a graphical representation illustrating CO-purification characteristics of a conventional three-way catalytic converter.
Figure 35:
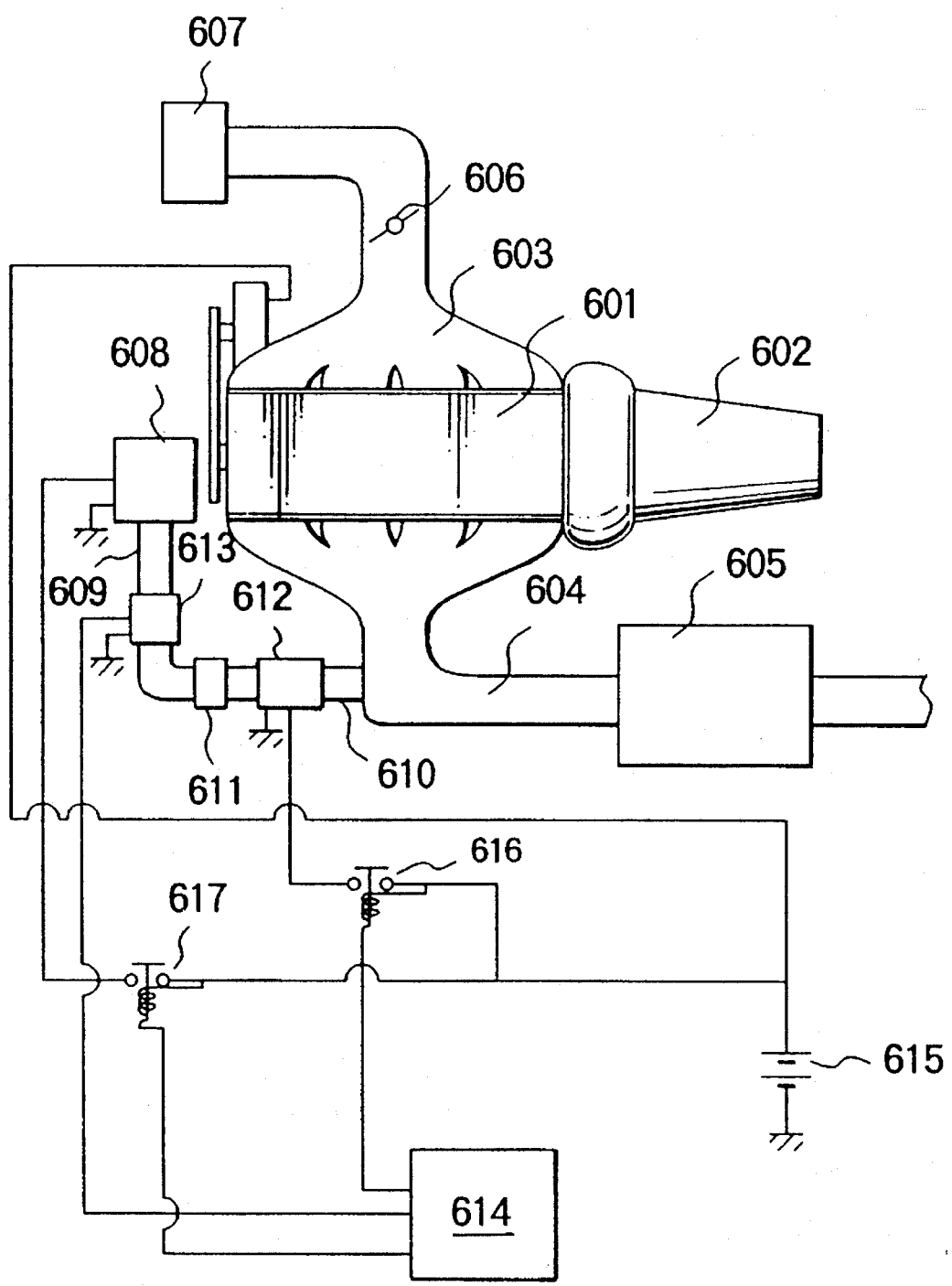
FIG. 35 shows yet another example of an arrangement of an apparatus for introducing heated air into an exhaust system of an internal combustion engine known heretofore.

FIG. 15 is a schematic diagram showing an arrangement of an apparatus for controlling the air feeding to an exhaust gas purification system of an engine according to an eleventh embodiment which incarnates the fourth aspect of the invention. In the figure, parts same as or equivalent to those described hereinbefore in conjunction with FIGS. 31 and 32 are denoted by like reference numerals. Accordingly, repeated description of these parts will be unnecessary.

Referring to FIG. 15, the air pump 408 shown in FIG. 31 is replaced by a motor-driven air pump 420 having an inlet port opened to the atmosphere. An electric heater 421 is installed in an air supply conduit constituted by an air supply conduit 409 and a first air feeding pipe 413. A second air feeding pipe 423 leading to the split portion 453 has a free end portion exposed to the atmosphere through a differential pressure type ON/OFF valve 422 which is adapted to be opened when the pressure within the exhaust system of the engine is higher than the atmosphere (i.e., positive relative to the latter), while it is closed when the pressure within the exhaust system is lower (negative). More specifically, during the discharge stroke of the engine, a positive pressure prevails within the exhaust system. On the other hand, when the engine is in the suction stroke, the pressure in the exhaust system is negative. In this case, the differential pressure type ON/OFF valve 422 is opened so that the air in the exterior or in the vehicle chamber is caused to flow into the exhaust system under a pressure difference. Thus, the differential pressure type ON/OFF valve 422 constitutes a part of the means for feeding fresh air into the exhaust system via the split portion 453. The air pump 420, the heater 421 and the control valve 411 are under the control of a controller 424. The air pump 420 and the heater 421 are supplied with electric power from the battery 419 via relays 425 and 426, respectively, which are also under the control of the controller 424. Parenthetically, it should be mentioned that the temperature of the fresh air as heated should preferably be higher than that of the exhaust gas. In the case of the instant embodiment, the heater 421 is so designed that the air heated thereby has a temperature in a range of 300° C. to 400° C.

Description will now turn to operation of the apparatus according to this embodiment. The relay 425 for the air pump 420 is closed by the controller 424 simultaneously with or after lapse of a predetermined time from the start of engine operation, whereby the air pump 420 is put into operation to start the fresh air feeding operation. Additionally, the relay 426 for the heater 421 is closed by the controller 424 simultaneously with the start of engine operation. Thus, the heater 421 is supplied with electric energy from the battery 419, as a result of which the fresh or secondary air fed through the air supply conduit 409 is heated. The heated air is then introduced into the exhaust pipe 404 through the first air feeding pipe 413. At that time, the opening degree of the control valve 411 is adjusted by the controller 424 for controlling the flow rate of the fresh air. As a result, the exhaust gas assumes an excess oxygen state, favorably to the oxidation reaction for converting the noxious gas components CO and HC into $CO_2$ and $H_2O$ under the catalytic action of the catalytic converter unit 405. In this manner, purification of the exhaust gas discharged immediately after the start of the engine operation and containing CO and HC in large proportions can be promoted.

Thereafter, the upstream catalyst 451 and the downstream catalyst 452 are heated to reach the respective reaction temperatures and thus activated sufficiently. At this time point, the controller 424 controls the control valve 411 so as to decrease the opening degree thereof or close the control valve 411 completely. As a result, the air flow directed to the exhaust pipe 404 is decreased (or stopped). The period during which the heated air is introduced into the exhaust pipe 404 through cooperation of the air pump 420 and the heater 421 is determined on the basis of the time which is taken for the catalysts to be sufficiently activated for effecting the purification stably. This period ordinarily ranges from several ten seconds to several minutes. On the other hand, the pressure prevailing within the catalytic converter unit 405 changes between a positive level and a negative level relative to the atmospheric pressure because of pulsation in the pressure of the exhaust gas discharged from the engine, as described previously. When the pressure within the catalytic converter unit 405 becomes negative or lower than the atmospheric pressure, the differential pressure type ON/OFF valve 422 is opened, whereby the air is introduced into the split portion 453 through the pipe 423, which involves an excess oxygen state of the downstream catalyst 452. In this manner, noxious gas components $NO_x$, CO and HC are purified through the upstream catalyst 451, and the exhaust gas leaving the upstream catalyst 451 and having a temperature raised under heat generated by the reaction in the upstream catalyst 451 flows into the downstream catalyst 452 which is supplemented with oxygen through the differential pressure type ON/OFF valve 422 and the air feeding pipe 423, whereby CO and HC remaining in the exhaust gas exiting the upstream catalyst 451 are removed by the downstream catalyst 452. Thus, the engine exhaust gas finally discharged to the atmosphere is sufficiently purified. In the case of the instant embodiment, the air supply to the split portion 453 is made effective continuously from the start of the engine operation to the stop thereof by taking advantage of pulsation in the exhaust gas pressure.

As will be appreciated from the above, according to the fourth aspect of the invention incarnated in the illustrated embodiment, heated air is introduced into the exhaust pipe 404 at a location upstream of the catalytic converter unit 405 through cooperation of the air pump 420 and the control valve 411 immediately after the start of engine operation or after lapse of a predetermined time therefrom under the control of the controller 424, whereby the catalysts can rapidly attain the reaction temperature as demanded and is activated fully for enhancing the exhaust gas purification efficiency. Further, since the exhaust gas introduced into the downstream catalyst 452 is heated through the reaction in the upstream catalyst 451, activation of the downstream catalyst 452 can further be accelerated.

Figure 16:
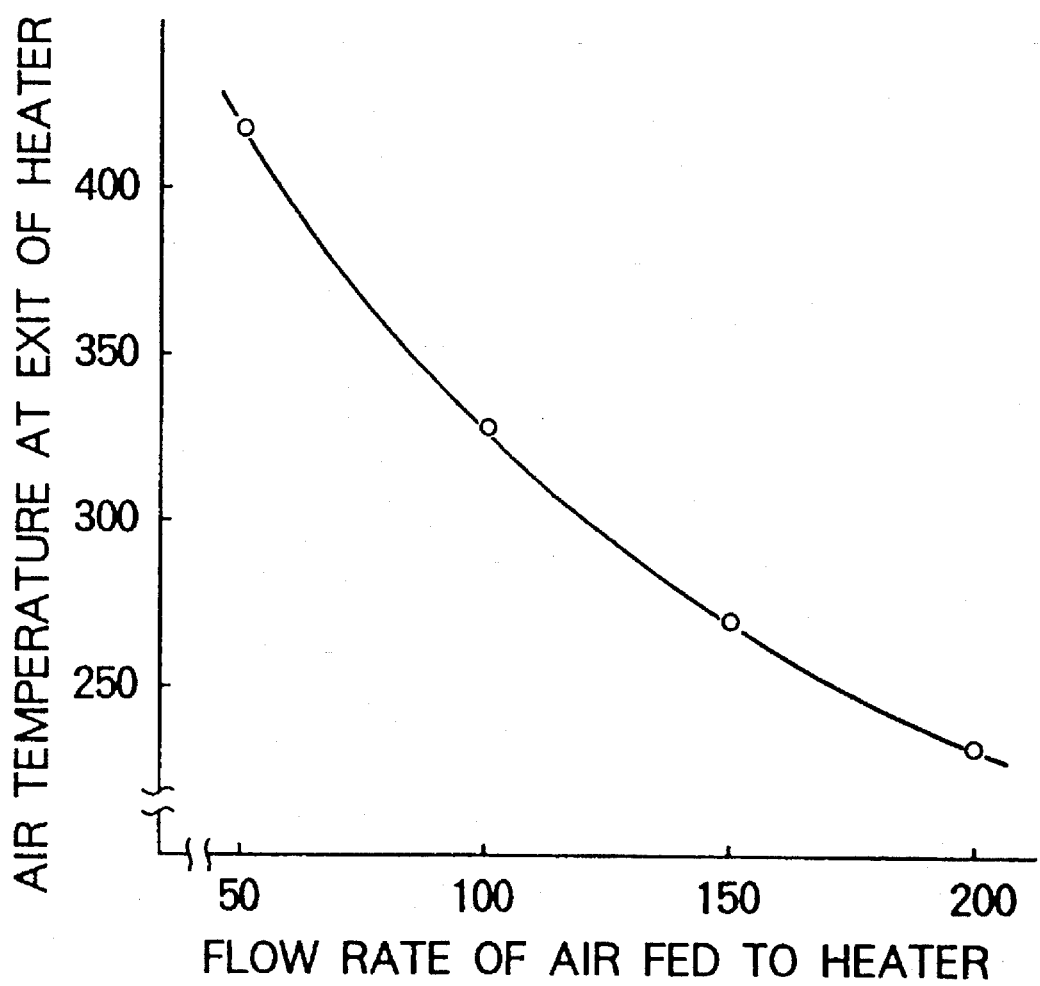
FIG. 16 is a view illustrating a relation between a flow rate of air fed to a heater and temperature of the air leaving the heater.

By virtue of such arrangement that the air feeding to the exhaust pipe 404 is realized separately from that to the split portion 453, the capacity of the air pump 420 can be scaled down when compared with that of the apparatus known heretofore (shown in FIG. 31). Further, it is to be noted that for a same capacity of the heater 421, the temperature of air leaving the heater 421 becomes higher as the amount of air fed into the heater 421 becomes smaller, as can be seen in FIG. 16. Thus, the heater 421 can be implemented with a smaller capacity when compared with that of the known apparatus, because the air discharge capacity of the air pump 420 is reduced.

Besides, owing to the arrangement of the differential pressure type ON/OFF valve 422 and the air feeding pipe 423 which constitute the air feeding means to the split portion 453, the switch 10, the solenoid valve 16, the solenoid valve 417 and the negative pressure conduit 415 can be spared. Moreover, the air can easily be introduced into the catalytic converter unit 405 through the split portion 453 by making use of pulsation in the pressure within the exhaust system without need for air flow regulating means of complicate structure. Thus, the apparatus as a whole can be realized in a simple structure of a small size.

Embodiment 12

In the case of the eleventh embodiment, the first air feeding pipe 413 is connected to the exhaust pipe 404 at a location upstream of the catalytic converter unit 405 to thereby allow the air heated to be introduced into the exhaust pipe 404. According to the twelfth embodiment which also incarnates the fourth aspect of the invention, however, it is proposed to connect the first air feeding pipe 413 directly to the catalytic converter unit 405 at a position upstream of the upstream catalyst 451 so that the heated air can directly be introduced into the upstream catalyst 451 of the catalytic converter unit 405. With this arrangement, substantially same advantageous effects as those of the first embodiment can be assured.

In the case of the embodiment described above, it is assumed that the upstream catalyst 451 is constituted by a three-way catalyst with an oxidation catalyst being used as the downstream catalyst 452. It should however be appreciated that an oxidation catalyst may be used for the upstream catalyst 451. Further, a three-way catalyst may of course be used as the downstream catalyst 452.

Although it has been described that both of the upstream catalyst 451 and the downstream catalyst 452 are accommodated within a single casing, it should be appreciated that the upstream catalyst 451 and the downstream catalyst 452 may be housed in separate casings, respectively, and installed within the exhaust system independent of each other. In that case, the differential pressure type ON/OFF valve 422 and the air feeding pipe 423 may be so arranged that the air can be fed into the downstream catalyst 452 by making use of the previously mentioned pressure pulsation of the exhaust gas.

Embodiment 13

Figure 17:
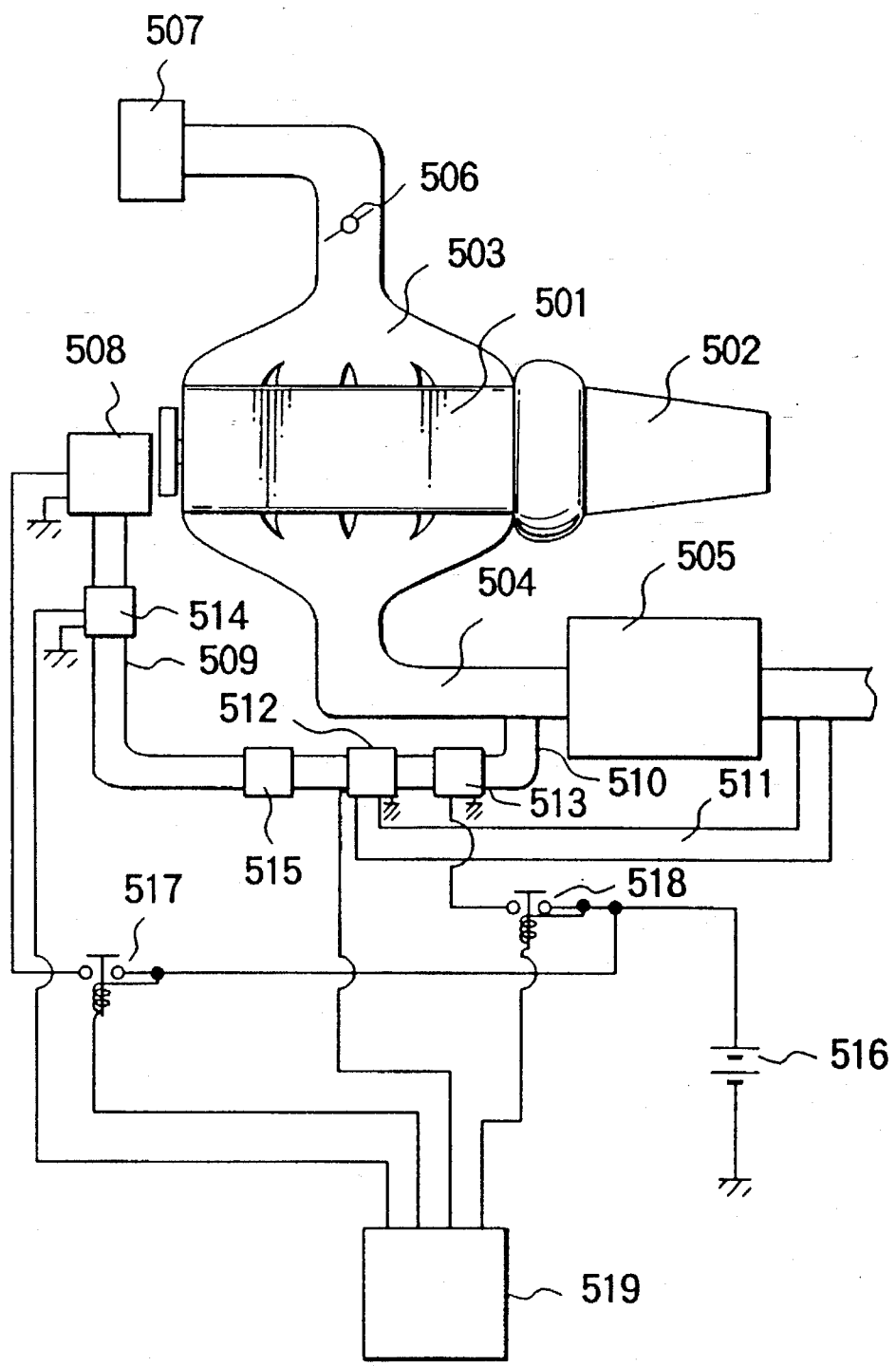
FIG. 17 shows schematically a structure of the apparatus for controlling feeding of fresh air into an exhaust gas purification system for an internal combustion engine according to a thirteenth fourteenth, fifteenth and sixteenth embodiments incarnating the fifth aspect of the invention.

FIG. 17 shows schematically a structure of the apparatus for controlling introduction or feeding of fresh (secondary) air into an exhaust gas purification system for an internal combustion engine according to a thirteenth embodiment which incarnates the fifth aspect of the invention. Referring to the figure, the engine system is comprised of an internal combustion engine 501, a transmission 502 operatively connected to an output shaft of the engine 501, an intake pipe 503 for charging air into the engine 501, an exhaust pipe 504 for discharging engine exhaust gas to the atmosphere, and an exhaust gas purification system including a catalytic converter 505 disposed in the exhaust pipe 504 for purifying the exhaust gas. A throttle valve 506 is disposed in the intake pipe 503 in which an air cleaner 507 is mounted at an inlet end. The catalytic converter 505 may be comprised of a three-way catalyst.

An air feeding system for introducing fresh air into the exhaust pipe 504 includes an air supply conduit 509 having one end connected to a motor-driven air pump 508 and the other end connected to a bypass valve 512. In order to prevent the exhaust gas from flowing backwardly into the air feed conduit 509, a check valve 515 is mounted in the conduit 509. For controlling the flow rate of the air to be introduced into the exhaust pipe 504, a control valve 514 is disposed in the air supply conduit 509 at a position upstream of the check valve 515. A first air feeding pipe 510 is connected between the bypass valve 512 and the exhaust pipe 504, while a second air feeding pipe 511 is connected between the bypass valve 512 and the exhaust pipe 504 at a position downstream of the catalytic converter 5. The change-over or bypass valve 512 may be constituted by an electrically controlled three-way valve for selectively introducing the air to the first and second air feeding pipes 510 and 511 from the air supply conduit 509. Operations of the air pump 508 and the heater 513 which are electrically energized from a power supply source 516 such as an onboard battery 516 are controlled by a controller 519 by way of relays 517 and 518. Operation of the control valve 514 is of course controlled by the controller 519.

Figure 18:
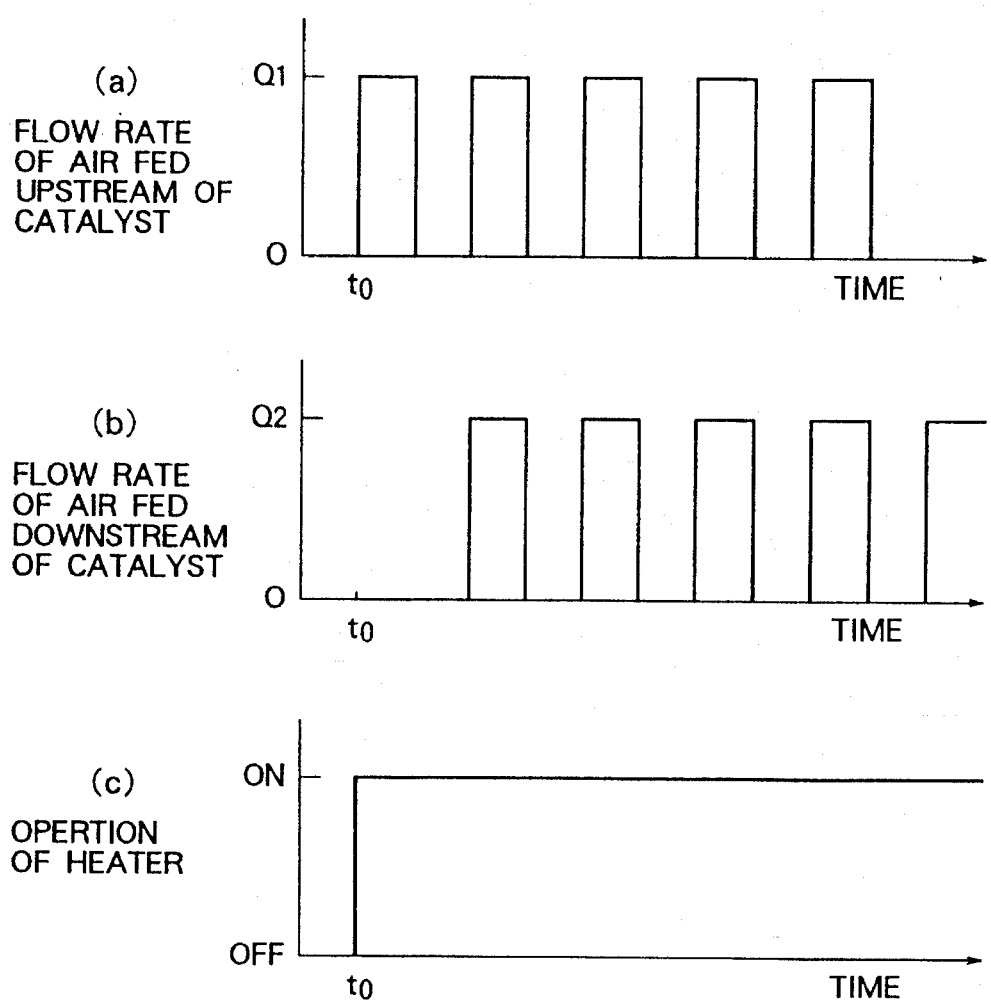
FIG. 18 is a timing chart for illustrating operations of the air feeding control system shown in FIG. 17.

FIG. 18 is a timing chart for illustrating operations of the air feeding control system shown in FIG. 17. More specifically, there is illustrated at (a) in the figure how the air feeding to the exhaust pipe 504 at the side upstream of the catalytic converter 505 is controlled, while illustrated at (b) is a manner for controlling the air feed to the exhaust pipe 504 downstream of the catalytic converter 505. Further, control timing for the heater 513 is illustrated at (c).

Figure 19:
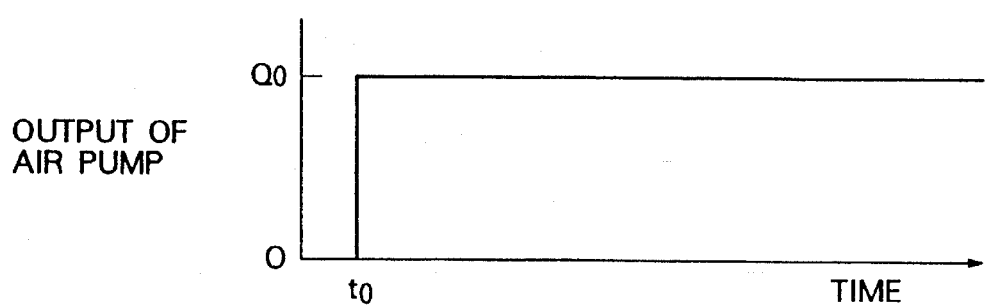
FIG. 19 is a timing chart for illustrating characteristically operation of an air pump employed in the apparatus shown in FIG. 17.

Now, description will turn to operation of the apparatus according to the instant embodiment. In the operation state immediately following the start of the engine 501, the air-fuel mixture is rich (i.e., the air-fuel ratio is smaller than the stoichiometric ratio). Thus, the contents of CO and HC in the exhaust gas are high. The catalytic converter 505 is not sufficiently activated yet and at a lower temperature. Immediately after the start of the engine 501 or after lapse of a predetermined time from the engine start, the air-pump relay 517 is closed under the control of the controller 519, whereby the air pump 508 is electrically energized from the battery 516 to start the fresh air supply operation. FIG. 19 is a timing chart for illustrating the control of the fresh air flow. As can be seen in the figure, the fresh air supply rate rises up at a time point $t_0$ immediately after the start of the engine 501 and is maintained at a constant level $Q_0$ by means of the control valve 514, the opening degree of which is controlled by the controller 519. Additionally, the relay 518 is closed under the control of the controller 519, whereby the heater 513 is electrically energized to radiate heat. At this time point, the air supply conduit 509 is fluidally communicated to the first air feeding pipe 510 through the bypass valve 512 under the control of the controller 519. Thus, the fresh air heated by the heater 513 is introduced into the exhaust pipe 504 upstream of the catalytic converter 505. After lapse of a predetermined time, the bypass valve 512 is changed over by the controller 519 to a position where the air supply conduit 509 is fluidally communicated to the second air feeding pipe 511. In this state, the air supplied from the air pump 508 through the air supply conduit 509 is introduced into the exhaust pipe 504 at a position downstream of the catalytic converter 505.

Subsequently, the bypass valve 512 is periodically changed over by the controller 519, as a result of which the fresh air supplied from the air pump 508 through the air supply conduit 509 is introduced alternatively to the upstream side and the downstream side of the catalytic converter 505 through the first air feeding pipe 510 and the second air feeding pipe 511 in such a manner as illustrated at (a) and (b) in FIG. 18, respectively. On the other hand, the heater 513 is continuously energized after the start of engine operation. During a period from a time point immediately after the engine start to a time point at which the catalytic converter 505 is sufficiently activated, the bypass valve 512 is changed over at a predetermined frequency. As a consequence, the oxygen content of the exhaust gas mixed with the heated air becomes high and low periodically and is purified through the catalytic reaction four converting CO and HC into $CO_2$ and $H_2O$. After the purification, the exhaust gas is discharged to the atmosphere.

When the catalytic converter 505 has been activated sufficiently, operations of the air pump 508, the bypass valve 512 and the heater 513 are interrupted by the controller 519. In this state, nitrogen oxides ($NO_x$) contained in the engine exhaust gas is removed through reducing reaction taking place in the catalytic converter 505, while CO and HC are removed through oxidation reaction.

As is apparent from the above, the heated fresh air is periodically fed into the exhaust pipe 504 at the side upstream of the catalytic converter 505 to be mixed with the exhaust gas of the engine 501, the mixture being then introduced into the catalytic converter 505. Thus, owing to the periodical change in the oxygen content of the gas mixture introduced into the catalytic converter 505, the purification performance thereof at a low temperature is enhanced, whereby the exhaust gas containing relatively large proportions of CO and HC in the initial engine operation phase can be purified with an enhanced efficiency. By implementing the means for periodically feeding the fresh air into the exhaust pipe 504 upstream of the catalytic converter 505 in the form of the electrically driven bypass valve 512, the air feeding control can be realized with a simplified and inexpensive structure while ensuring reliably the change-over operation through a simple control procedure.

Since the fresh air introduced into the exhaust pipe 504 upstream of the catalytic converter 505 is heated, temperature rise of the catalytic converter 505 can be speeded up, whereby the catalytic converter 505 can rapidly be activated, favorably to enhancement of the purification efficiency.

Further, owing to feeding of the air not heated to the exhaust pipe 504 downstream of the catalytic converter 505, the exhaust gas leaving the catalytic converter 505 can be cooled down, whereby discharge of the purified exhaust gas of a high temperature can be suppressed, to another advantage.

Embodiment 14

In the case of the thirteenth embodiment, the air pump 508, the bypass valve 512 and the heater 513 are operated only during the period from the start of the engine to the time point at which the catalytic converter 505 is sufficiently activated, to thereby introduce periodically the heated fresh air into the exhaust pipe 504 upstream of the catalytic converter 505. According to the instant embodiment, it is taught that throughout engine operation, the air pump 508, the bypass valve 512 and the heater 513 are continuously put into operation so that the heated air is periodically introduced into the exhaust pipe 504 upstream of the catalytic converter 505. This control is advantageous in particular for enhancing the purification efficiency for carbon monoxide and hydrocarbon.

Embodiment 15

In the case of the apparatus according to the thirteenth embodiment, the second air feeding pipe 511 is connected to the exhaust pipe 504 at the side downstream of the catalytic converter 505 so that the fresh air supplied from the air pump 508 is introduced into the exhaust pipe 504 downstream of the catalytic converter 505 via the second air feeding pipe 511 by switching the valve positions of the bypass valve 512. As the fifteenth embodiment of the invention, it is further proposed that an air discharge pipe having a free end opened to the atmosphere is connected to the bypass valve 512 in place of the second air feeding pipe 511. Alternatively, the air discharged from the air pump 508 may be periodically blown out to the atmosphere.

With the arrangement described above, the fresh air supplied from the air pump 508 is alternatively introduced to the control valve 514 upstream of the catalytic converter 505 and discharged to the atmosphere, whereby the $O_2$-content of the gas mixture introduced into the catalytic converter 505 varies alternately between a high level and a low level, which equally contributes to rapid activation of the catalytic converter 505.

Embodiment 16

In the control system according to the thirteenth embodiment, the heater 513 is turned on immediately after the start of the engine 501. In contrast, according to the sixteenth embodiment, it is proposed to turn on the heater 513 only when the air is introduced to the exhaust pipe 504 upstream of the catalytic converter 505 after the start of the engine 501.

With the control according to the instant embodiment, the fresh air is protected against excessive temperature rise. In other words, the temperature of the air introduced into the exhaust pipe 504 upstream of the catalytic converter 505 can be so controlled as to remain substantially constant, whereby stable operation of the catalytic converter 505 can be ensured.

Embodiment 17

Figure 20:
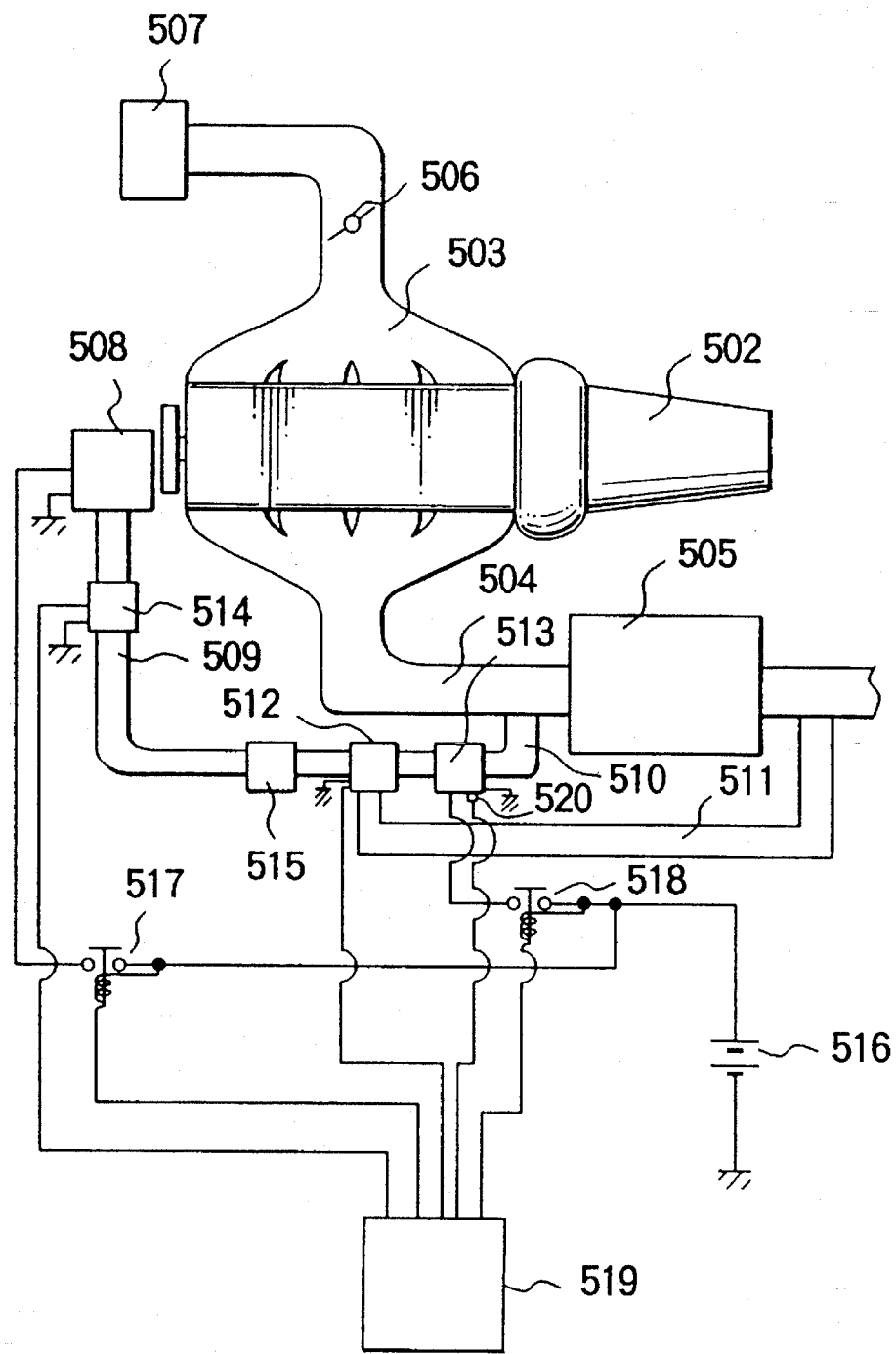
FIG. 20 shows an arrangement of an apparatus for controlling the air feeding to an exhaust gas purification system of an engine according to a seventeenth embodiment incarnating the fifth aspect of the invention.
Figure 21:
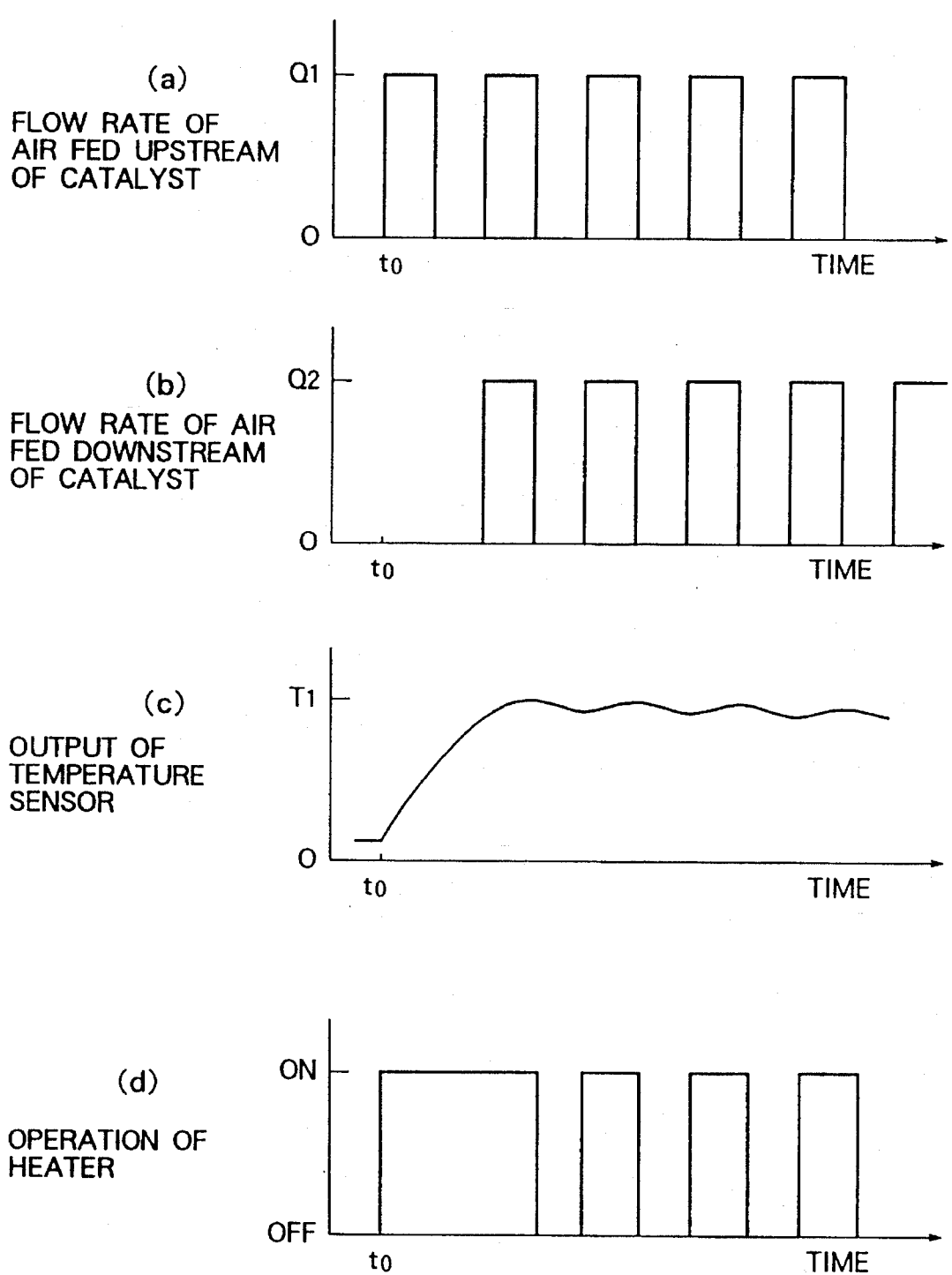
FIG. 21 is a timing chart for illustrating operation of the air feeding control system according to the seventeenth embodiment of the invention.

FIG. 20 shows an arrangement of the apparatus for controlling the air feeding to the exhaust gas purification system of the engine according to a seventeenth embodiment which also incarnates the fifth aspect of the invention. A difference of the structure shown in FIG. 20 from that of FIG. 17 is seen in that a temperature sensor 520 for detecting the temperature of the heater 513 is provided and the detection output signal of the temperature sensor 520 is supplied to the controller 519. Except for this difference, the arrangement of the instant embodiment is same as that shown in FIG. 17. FIG. 21 is a timing chart for illustrating operation of the air feeding control system according to the instant embodiment. More particularly, periodical changes in the air flow fed to the exhaust pipe 504 upstream and downstream of the catalytic converter 505 are illustrated at (a) and (b), respectively, while an output signal of the temperature sensor 520 is illustrated at (c). Further, operation timing of the heater 513 is illustrated at (d).

As can be seen in FIG. 21, the heater 513 is turned on simultaneously with the start of the engine 501 (time point $t_0$) with the bypass valve 512 being switched periodically at a predetermined time interval. The fresh air flowing through the first air feeding pipe 510 is thus heated by the heater 513. When the fresh air flows through the second air feeding pipe 511, the air resident within the first air feeding pipe 510 is heated. When the controller 519 detects that the temperature of the heater 513 has attained a predetermined level ($T_1$) on the basis of the output signal of the temperature sensor 520, the heater 513 is periodically turned on and off in synchronism with the switching of the bypass valve 512.

By virtue of the control of the heater 513 in the manner described above, the temperature of the fresh air introduced into the exhaust pipe 504 upstream of the catalytic converter 505 can rapidly be raised to a predetermined level while suppressing excursion of the air temperature, which can thus be maintained substantially constant at a predetermined value.

Embodiment 18

Figure 22:
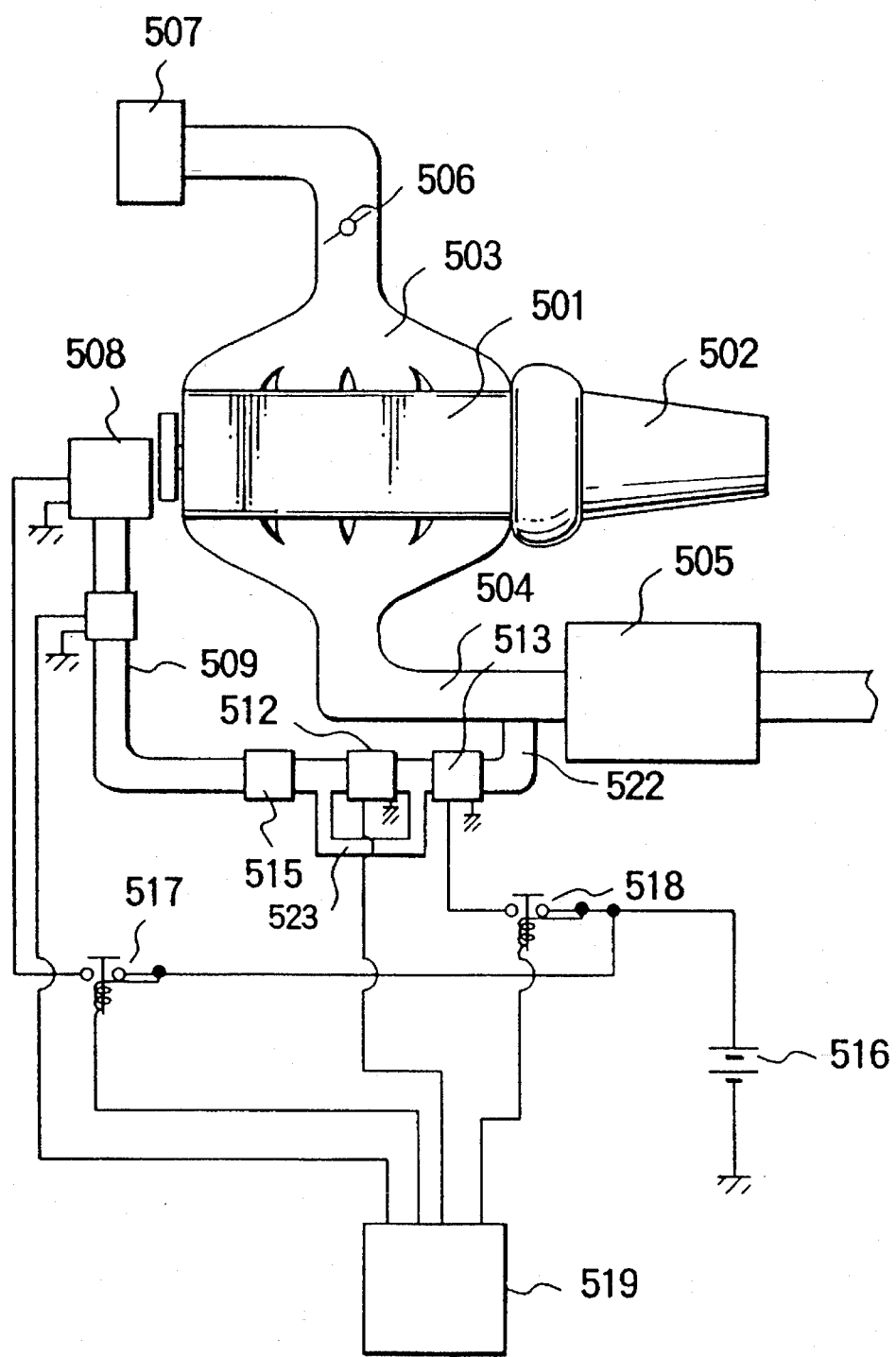
FIG. 22 shows a general arrangement of an apparatus for controlling air supply to an exhaust gas purification system according to an eighteenth embodiment of the invention.

FIG. 22 shows a general arrangement of the apparatus for controlling the air supply to the exhaust gas purification system according to an eighteenth embodiment of the invention. Referring to the figure, an electrically driven ON/OFF valve 521 is mounted on the air supply conduit 509 at the outlet end portion thereof and adapted to be controlled by the controller 519. A bypass air feeding, pipe 522 is connected between the ON/OFF valve 521 and the exhaust pipe 504 at a position upstream of the catalytic converter 505 and communicates the air supply conduit 509 with the air feeding pipe 522 by bypassing the ON/OFF valve 521. The differential pressure type ON/OFF valve 521 is connected to the air supply conduit 509 at a location upstream of the heater 513. The instant embodiment differs from that of the first embodiment in that the second air feeding pipe 511 is not provided.

In operation, the fresh air supplied from the air pump 8 is introduced into the air feeding pipe 522 via the differential pressure type ON/OFF valve 521 and at the same time via the bypass pipe 523. The resultant air flow is then directed into the exhaust pipe 504 upstream of the catalytic converter 505. When the differential pressure type ON/OFF valve 521 is closed by the controller 519, the fresh air supplied from the air pump 508 is introduced into the exhaust pipe 504 upstream of the catalytic converter 505 via the bypass pipe 523 and the air feeding pipe 522. In this manner, when the air flows only through the bypass pipe 523, the air flow rate is decreased due to flow resistance exerted by the inner wall of the bypass pipe 523. This effect is significant particularly when the bypass pipe 523 is of a smaller cross-section than the air feeding pipe 522. By controlling periodically the ON/OFF valve 521, the fresh air flow rate decreases and increases periodically. At that time, by regulating the opening degree of the differential pressure type ON/OFF valve 521, the amount of fresh air introduced into the exhaust pipe 504 upstream of the catalytic converter 505 can be regulated in dependence on the operation states of the engine for thereby setting optimally the ratio at which the fresh air is mixed with the engine exhaust gas.

By selectively determining the inner diameters of the air supply conduit 509, the air feeding pipe 522 and the bypass pipe 523 in dependence on the air flow demanded to be introduced into the upstream side of the catalytic converter 505, the air flow rate in the state when the differential pressure type ON/OFF valve 521 is opened and the air flow rate when the differential pressure type ON/OFF valve 521 is closed can optimally be set.

Embodiment 19

Figure 23:
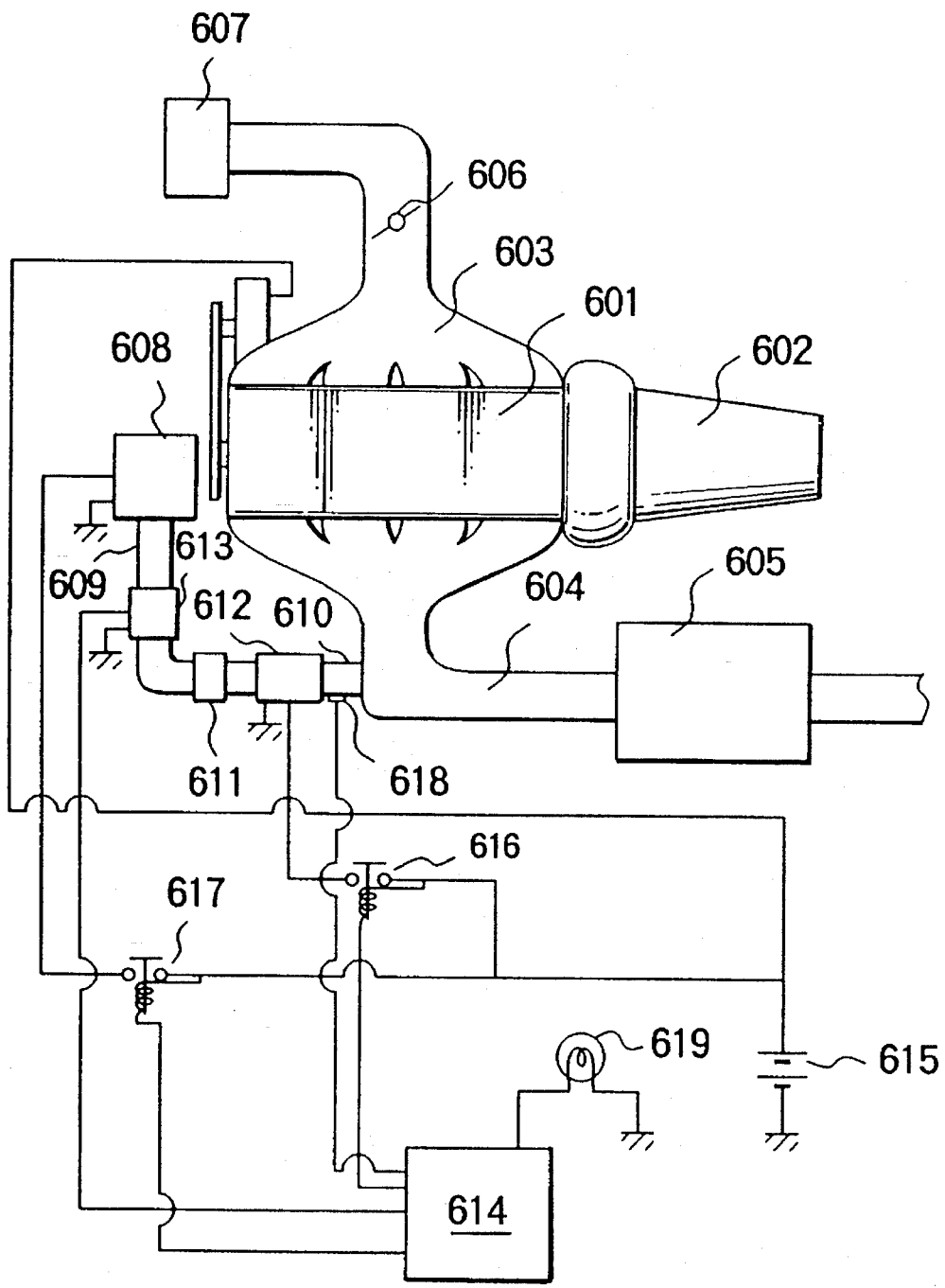
FIG. 23 shows schematically a structure of the apparatus for controlling the fresh air introduced into an exhaust gas purification system for an internal combustion engine according to a nineteenth embodiment incarnating the sixth aspect of the invention.

FIG. 23 shows schematically a structure of the apparatus for controlling the fresh air introduced into the exhaust gas purification system for an internal combustion engine according to a nineteenth embodiment which incarnates the sixth aspect of the invention. As can be seen in the figure, the engine system is comprised of an internal combustion engine 601 for generating a driving torque, a transmission 602 operatively connected to an output shaft (not shown) of the engine 601, an intake pipe 603 for charging air into the engine 601 after purification by an air cleaner 607 and flow control by a throttle valve 606, an exhaust pipe 604 for discharging engine exhaust gas, and an exhaust gas purification system including a catalytic converter 605 disposed in the exhaust pipe 604 for purifying the exhaust gas. Although not shown, fuel is injected through an injector system and mixed with the intake air, wherein the resultant mixture undergoes burning within the engine. The catalytic converter 605 plays a role for removing HC and CO contained in the exhaust gas through chemical reaction.

An air pump 608 driven by an electric motor draws fresh air (secondary air) and feeds it into the exhaust pipe 604 upstream of the catalytic converter 605 through an air feed passage constituted by the air feed pipes 609 and 610. There are disposed in the air feed passage a check valve 611 for preventing backward flow of the exhaust gas, an electric heater 612 for heating the air before being fed into the exhaust pipe 604, and a control valve 613 for regulating the flow rate of the air to be introduced into the exhaust pipe, wherein the air pump 608, the heater 612 and the control valve 613 are controlled by a controller 614. The air pump 608 and the heater 612 are supplied with electric power from a battery 615 via associated relays 616 and 617 which are also controlled by the controller 614.

According to the teachings of the invention incarnated in the instant embodiment, there are provided a temperature detector 618 for detecting the temperature of the fresh air (secondary air) at a location downstream of the electric heater 612 and an alarm indicator which may be constituted by an alarm lamp 619 for indicating the driver occurrence of overheat abnormality.

Figure 24:
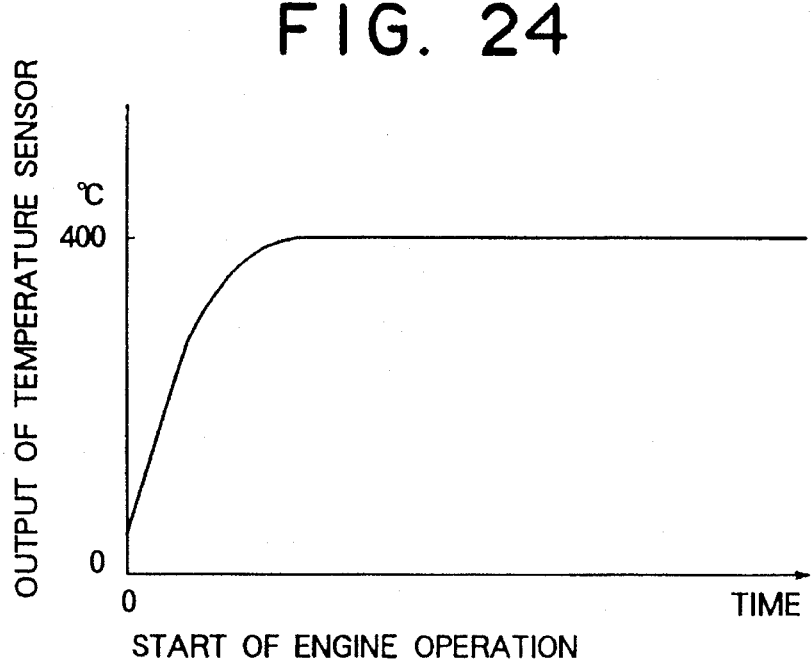
FIG. 24 is a graphical representation illustrating characteristically temperature rise of fresh (secondary) air in the system shown in FIG. 23.

In operation, simultaneously with or after lapse of a predetermined time from the start of the engine 601, the controller 614 actuates the air pump 608 via the air-pump relay 617, to thereby allow the fresh air to be introduced into the exhaust pipe 604 via the air feeding pipes 609 and 610. Further, the controller 614 commands electrical energization of the heater 612 via the relay 617 simultaneously with the engine start, whereby the air being fed is heated. The temperature sensor 608 detects the temperature of the air at a location downstream of the heater 612. FIG. 24 is a graphical representation showing temperature rise of the fresh (secondary) air.

Figure 25:
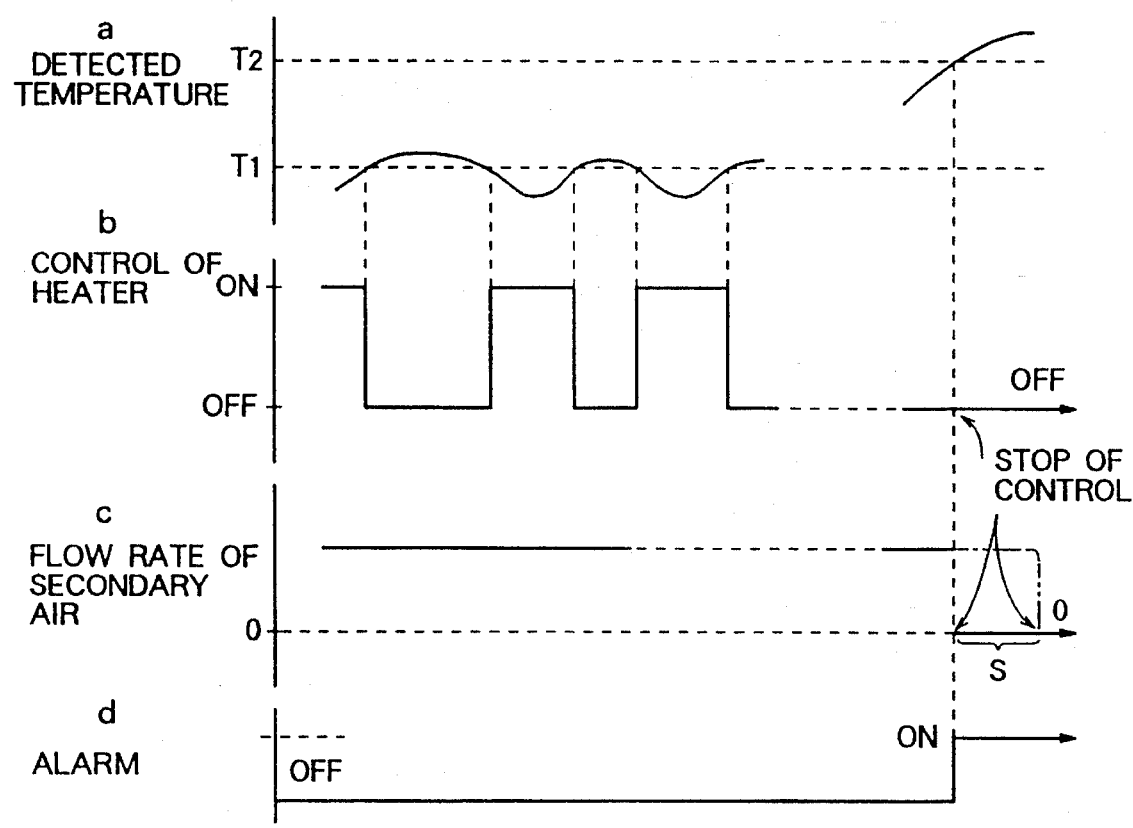
FIG. 25 is a timing chart for illustrating relations among detected temperature of air, operation of a heater, a flow rate of air and operation of alarm in the system shown in FIG. 23.

FIG. 25 is a timing chart for illustrating operation of the apparatus according to the instant embodiment. Upon electric energization of the heater 612, the controller 614 compares the air temperature detected by the temperature sensor 618 with a preset temperature $T_1$. When the former is lower than the latter, decision is made that no abnormality takes place, whereby the control of the heater 612 and the air pump 608 is continued as it is.

On the other hand, when the air temperature detected by the temperature sensor 618 exceeds the first preset temperature, the controller 614 stops operation of the heater 615 by interrupting power supply thereto via the relay 617.

Further, when the output level of the temperature sensor 618 exceeds a second preset temperature $T_2$, the controller 614 stops operations of all the parts involved in the fresh air feeding control, inclusive of the heater 612 and the air pump 608.

At the same time, the controller 619 turns on the alarm lamp 619 for informing the driver of occurrence of abnormality. At this juncture, it should be noted that the alarm means is never restricted to the lamp, but other suitable means such as buzzer or the like may be used to the substantially same effect.

Parenthetically, the first preset temperature may be selected to be a level at which the heater 612 is not injured yet and can be determined in consideration of the material and performance of the heater and the amount or flow rate of the air introduced to the heater. In the case of the instant embodiment, the first preset temperature may range from 700° C. to 800° C.

On the other hand, the second preset temperature $T_2$ is selected at such Level at which the heater and devices located in the vicinity thereof are most likely to be injured or destroyed and may be determined on the basis of heat withstanding capabilities of the heater and the peripheral devices. In the case of the instant embodiment, the second preset temperature $T_2$ is set in a range of 850° C. to 900° C.

Although the control of the secondary air feeding in control system including the air pump and others is stopped immediately when the second preset temperature $T_2$ is exceeded to thereby interrupt completely the air feeding, it is preferred to actuate again the air pump upon lapse of a predetermined time (period S shown in FIG. 25 at (c)) after detection of the temperature higher than $T_2$ for thereby feeding the fresh air to cool the heater 12 as rapidly as possible. It should further be mentioned that the air feed control may be performed such that the amount of the air fed to the engine exhaust system may vary, as described in conjunction with the preceding embodiments.

Embodiment 20

Figure 26:
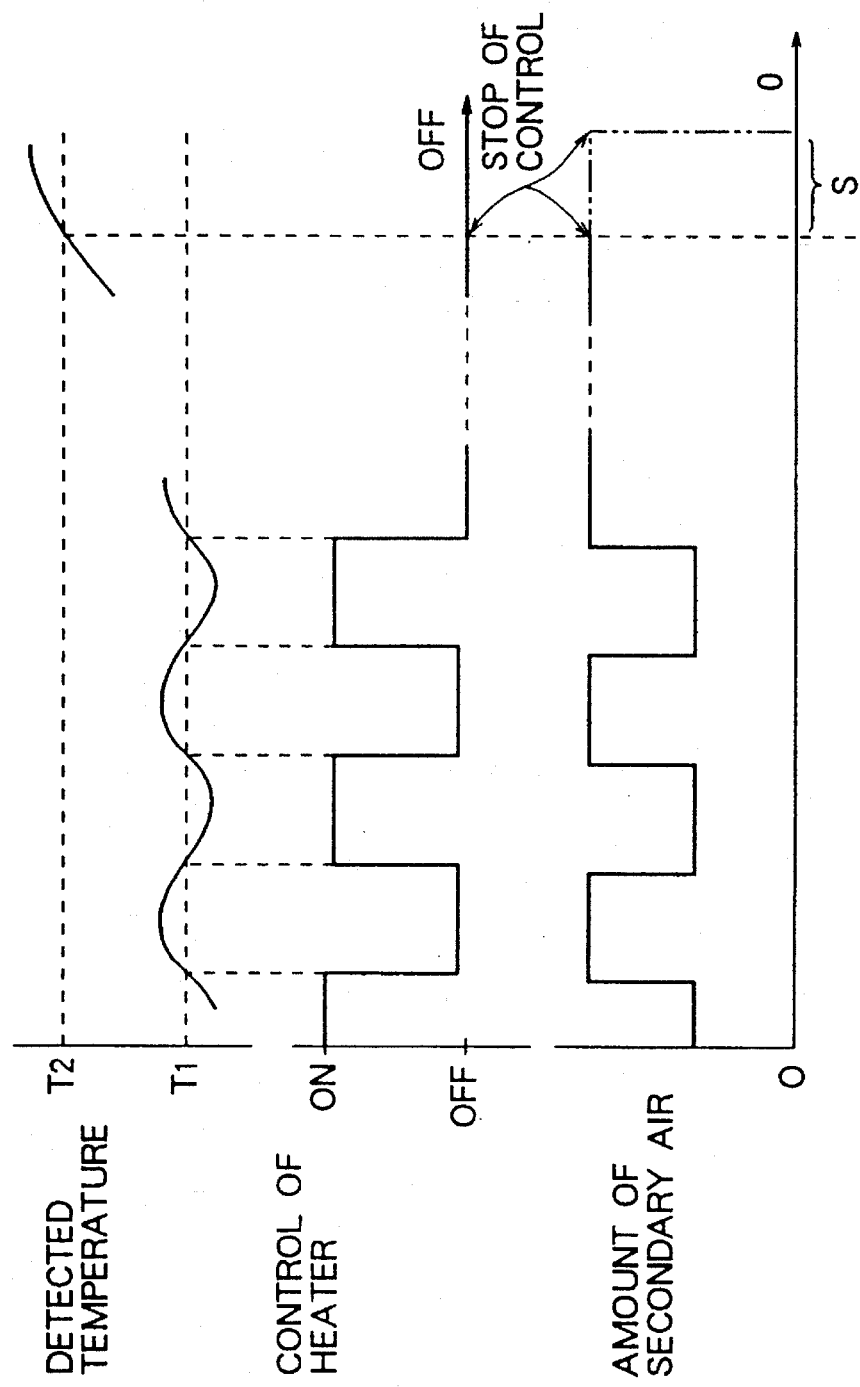
FIG. 26 is a timing chart for illustrating relations among detected air temperature, operation of heater and flow rate of air in a system according to a twentieth embodiment incarnating the sixth aspect of the invention.

In the case of the nineteenth embodiment, electric energization of the heater 612 is interrupted when the temperature thereof lines within a range between the first and second preset values $T_1$ and $T_2$. However, with only the deenergization of the heater, the temperature of the air can not be lowered sufficiently although it depends on various conditions. Accordingly, with the instant embodiment, such arrangement is adopted in which when the air temperature as detected exceeds the first preset temperature value $T_1$, the controller 612 interrupts power supply to the heater 612 while controlling the flow control valve 613 so that the flow rate of air fed to the heater 612 increases. Thus, the lowering of temperature of the heated fresh air progresses rapidly with the heater 612 operating stably. FIG. 26 is a timing chart for illustrating this operation.

Embodiment 21

The instant embodiment is directed to another method of controlling the air flow control valve 613. As described previously in conjunction with the first embodiment, when the detected temperature of the air being fed to the exhaust pipe exceeds the second preset value $T_2$, power supply to the heater 612 is interrupted. However, there may arise such situation that the temperature of the heater and the peripheral devices can not lower speedily. Accordingly, it is proposed with the instant embodiment of the invention to increase the flow rate of the aid fed to the heater 612 by correspondingly controlling the air flow control valve 613 simultaneously with interruption of the power supply to the heater 612.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, each of controllers employed in the various embodiments of the invention may be implemented by a micro-computer programmed for performing the controls described above, within the skill of those having ordinary knowledge in this field. Further, arithmetic operations, calculations, comparisons, decisions and other processings involved in the controls described above can be executed by corresponding programs running on the computer. Besides, the relays and other switches may be implemented in the form of solid state switch devices. Needless to say, the invention is never restricted to the use of any specific type catalysts.

Accordingly, all suitable modifications and equivalents may be resorted to, falling within the spirit and scope of the invention.

We claim:

1. An apparatus for controlling an amount of air fed into an exhaust gas purification system for an internal combustion engine, said exhaust gas purification system comprising a catalytic converter disposed in an exhaust pipe of said engine for purifying an exhaust gas of said engine, an air feeding system for introducing air into said exhaust gas purification system after heating the air, and fuel control means for controlling an amount of fuel charged into said internal combustion engine so that a purification efficiency of said catalytic converter can be enhanced, said apparatus for controlling comprising:

air-fuel ratio sensor means disposed in said exhaust pipe at a position downstream of said catalytic converter for detecting concentration of a given component contained in the exhaust gas;

decision means for determining whether a catalyst of said catalytic converter is activated;

air feeding control means for controlling an amount of air fed to said exhaust gas purification system based on a detection output of said air-fuel ratio sensor when a decision is made that said catalyst is not yet activated, said decision being based on an output signal of said decision means; and air-fuel ratio control means for controlling said fuel control means based on a concentration of a specific component detected by said air-fuel ratio sensor means when said decision is made based on said output signal of said decision means indicating that said catalyst is not activated.

2. An exhaust gas purification system for an internal combustion engine, comprising:

fuel injection means for charging a fuel into said engine;

air feeding means for introducing secondary air into an exhaust pipe of said engine;

air-fuel ratio detecting means disposed in said exhaust pipe;

sensor means for detecting engine operation state information;

fuel injection control means for controlling said fuel injection means through a feedback control loop based on an air-fuel ratio detection signal derived from an output of said air-fuel ratio detecting means and operation state information derived from outputs of said sensor means so that air-fuel ratio of an air-fuel mixture undergoing combustion within said engine represents substantially a stoichiometric air-fuel ratio; and secondary air control means for controlling said air feeding means in response to a mode signal supplied from said fuel injection control means;

wherein said fuel injection control means includes means for generating said mode signal indicating when feedback control of said air-fuel ratio is being executed, said air-fuel ratio being controlled to be said stoichiometric air-fuel ratio when said feedback control is being executed; and indicating when said feedback control of said air-fuel ratio is not being executed, said air-fuel ratio being controlled to be lower than said stoichiometric air-fuel ratio when said feedback control is not being executed; and wherein said secondary air control means drives said fresh air feeding means when said air-fuel ratio feedback control is not executed, and operation of said air feeding means is inhibited when said air fuel ratio feedback control is executed.

3. An exhaust gas purification system according to claim 2, wherein said engine operation state information includes at least temperature of said engine and rotational speed of said engine.

4. An exhaust gas purification system for an internal combustion engine, comprising:

fuel injection means for charging a fuel into said engine;

air feeding means for introducing secondary air into an exhaust pipe of said engine;

heater means for heating said secondary air before being introduced into said exhaust pipe;

air-fuel ratio detecting means disposed in said exhaust pipe;

sensor means for detecting engine operation state information;

fuel injection control means for controlling said fuel injection means through a feedback control loop in dependence on an air-fuel ratio detection signal derived from an output of said air-fuel ratio detecting means and the operation state information derived from outputs of said sensor means so that air-fuel ratio of an air-fuel mixture undergoing combustion within said engine represents substantially a stoichiometric air-fuel ratio; and secondary air control means for controlling said air feeding means and said heater means in response to a mode signal supplied from said fuel injection control means;

wherein said fuel injection control means includes means for generating said mode signal indicating when feedback control of said air-fuel ratio is being executed, said air-fuel ratio being controlled to be said stoichiometric air-fuel ratio when said feedback control mode is being executed; and indicating when said feedback control of said air fuel ratio is not being executed, said air-fuel ratio being controlled to be lower than said stoichiometric air-fuel ratio when said feedback control is not being executed; and wherein said secondary air control means drives both of said secondary air feeding means and said heater means when said air-fuel ratio feedback control is not executed, and operations of both of said secondary air feeding means and said heater means are inhibited when said air-fuel ratio feedback control is executed.

5. An exhaust gas purification system according to claim 4, wherein said engine operation state information includes at least temperature of said engine and rotational speed of said engine.

6. An exhaust gas purification system for an internal combustion engine, comprising:

fuel injection means for charging a fuel into said engine;

secondary air feeding means for introducing secondary air into an exhaust pipe of said engine;

heater means for heating said air before being fed into said exhaust pipe;

air-fuel ratio detecting means disposed in said exhaust pipe;

sensor means for detecting engine operation state information;

fuel injection control means for controlling said fuel injection means through a feedback control loop in dependence on an air-fuel ratio detection signal derived from an output of said air-fuel ratio detecting means and the operation state information derived from outputs of said sensor means so that air-fuel ratio of an air-fuel mixture undergoing combustion within said engine represents substantially a stoichiometric air-fuel ratio; and secondary air control means for controlling said secondary air feeding means and said heater means in response to mode signals supplied from said fuel injection control means;

wherein said fuel injection control means includes means for generating a first mode signal indicating that feedback control of said air-fuel ratio is being executed said air-fuel ratio being controlled to be said stoichiometric air-fuel ratio when said feedback control is being executed; and a second mode signal indicating that said internal combustion engine is in a warming-up state, said air-fuel ratio being controlled to be lower than said stoichiometric air-fuel ratio when said feedback control is not being executed; and wherein said secondary air control means drives both of said secondary air feeding means and said heater means when said engine is in said warming-up state and when said air-fuel ratio feedback control is not being executed, and drives said fresh air feeding means while inhibiting operation of said heater means when said air-fuel ratio feedback control is not being executed and when said engine is not in the warming-up state; and wherein operations of both of said secondary air feeding means and said heater means are inhibited when said air-fuel ratio feedback control is being executed.

7. An exhaust gas purification system according to claim 6, wherein said engine operation state information includes at least temperature of said engine and rotational speed of said engine.

* * * * *